(12) United States Patent
Olmstead et al.

(10) Patent No.: US 8,746,564 B2
(45) Date of Patent: Jun. 10, 2014

(54) TUNNEL OR PORTAL SCANNER AND METHOD OF SCANNING FOR AUTOMATED CHECKOUT

(75) Inventors: Bryan L. Olmstead, Eugene, OR (US); Alan Shearin, Eugene, OR (US); Michael P. Svetal, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 194 days.

(21) Appl. No.: 13/357,356

(22) Filed: Jan. 24, 2012

(65) Prior Publication Data

US 2013/0020392 A1 Jan. 24, 2013

Related U.S. Application Data

(60) Provisional application No. 61/435,777, filed on Jan. 24, 2011.

(51) Int. Cl.
*G06K 7/04* (2006.01)

(52) U.S. Cl.
USPC ..................... 235/444; 235/462.08

(58) Field of Classification Search
USPC ............. 235/462.08, 462.11, 462.42, 462.43, 235/444
See application file for complete search history.

(56) References Cited

U.S. PATENT DOCUMENTS

| | | | |
|---|---|---|---|
| 4,939,355 A | 7/1990 | Rando et al. | |
| 5,019,694 A | 5/1991 | Collins | |
| 5,495,097 A | 2/1996 | Katz et al. | |
| 6,189,784 B1 | 2/2001 | Williams et al. | |
| 6,330,973 B1 | 12/2001 | Bridgelall et al. | |
| 6,446,870 B1 | 9/2002 | Rando | |
| 6,484,066 B1 | 11/2002 | Riess et al. | |
| 6,837,428 B2 | 1/2005 | Lee et al. | |
| 6,899,272 B2 | 5/2005 | Krichever | |
| 7,000,839 B2 | 2/2006 | Good et al. | |
| 7,044,370 B2 | 5/2006 | Bellis, Jr. et al. | |

(Continued)

FOREIGN PATENT DOCUMENTS

| | | |
|---|---|---|
| JP | 11-203423 A | 7/1999 |
| JP | 2002-029608 A | 1/2002 |

OTHER PUBLICATIONS

International Search Report, PCT Application No. PCT/US2012/022438, Sep. 5, 2012.

(Continued)

*Primary Examiner* — Karl D Frech
(74) *Attorney, Agent, or Firm* — Stoel Rives LLP

(57) ABSTRACT

Systems and methods for data reading, which in one example configuration is directed to an automated optical code data reader in the form of a tunnel or portal scanner having an open architecture configured with front and rear inverted U-shaped arches, a plurality of cameras (some or most of which have multiple fields of view) in each of the arches for reading the top five sides of an item being passed by a conveyor through a read region formed by the arches, and a bottom reader including one or more cameras under the conveyor for reading a bottom side of the item through a gap in the conveyors as the item is passed over the gap. Also disclosed are specific imaging schemes for providing effective views of the items with a minimum number of cameras.

20 Claims, 49 Drawing Sheets

(56) References Cited

U.S. PATENT DOCUMENTS

| | | | |
|---|---|---|---|
| 7,325,729 | B2 | 2/2008 | Crockett et al. |
| 7,398,927 | B2 | 7/2008 | Olmstead |
| 7,527,205 | B2 | 5/2009 | Zhu et al. |
| 7,720,194 | B2 | 5/2010 | Connelly et al. |
| 2006/0261157 | A1 | 11/2006 | Ostrowski et al. |
| 2007/0181685 | A1* | 8/2007 | Zhu et al. .................. 235/454 |
| 2008/0121689 | A1* | 5/2008 | Good et al. .................. 235/375 |
| 2009/0134221 | A1 | 5/2009 | Zhu et al. |
| 2010/0163626 | A1 | 7/2010 | Olmstead |
| 2010/0163627 | A1 | 7/2010 | Olmstead |
| 2010/0163628 | A1 | 7/2010 | Olmstead |
| 2010/0217678 | A1 | 8/2010 | Goncalves |

OTHER PUBLICATIONS

SCDigest.com article, RFID and AIDC News: "New Kroger Bar Code Scan Tunnel . . . " Jan. 11, 2011 http://www.scdigest.com/ontarget/11-01-11-2.php?cid=4083 Visited Jan. 25, 2011.

U.S. Appl. No. 29/383,887, filed Jan. 24, 2011 for Tunnel Scanner with Open Space Architecture of Jeffrey J. Hoskinson et al.

U.S. Appl. No. 13/356,504, filed Jan. 23, 2012 for Modular Scanner Component Mounting System for Checkstand of Jeffrey J. Hoskinson et al.

U.S. Appl. No. 13/357,459, filed Jan. 24, 2012 for Exception Detection and Handling in Automated Optical Code Reading Systems of Bryan L. Olmstead et al.

* cited by examiner

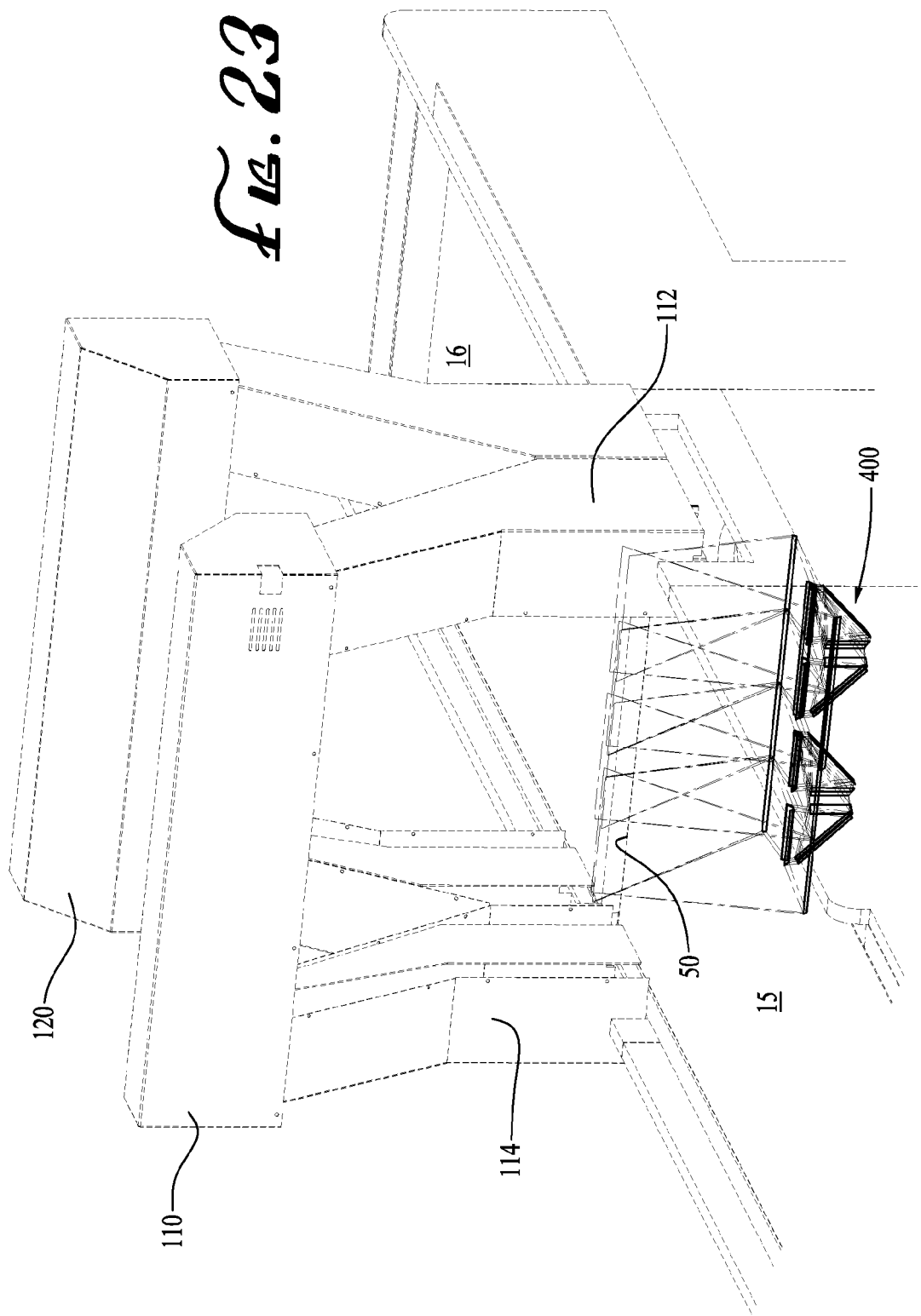

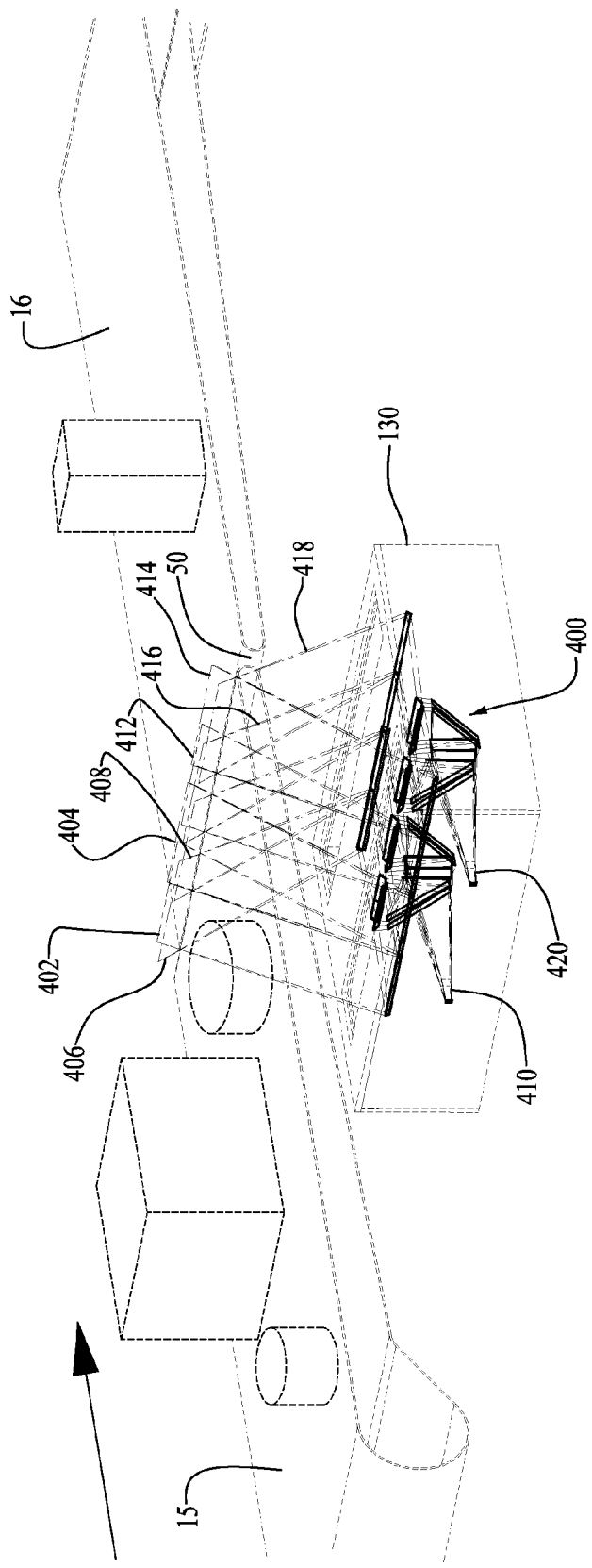

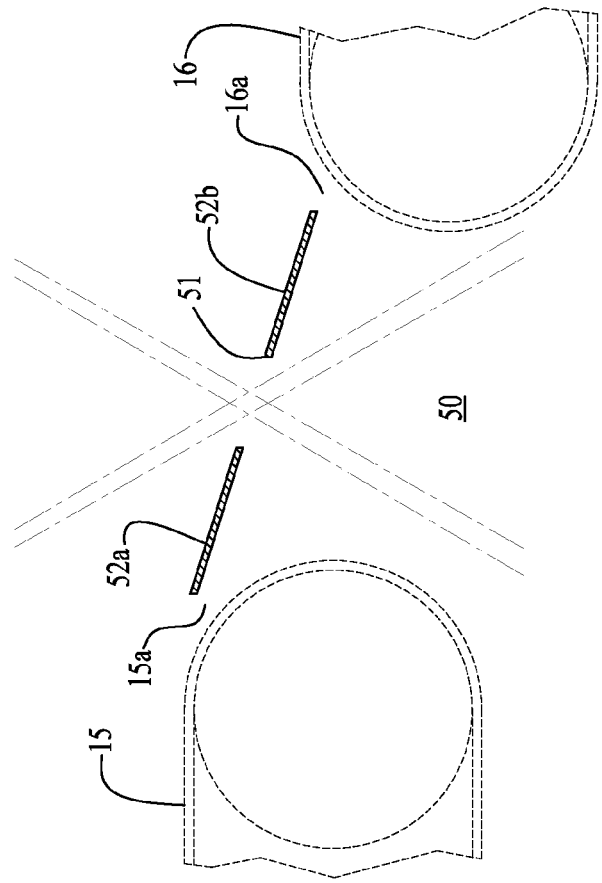
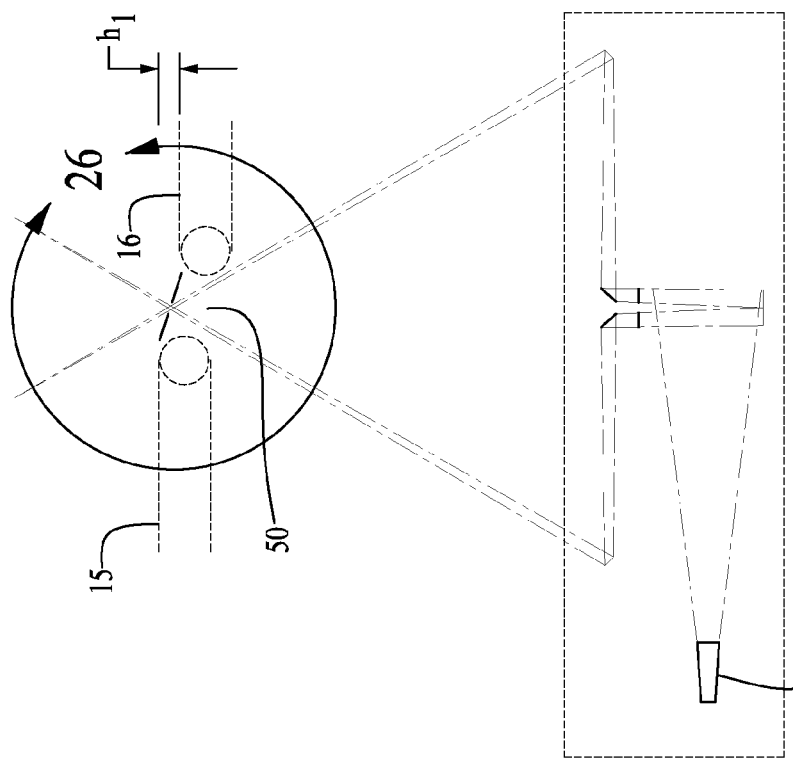

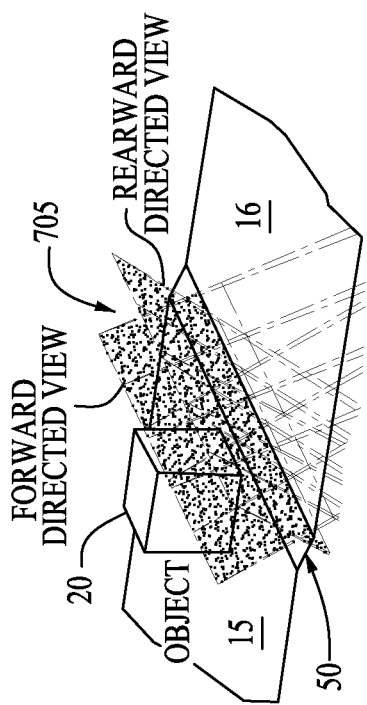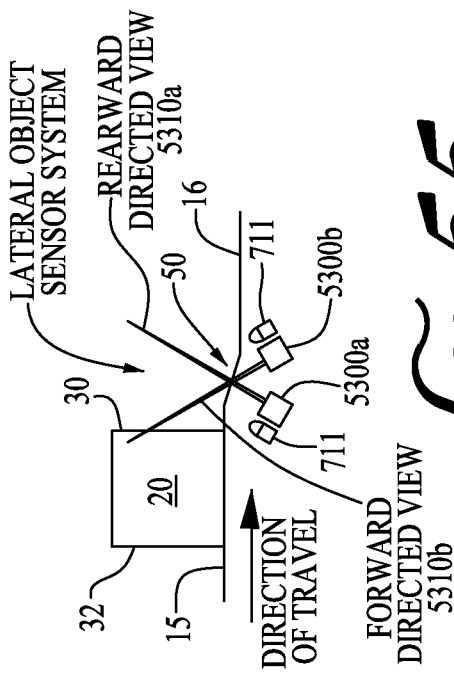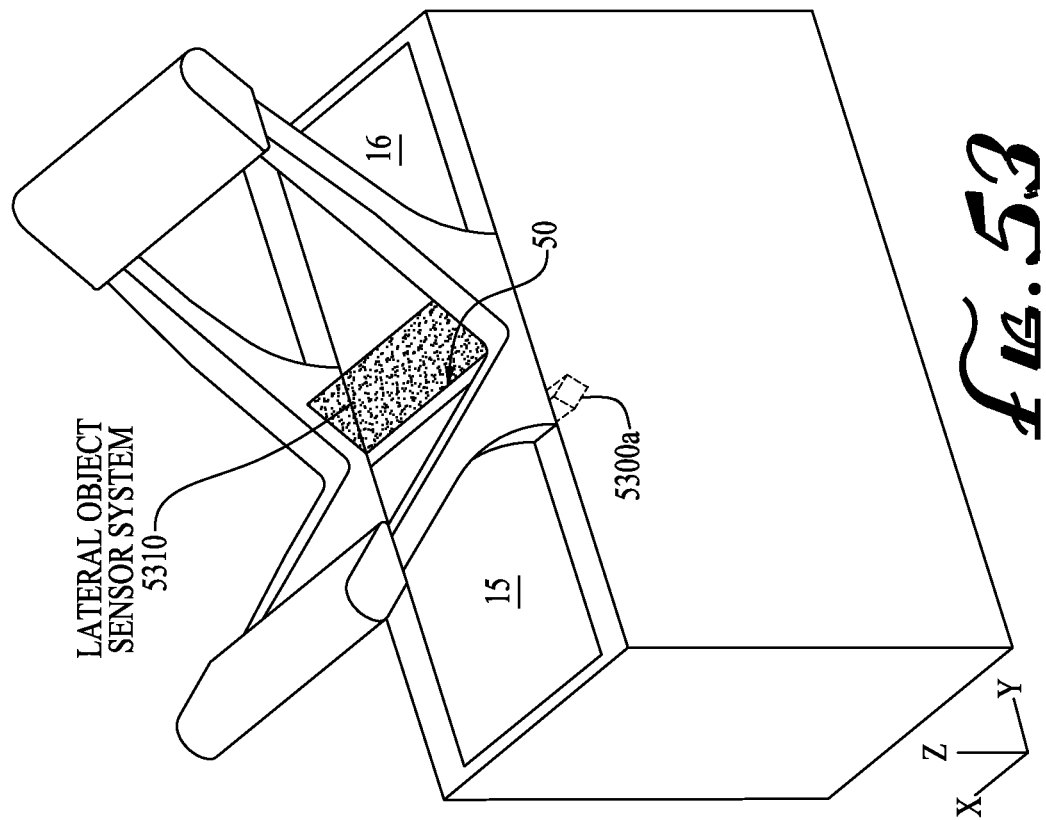

TUNNEL OR PORTAL SCANNER AND METHOD OF SCANNING FOR AUTOMATED CHECKOUT

RELATED APPLICATION DATA

This application claims priority to U.S. provisional application No. 61/435,777 filed Jan. 24, 2011, hereby incorporated by reference.

BACKGROUND

The field of the present disclosure relates to systems and methods for item checkout and in certain aspects to retail checkstands or other checkout stands (e.g., a parcel distribution station) that incorporate data readers and other electronic devices. The field of the present disclosure further relates generally to data reading devices, and more particularly to automated devices by which items are conveyed, typically on a conveyor, through a read zone of the data reader by which the items are identified such as, for example, by reading optical codes or RFID (radio frequency identification) tags on the items.

Data reading devices are used to obtain data from optical codes or electronic tags (e.g., RFID tags), or use image recognition to identify an item. One common data reader device is an RFID reader. Another common data reader device is an optical code reader. Optical codes typically comprise a pattern of dark elements and light spaces. There are various types of optical codes, including linear or 1-D (one-dimensional) codes such as UPC and EAN/JAN barcodes, 2-D (two-dimensional codes) such as MaxiCode codes, or stacked codes such as PDF 417 codes. For convenience, some embodiments may be described herein with reference to capture of 1-D barcodes, but the embodiments may also be useful for other optical codes and symbols or objects.

Various types of optical code readers, also known as scanners, such as manual readers, semi-automatic readers and automated readers, are available to acquire and decode the information encoded in optical codes. In a manual reader (e.g., a hand-held type reader, a fixed-position reader), a human operator positions an object relative to the reader to read the optical code associated with the object. In a semi-automatic reader, either checker-assisted or self-checkout, objects are moved usually one at a time by the user into or through the read zone of the reader and the reader then reads the optical code on the object. In an automated reader (e.g., a portal or tunnel scanner), an object is automatically positioned (e.g., transported through the read zone via a conveyor) relative to the reader, with the reader automatically reading the optical code on the object.

One type of data reader is referred to as a flying spot scanner wherein an illumination beam is moved (i.e., scanned) across the barcode while a photodetector monitors the reflected or backscattered light. For example, the photodetector may generate a high voltage when a large amount of light scattered from the barcode impinges on the detector, as from a light space, and likewise may produce a low voltage when a small amount of light scattered from the barcode impinges on the photodetector, as from a dark bar. The illumination source in flying spot scanners is typically a coherent light source, such as a laser or laser diode, but may comprise a non-coherent light source such as a light emitting diode. A laser illumination source may offer advantages of higher intensity illumination which may allow barcodes to be read over a larger range of distances from the barcode scanner (large depth of field) and under a wider range of background illumination conditions.

Another type of data reader is an imaging reader that employs an imaging device or sensor array, such as a CCD (charge coupled device) or CMOS (complementary metal oxide semiconductor) device. Imaging readers can be configured to read both 1-D and 2-D optical codes, as well as other types of optical codes or symbols and images of other items. When an imaging reader is used to read an optical code, an image of the optical code or portion thereof is focused onto a detector array. Though some imaging readers are capable of using ambient light illumination, an imaging reader typically utilizes a light source to illuminate the item being read to provide the required signal response in the imaging device. A camera is typically a combination of a lens and an imaging device/sensor array, but the terms imager and camera will be used somewhat interchangeably herein.

An imager-based reader utilizes a camera or imager to generate electronic image data, typically in digital form, of an optical code. The image data is then processed to find and decode the optical code. For example, virtual scan line techniques are known techniques for digitally processing an image containing an optical code by looking across an image along a plurality of lines, typically spaced apart and at various angles, somewhat similar to the scan pattern of a laser beam in a laser-based scanner.

Imager-based readers often can only form images from one perspective—usually that of a normal vector out of the face of the imager. Such imager-based readers therefore provide only a single point of view, which may limit the ability of the reader to recognize an optical code in certain circumstances. For example, because the scan or view volume of an imager in an imager-based reader is typically conical in shape, attempting to read a barcode or other image in close proximity to the scanning window (reading "on the window") may be less effective than with a basket-type laser scanner. Also, when labels are oriented such that the illumination source is reflected directly into the imager, the imager may fail to read properly due to uniform reflection washing out the desired image entirely, or the imager may fail to read properly due to reflection from a textured specular surface washing out one or more elements. This effect may cause reading of shiny labels to be problematic at particular reflective angles. In addition, labels oriented at extreme acute angles relative to the imager may not be readable. Lastly, the label may be oriented on the opposite side of the package with respect to the camera view, causing the package to obstruct the camera from viewing the barcode.

Thus, better performance could result from taking images from multiple perspectives. A few imager-based readers that generate multiple perspectives are known. One such reader is disclosed in U.S. Pat. No. 7,398,927 which discloses an embodiment having two cameras to collect two images from two different perspectives for the purpose of mitigating specular reflection. U.S. Pat. No. 6,899,272 discloses one embodiment that utilizes two independent sensor arrays pointed in different orthogonal directions to collect image data from different sides of a package. Multiple-camera imager-based readers that employ spatially separated cameras require multiple circuit boards and/or mounting hardware and space for associated optical components which can increase the expense of the reader, complicate the physical design, and increase the size of the reader. Improved multi-camera systems are disclosed in U.S. Published Application Nos. US-2010-0163626, US US-2010-0163627, and US-2010-0163628.

The present inventors have, therefore, determined that it would be desirable to provide an improved imager-based reader and an improved tunnel or portal scanner system for automated checkout.

BRIEF DESCRIPTION OF THE DRAWINGS

Understanding that drawings depict only certain preferred embodiments and are not therefore to be considered to be limiting in nature, the preferred embodiments will be described and explained with additional specificity and detail through the use of the accompanying drawings in which:

FIG. 23 is a rear side isometric view of the scanner of FIG. 1 showing image views from the bottom reader through the conveyor gap.

FIG. 24 is a diagrammatic isometric view of the bottom reader of FIG. 23 with the arch sections of the tunnel scanner removed.

FIG. 25 is a diagrammatic side view of the optic set of the bottom reader of FIG. 24.

FIG. 26 is a detailed view of a portion of FIG. 25.

FIG. 53 is an isometric view of a lateral object sensor system of the object measurement system according to one embodiment.

FIG. 54 is an isometric view of the lateral object sensor system according to one embodiment.

FIG. 55 is a side elevation view of the lateral object sensor system of FIG. 54.

DETAILED DESCRIPTION OF EMBODIMENTS

With reference to the above-listed drawings, this section describes particular embodiments and their detailed construction and operation. The embodiments described herein are set forth by way of illustration only and not limitation. It should be recognized in light of the teachings herein that there is a range of equivalents to the example embodiments described herein. Most notably, other embodiments are possible, variations can be made to the embodiments described herein, and there may be equivalents to the components, parts, or steps that make up the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

In some embodiments, an image field of an imager may be partitioned into two or more regions, each of which may be used to capture a separate view of the view volume. In addition to providing more views than imagers, such embodiments may enhance the effective view volume beyond the view volume available to a single imager having a single point of view.

Figure 1:
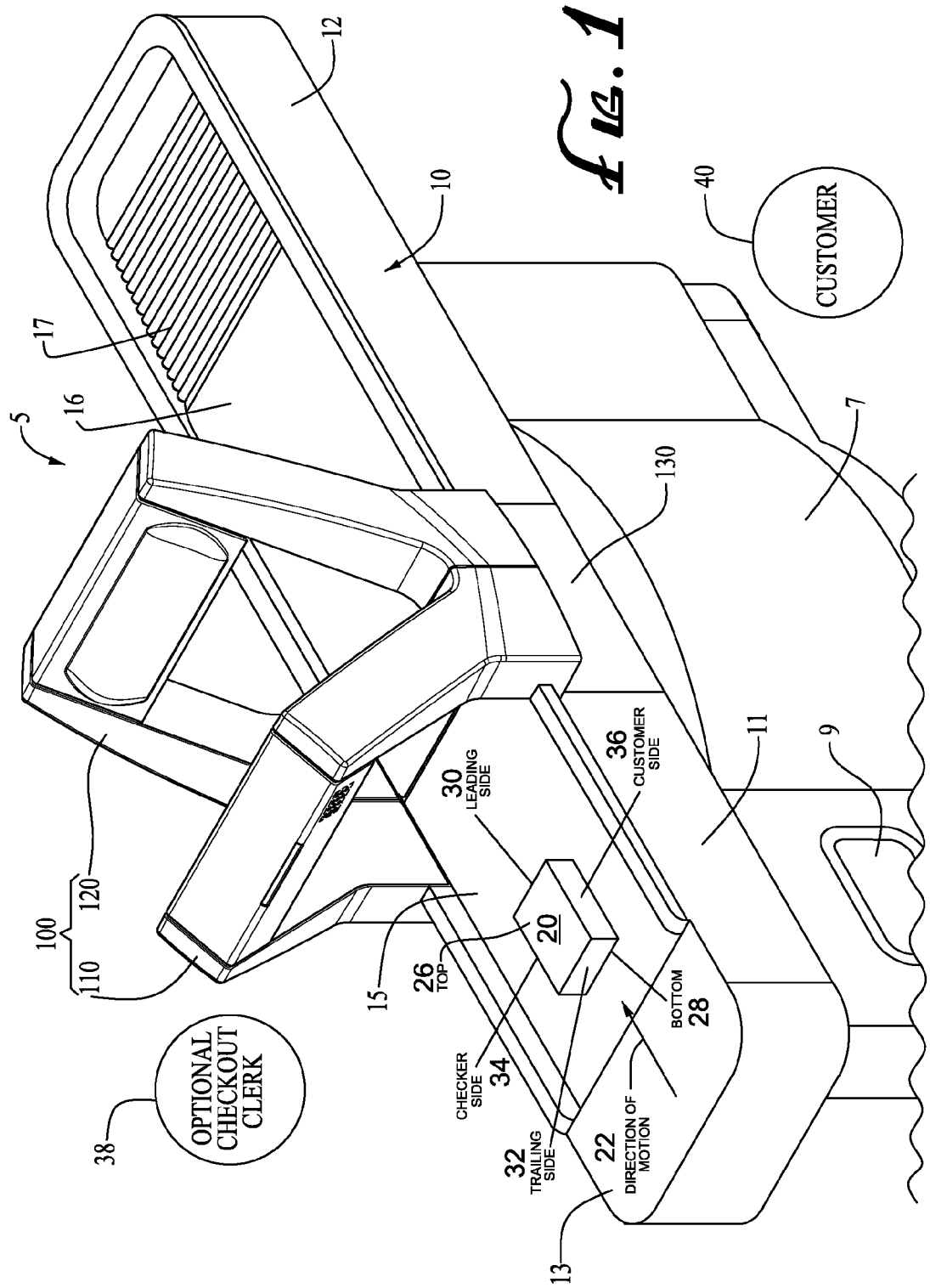
FIG. 1 is a front top isometric view of a checkout system including a tunnel or portal scanner according to a preferred embodiment, installed on a checkstand, as viewed from the upstream side of the conveyor.
Figure 2:
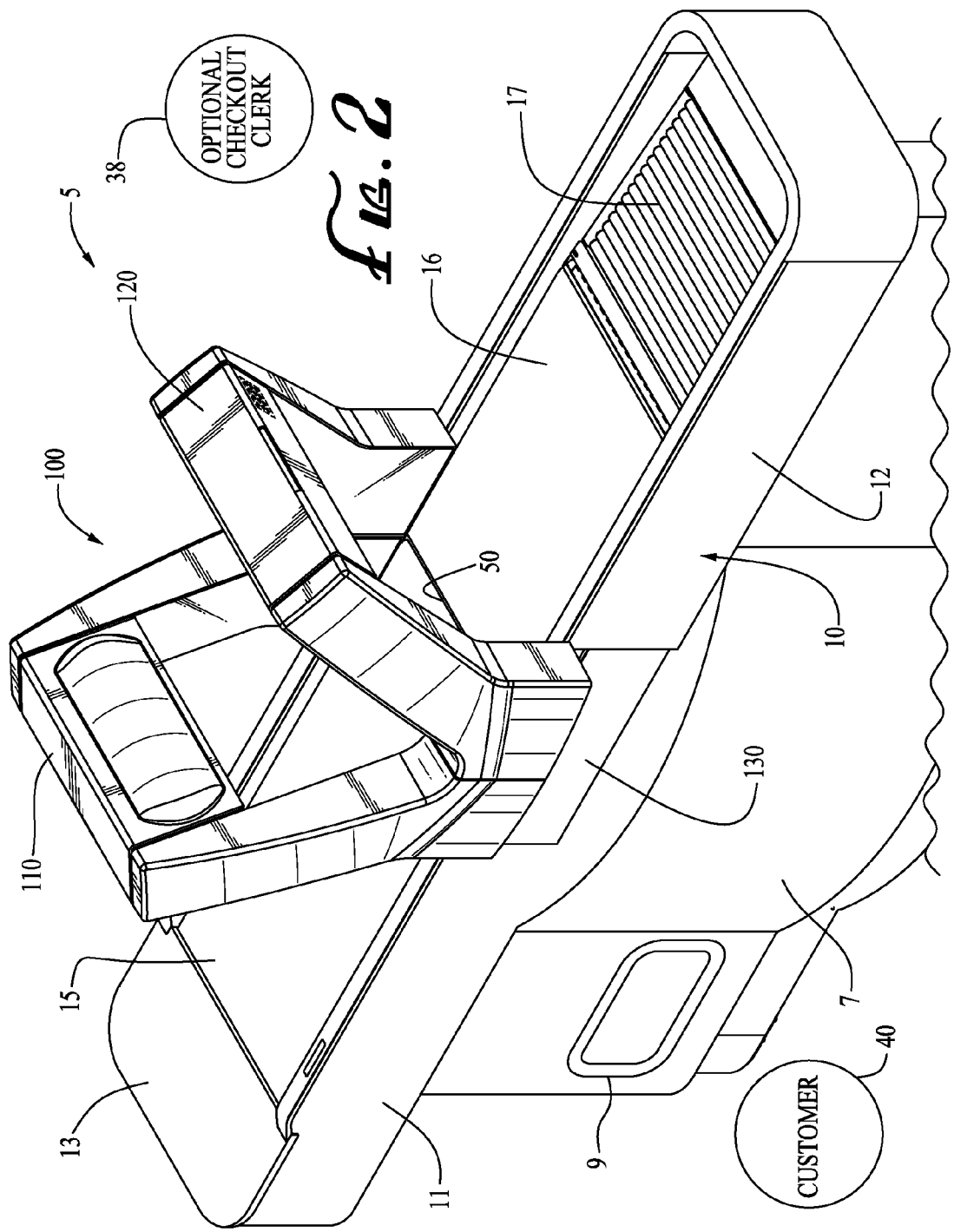
FIG. 2 is a rear top rear isometric view of the tunnel scanner of FIG. 1.
Figure 3:
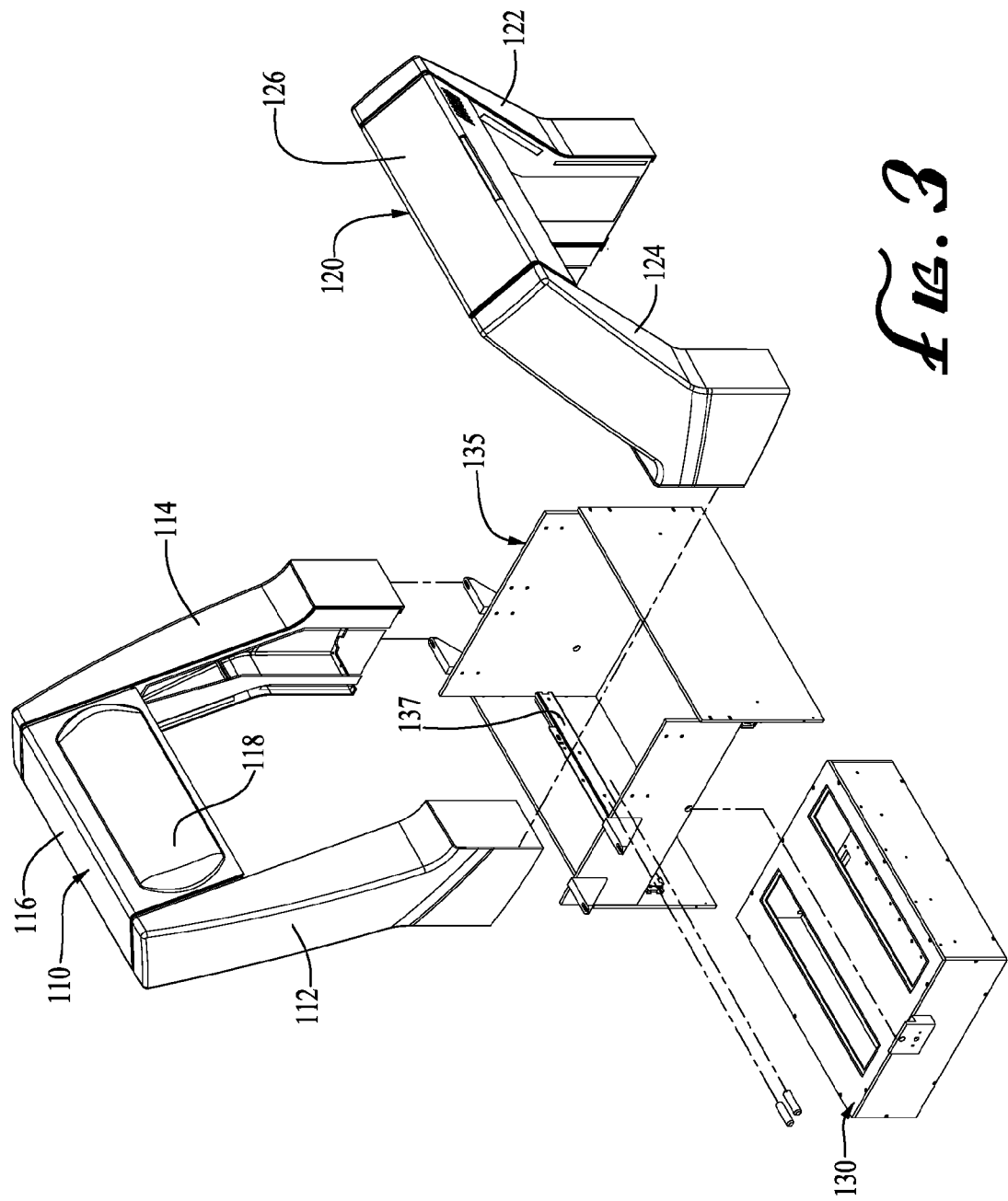
FIG. 3 is a partially exploded isometric view of the scanner of FIGS. 1-2.

FIGS. 1-3 illustrate a scanner 100 installed at a checkstand 5 such as may be used at a high-volume retail establishment such as a grocery store or big-box store. The checkstand 5 includes a base or stand 7 with a conveyor configuration with a front end section 11 and a rear end section 12. The conveyor section front end 11 has a feed-in or shelf portion 13 on which items may be laid prior to and in preparation for placing on the front conveyor section 15. The items are transported to the scanner 100 and through the read volume or read region generally defined by the confines of the front and rear scanner arches 110, 120 and the surfaces of the conveyor sections 15, 16. It is noted that there is a gap between the input or entry conveyor 15 and the exit conveyor 16 as will be described in more detail below. The input conveyor 15 may be described as on the upstream side of the scanner 100 and the exit conveyor 16 may be described as being on the downstream side of the scanner 100. After passing through the scanner 100, items are deposited by the exit conveyor 16 onto an optional roller or bagging area 17 where they are boxed, bagged or loaded onto a cart for removal by the customer. The lower section of the stand 7 is shown with a bottom of basket (BOB) detector 9 that detects items on the bottom shelf of a grocery basket. Such detection may be used to alert the customer and/or store personnel or to otherwise process items that are either large or bulky or potentially forgotten and left on the bottom shelf of the grocery basket/cart.

For general purposes of discussion, an item 20 (typically bearing a barcode to be scanned) is represented by a rectangular shaped six-sided polyhedron, such as a cereal box (hereinafter referred to as a box-shaped item or object) that may be passed through a read region of a data reader, such as for example the data reader 100 installed in a checkout stand 5 at a retail store (e.g., a supermarket). As to the description of the following embodiments, it should be understood that certain capabilities of the data reader 100 will be described with respect to reading sides of the box-shaped object 20 and that a checkout stand and conveyor described is an example transport structure for the checkstand discussed herein and should not be considered as limiting. The transport systems are generally described with respect to belt-type conveyor, but other conveyor/transport systems may be employed such as: inclined slides, vibratory conveyors, roller conveyors, turntables, blower systems (the items driven along a surface via a blower), combinations thereof, or other suitable transport systems.

For convenience of description, referring to FIG. 1, this box-shaped object 20 may be described with respect to its direction of travel 22 relative to the ability of the data reader 100 to read certain of the sides of the box-shaped object 20 being passed (as moved by the conveyors 15, 16) through the read volume defined by the front and rear scanner arches 110, 120 and the surfaces of the conveyors 15, 16. Referring to the orientation as illustrated, the box-shaped object 20 may be described as having a top side 26, a bottom side 28, and four lateral sides 30, 32, 34, and 36. The lateral sides may be referred to as the leading (or front lateral) side 30 (the side leading the object as it is passed through the read region), the trailing (or rear lateral) side 32 (the trailing side of the object as it is passed through the read region), the checker (or left lateral) side 34 (due to its proximity to a checkout clerk 38), and the customer (or right lateral) side 36 (due to its proximity to a customer 40). Since a use of this tunnel or portal scanner, in a preferred application, is to enable self-checkout, no checkout clerk may be required and the customer or user/operator may operate the scanner 100 from either side. The arbitrary side definitions are merely given to provide a frame of reference to facilitate written description. For example, the right and left sides shall be used with reference to the box 20. The customer side 36 or right lateral side may alternatively be described as a side oriented generally vertically facing the customer 40. The checker side 34 or left lateral side may alternatively be described as the side facing opposite the customer side 36. The front and rear lateral sides may be described as being disposed to one side of the arch legs in a direction perpendicular to the item direction 22.

The scanner 100 includes a front arch section 110 and a rear arch section 120. Though there may be some differences in the internal optical components housed within the arch sections, the external arch sections are preferably identical configurations. As shown in FIG. 3, the arch sections 110 and 120 are preferably attached to an understructure 135 for mounting to the counter section 10. Further as shown in FIG. 3, the under conveyor optics, as will be described in more detail below, are housed in a sliding drawer section 130 that slides out from the checkstand base 7 and is slidably mounted to the chassis section 135 on rails 137. Thus, all the optics, namely the optics in front arch section 110, rear arch section 120, and drawer section 130 are mounted and thus aligned on a common chassis 135. Front arch section 110 includes the right leg or post section 112 and the left leg or post section 114 such that when installed/assembled on the chassis 135 extend upward and diagonally forward or upstream relative to the conveyor with a front arch top section or cross arm 116 spanning between the arch leg sections 112, 114, thus forming an inverted U-shaped structure. The front arch top section 116 includes an enlarged or extension portion 118 to provide for enlarged interior space accommodating internal optics within the enlarged volume. The front arch sections 112, 114, 116 are essentially hollow for accommodating optics and other components. Similarly, the rear arch section 120 comprises an inverted U-shaped housing structure including a rear arch first leg section 122, a rear arch second leg section 124 and a rear arch top section or cross arm 126 spanning therebetween. The front arch section 110 and the rear arch section 120 are positioned back-to-back with the front arch section 110 being slanted forward and the rear arch section 120 being slanted rearward.

Advantageously over prior designs of a large rectangular enclosed box-shaped tunnel, the arch sections 110, 120 may be disassembled and stacked in a more compact package thus saving on shipping, staging and storage costs.

When assembled, the arch sections 110, 120 together form somewhat of a V or Y shape as shown in FIGS. 1-2 when viewed from the lateral side (e.g., from the vantage of the customer 40 or the checkout clerk 38) and thus produces an open and airy architecture that is more inviting and much less bulky than a large enclosed tunnel structure. The open architecture structure or configuration also provides sight lines for the customer to see customer's items passing through the read region. Nonetheless, access to items passing through the read region is still inhibited by the general structure thereby enhancing security. This V or Y-shaped structure with the dual arches produces this open architecture tunnel scanner, and at most may be described as semi-enclosed in contrast to an enclosed structure more akin to the airport carry-on luggage security checkpoint scanners.

Although the arch sections 110, 120 are illustrated as including an open space between them, the arch sections 110, 120 may be embodied in an elongated tunnel formed over or around the conveyors 15/16. The portal data reader 100 may thus be partially open and partially enclosed, such as the example illustrated in FIG. 1, or fully enclosed such as via a tunnel enclosure. The configuration of the dual arches 110, 120 creates an open architecture that provides some barrier/inhibition from a customer reaching into the read zone yet provide sight lines for allowing the customer to generally continuously observe items passing through the arches. A suitable portal scanner may be constructed with more or less openness than the one illustrated. Additionally, a suitable portal scanner may be constructed, for example, with a single arch that has similar functionality to the dual arch design described herein.

Though in the present descriptions the tunnel or portal scanner 100 may be described in greater detail as an optical code reader, the scanner 100 may alternately comprise an RFID reader, an image recognition reader, an optical code reader, or combinations thereof.

Internal read optics will now be described in more detail. As previously mentioned, internal read optics are disposed within (1) the arch leg sections 112, 114, 122, 124, (2) the upper arch sections 116, 126, and (3) the drawer section 130 forming in combination an open dual-arch structure which will nonetheless be referred to as a tunnel scanner. Though the detailed example configuration of the tunnel/portal scanner will be described as an imaging system comprised of fourteen cameras with each camera having multiple views, other reading system combinations may be employed including other imaging configurations, laser reading systems, combinations thereof, or even including RFID readers.

Figure 4:
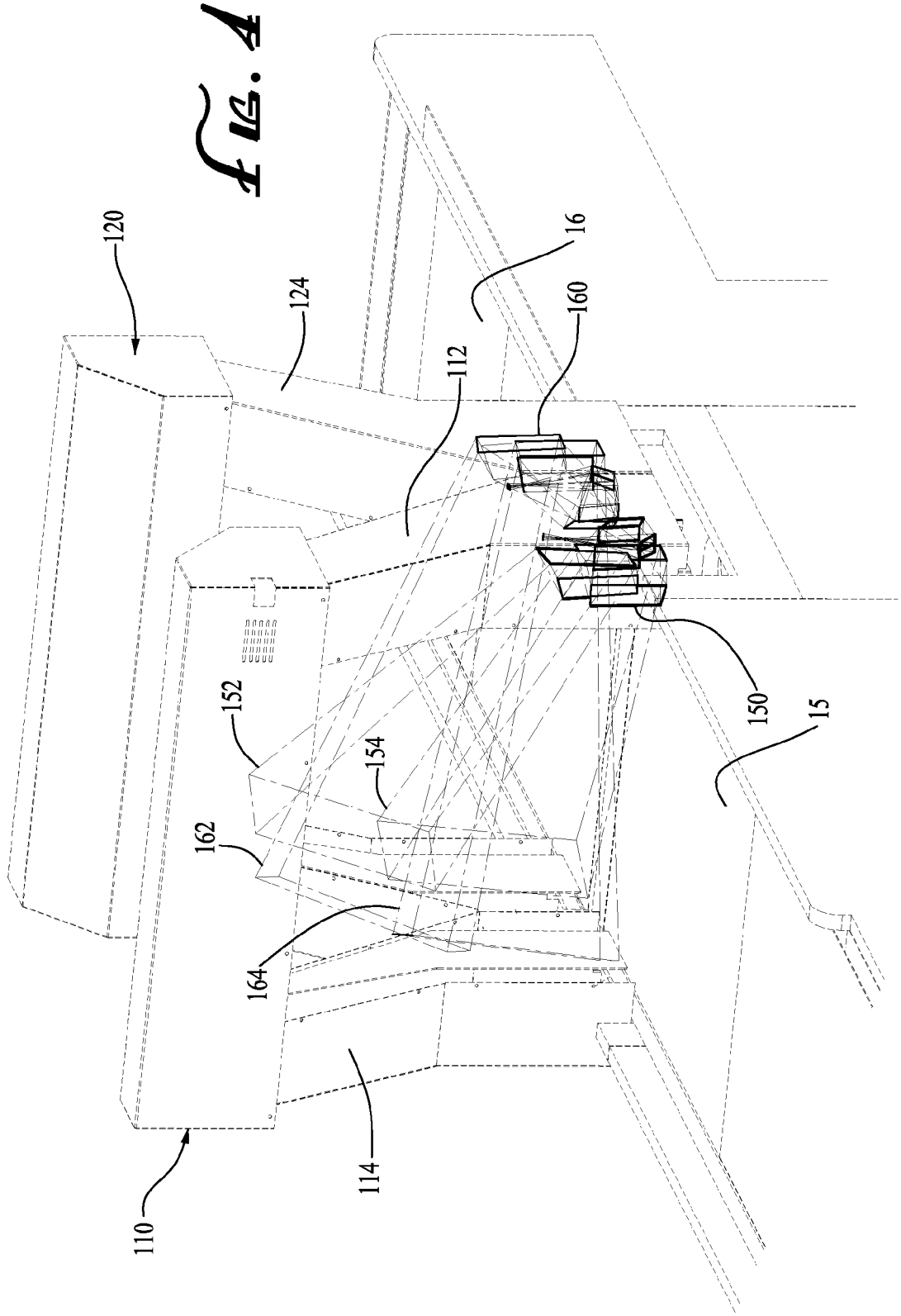
FIG. 4 is a front side isometric view of the scanner of FIG. 1 showing image views from the right side legs.

The reading function from the arch leg sections will be described first with respect to FIGS. 4-12. Turning to FIG. 4, an optic set 150, including a camera and mirrors, is disposed within the first leg section 112 of the front arch 110, producing an upper view segment or image path 152 and a lower view segment or image path 154 into the read region. The view segments 152, 154 are aimed or directed inwardly, upwardly and rearwardly into the read region for obtaining two-dimensional images of view of customer side 36 and trailing side 32 of the item passing through the read region. Similarly, an optic set 160, including a camera, is disposed in the second leg section 124 in the rear arch 120, the camera and mirror set producing two fields of view into the read region, namely an upper view segment or image path 162 and a lower view section or image path 164. The view segments 162, 164 are aimed or directed inwardly, upwardly and forwardly into the read region for obtaining two-dimensional images of view of customer side 36 and leading side 30 of the item passing through the read region.

Figure 5:
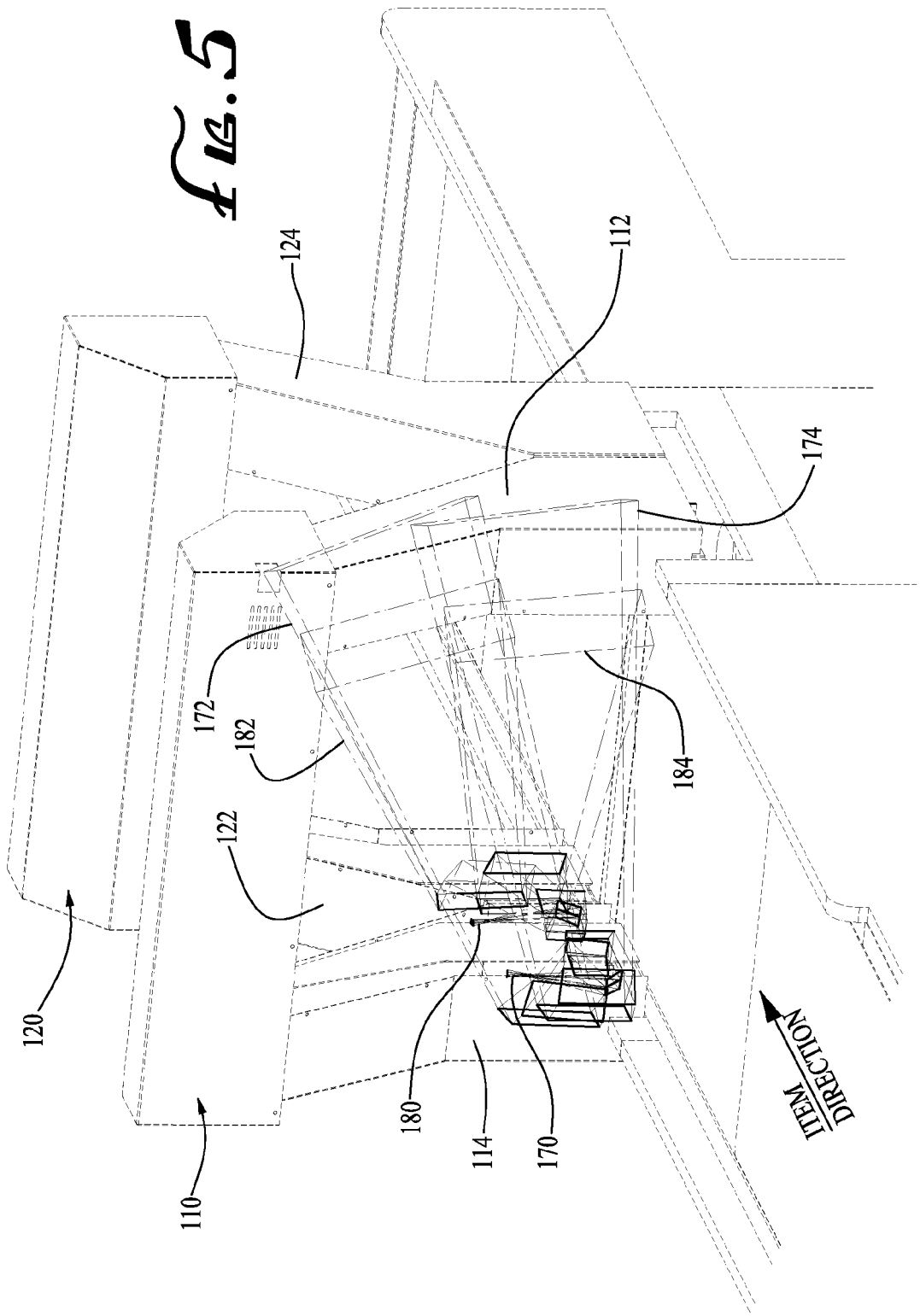
FIG. 5 is a front side isometric view of the scanner of FIG. 1 showing image views from the left side legs.

FIG. 5 illustrates similar configurations for the camera optics in the second leg 114 of the front arch 110 and the first leg section 122 of the rear arch 120. An optic set 170, including a camera and mirrors, is disposed within the second leg section 114 of the front arch 110, producing an upper view segment or image path 172 and a lower view segment or image path 174 into the read region. The view segments 172, 174 are aimed or directed inwardly, upwardly and rearwardly into the read region for obtaining two-dimensional image of view of checker side 34 and trailing side 32 of the item passing through the read region. Similarly, an optic set 180, including a camera and mirrors, is disposed in the first leg section 122 in the rear arch 120, the camera and mirror set producing two fields of view into the read region, namely an upper view segment or image path 182 and a lower view section or image path 184. The view segments 182, 184 are aimed or directed inwardly, upwardly and forwardly into the read region for obtaining two-dimensional image of view of checker side 34 and leading side 30 of the item passing through the read region.

Figure 6:
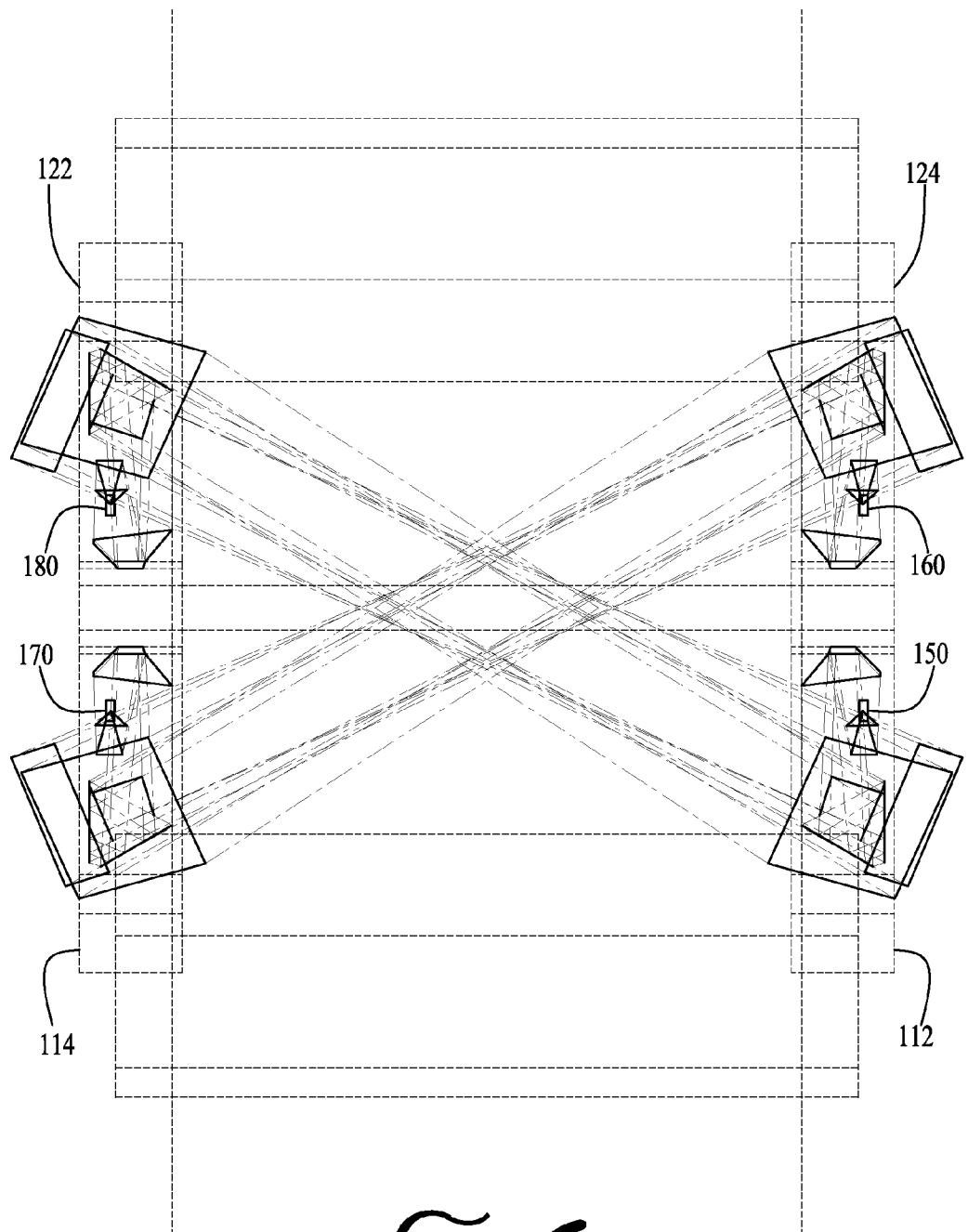
FIG. 6 is a top plan view of the scanner of FIG. 1 showing image views from the left and right side legs.

FIG. 6 is a diagram of a top view regarding the camera sections illustrated in FIGS. 4 and 5 and their crossing nature through the read region. Specifically, optic set 150 within the first leg section 112 of the front arch 110; the optic set 170 in the second leg 114 of the front arch 110; the optic set 160 in the second leg section of the rear arch 120; and the optic set 180 in the first leg section of the rear arch 120.

Details of the optic set and image view sections for the side leg sections will now be described with reference to optic set 180 in the first leg section 122 of the rear arch 120 and with respect to FIGS. 7-16. It should be understood that the description would be equally applicable to the other optic sets 150, 160, 170 adapted as needed to create image paths 152, 154, 162, 164, 172 and 174.

Figure 7:
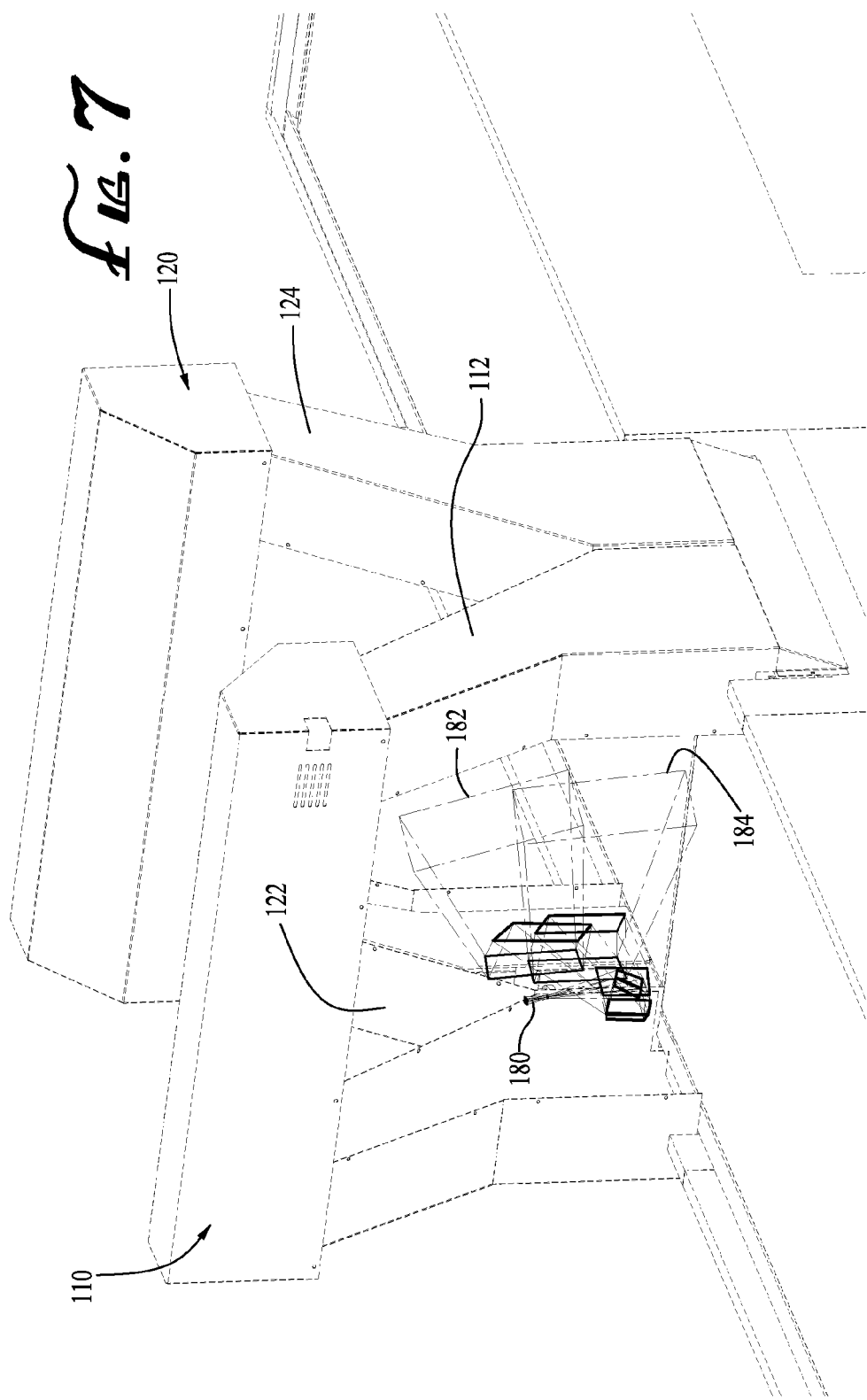
FIG. 7 is a front side isometric view of the scanner of FIG. 1 showing image views of the rear left side leg.
Figure 8:
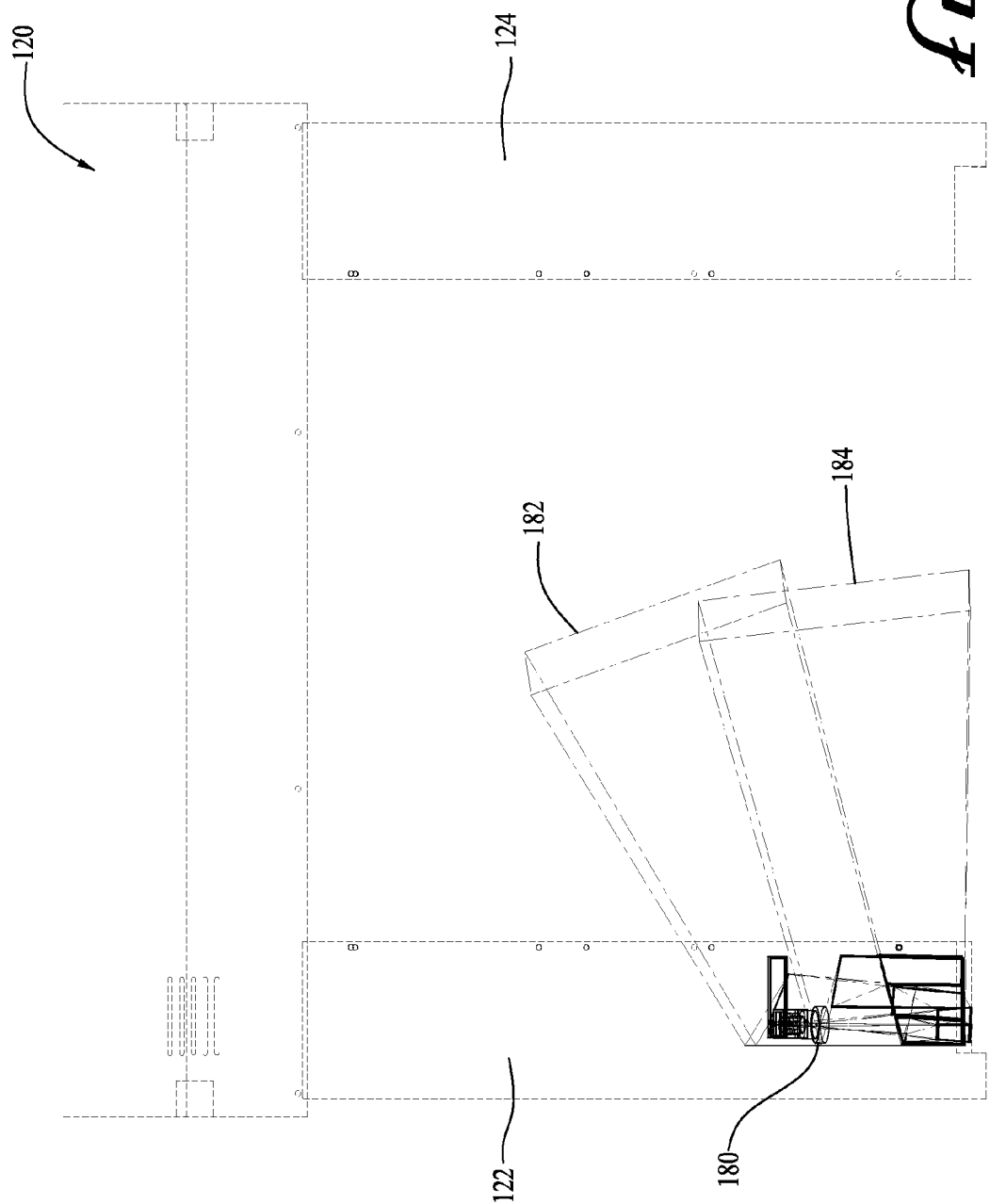
FIG. 8 front side elevation view of the scanner of FIG. 1 showing image views of the rear left side leg.
Figure 9:
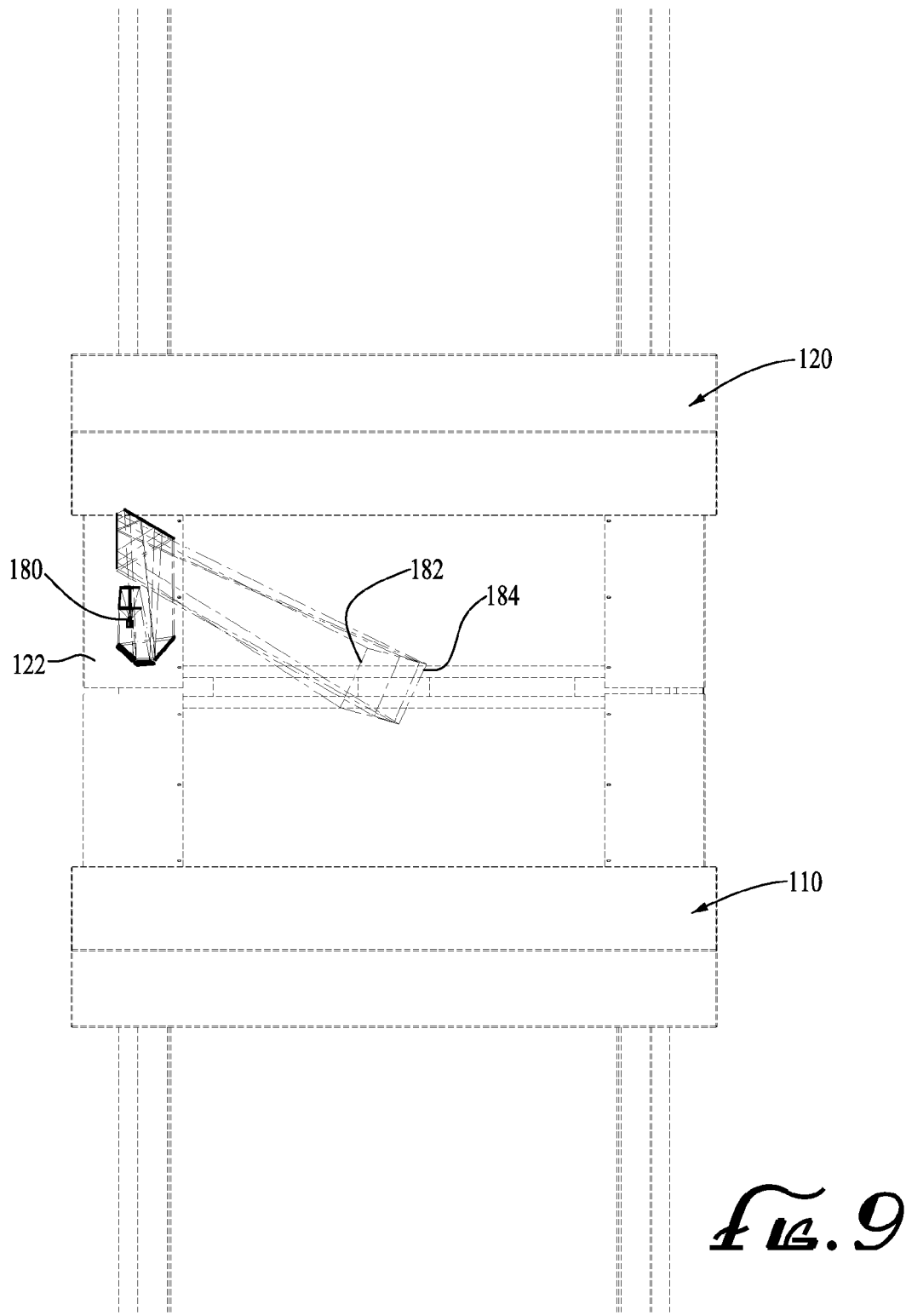
FIG. 9 is a top plan view of the scanner of FIG. 1 showing image views of the rear left side leg.

FIG. 7 is essentially a simplified version of FIG. 5 but showing only the optic set 180 in the first leg section of the rear arch 120, FIG. 8 is a front side view of the optic set 180, and FIG. 9 is a top view of the optic set 180. The optic set 180 (including a camera and mirror set) is disposed in the first leg section 122 in the rear arch 120, the camera and mirror set producing two fields of view into the read region, an upper view segment or image path 182 and a lower view section or image path 184. The view segments 182, 184 are aimed or directed inwardly, upwardly and forwardly into the read region for obtaining two-dimensional image of view of checker side 34 and leading side 30 of the item 20 passing through the read region.

Figure 10:
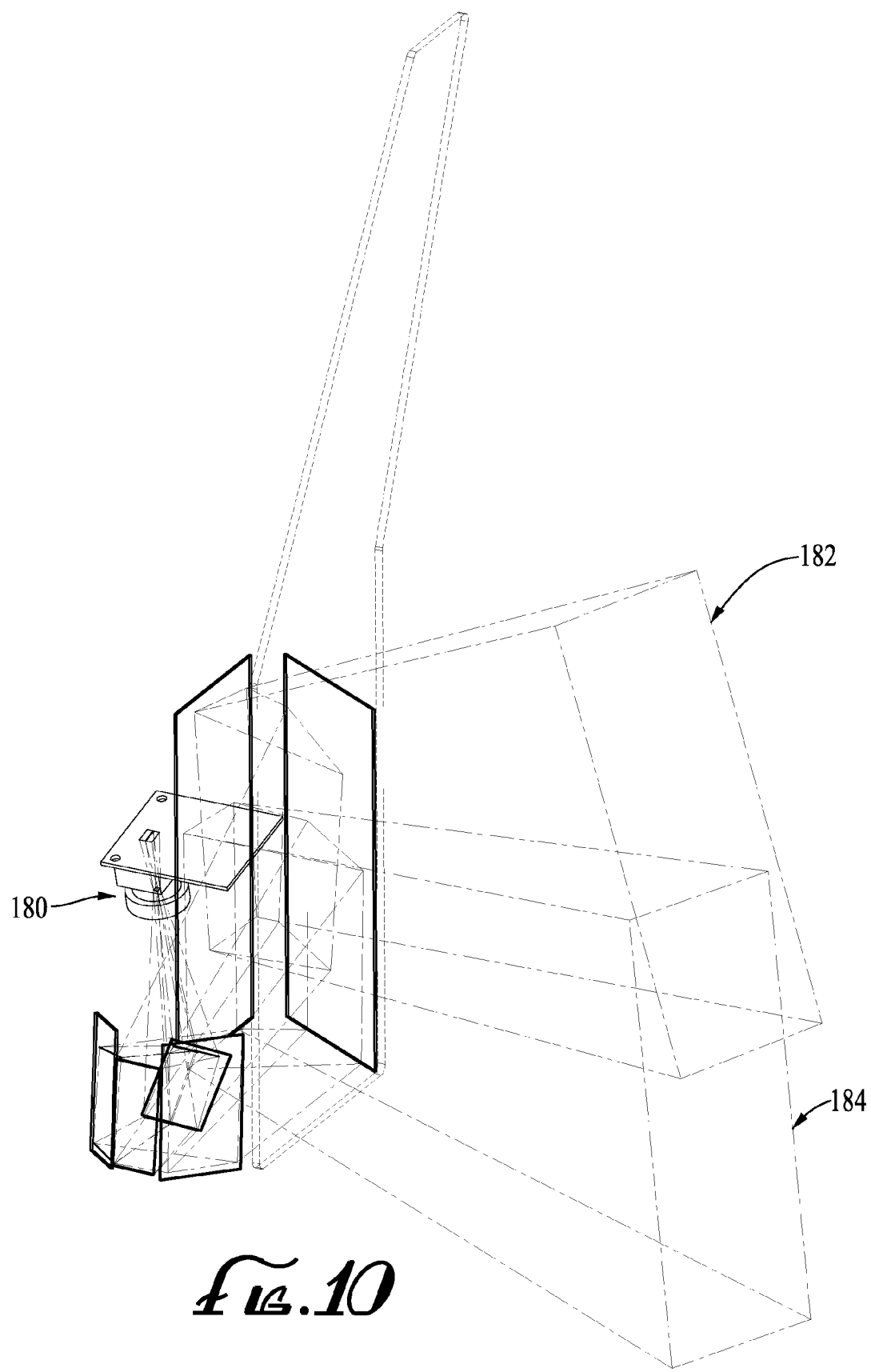
FIG. 10 is a diagrammatic front side isometric view of the optics set for forming the image views of the rear left side leg of FIGS. 7-9.
Figure 11:
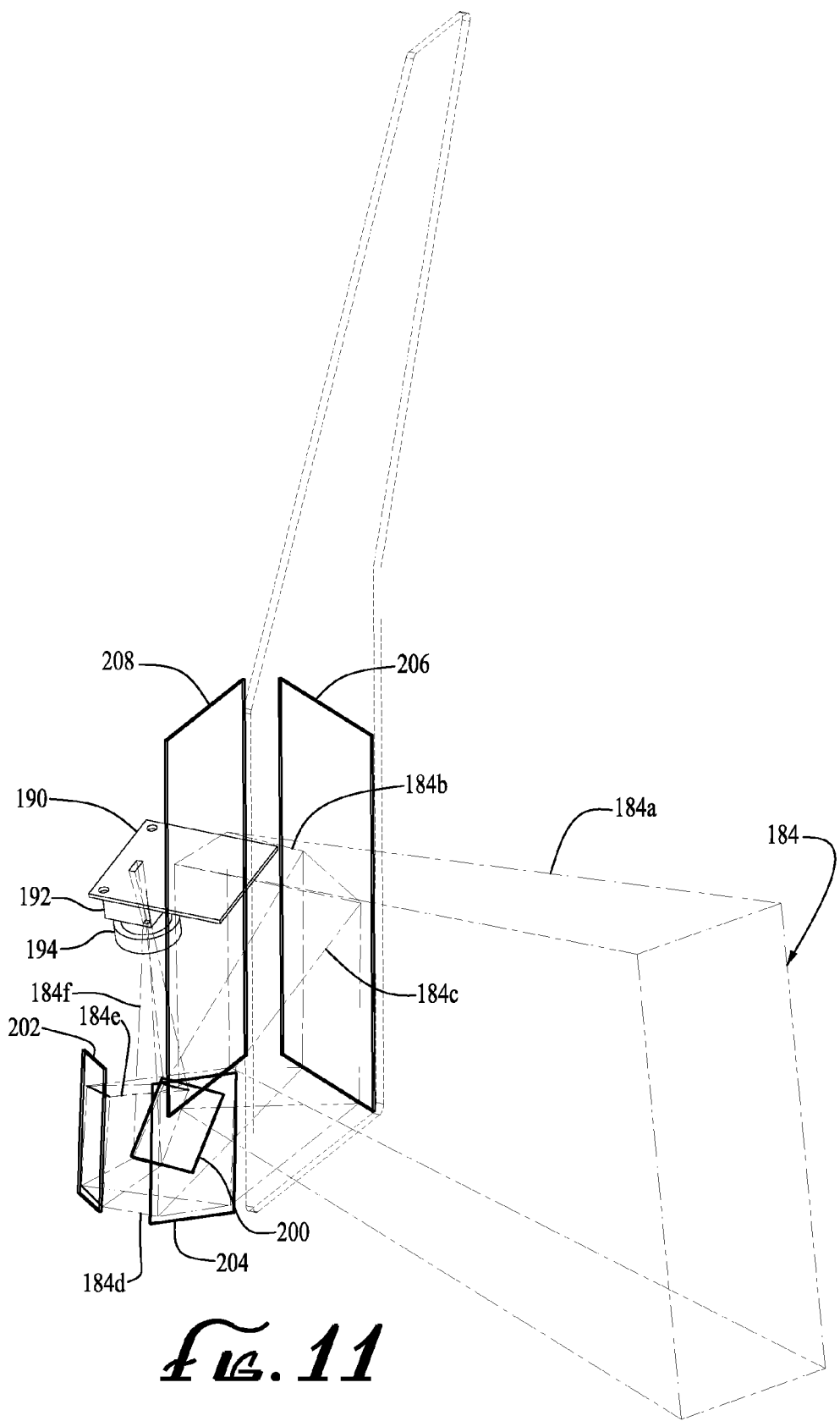
FIG. 11 is a detail of the optic set of FIG. 10 illustrating the lower image view.

FIG. 10 illustrates both the upper view segment 182 and the lower view segment 184 produced from the optics set 180. FIG. 11 illustrates details of the optic set 180 that produces the lower view segment 184. Optic set 180 includes the camera along with the mirror sets. The camera comprises an imager 192 mounted on an image board (PCB) 190 and the focusing lens 194 for focusing the incoming image onto the imager 192.

Both the upper and lower image segments 182, 184 are imaged by the same camera onto a common imager. In a preferred embodiment, the image segments 182, 184 are focused onto different regions of the image array. For purposes of description, each individual mirror component will be identified with a unique identifying numeral (e.g., mirror 208) however in parentheses after certain of these numerals a mirror designation will be at times provided in the form of $M_1$, $M_2$, $M_3$, etc. to describe the mirror reflection order for that optical set. For a particular image acquisition sequence, the designation $M_1$ would be the first mirror closest to the imager reflecting the image directly to the imager or imaging lens, $M_2$ would be the second mirror which would direct the image to $M_1$, third mirror $M_3$ would be the mirror which directs the image to second mirror $M_2$, etc. Thus for an example five mirror system ($M_1$-$M_5$), the image from the read region would be reflected first by the fifth mirror $M_5$, which in turn reflects the image to fourth mirror $M_4$, which in turn reflects the image to third mirror $M_3$, which in turn reflects the image to second mirror $M_2$, which in turn reflects the image to first mirror $M_1$, which in turn reflects the image onto the imager.

Turning to FIG. 11 (and using this $M_1$, $M_2$, $M_3$, etc. naming convention), the image view segment 184 comprises the first view 184a which is reflected by mirror 208 ($M_5$) with image segment 184b then being reflected by mirror 206 ($M_4$) with image segment 184c then being reflected by mirror 204 ($M_3$) as image segment 184d which is in turn reflected by mirror 202 ($M_2$) from which view segment 184e is then reflected by mirror 200 ($M_1$) with image segment 184f then being focused by lens set 194 onto the imager 192. The lens set 194 may include an aperture and one or more lens elements.

Figure 12:
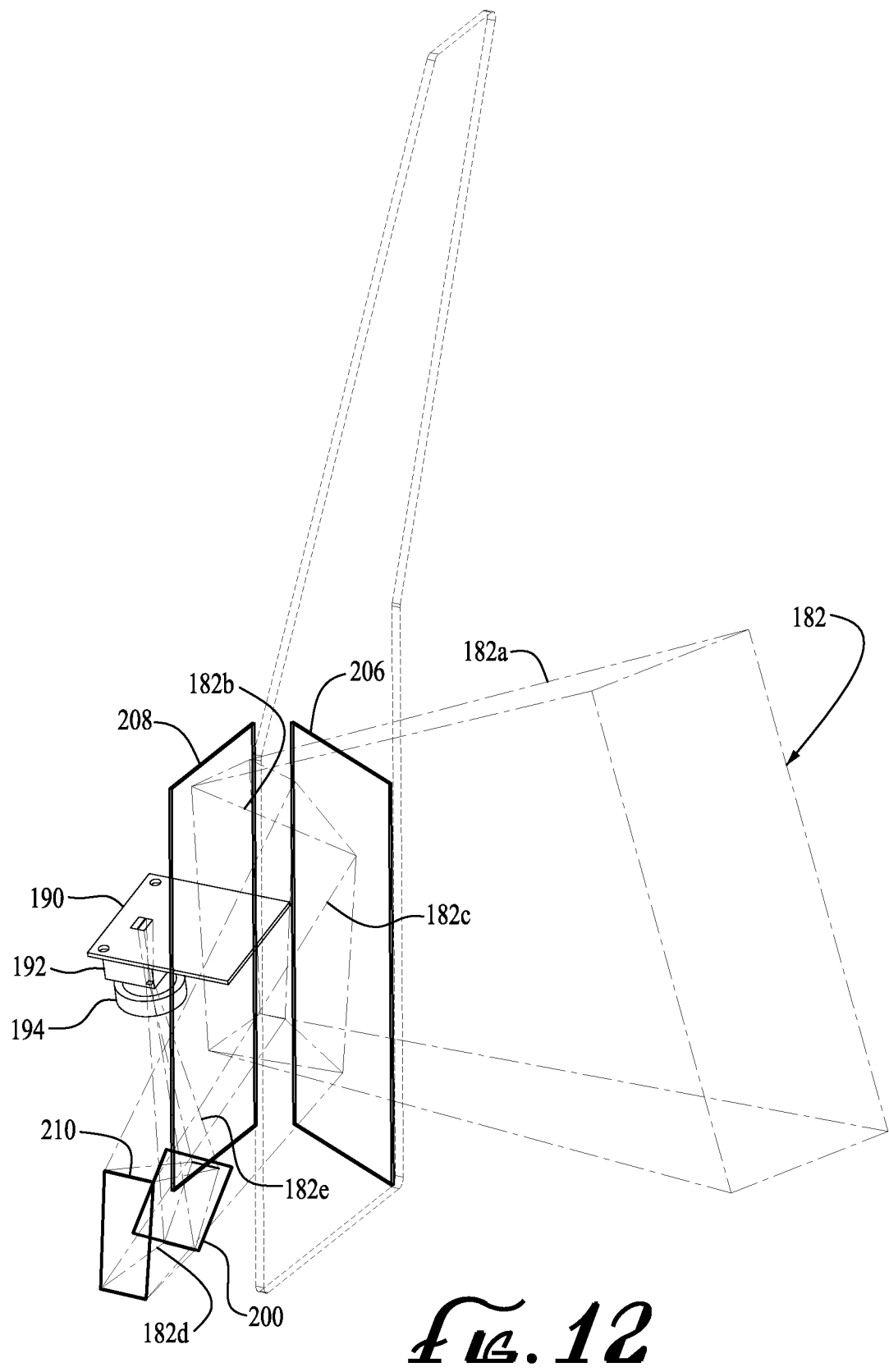
FIG. 12 is a detail of the optic set of FIG. 10 illustrating the upper image view.

In similar fashion with respect to FIG. 12, the view segment 182 has a first image view segment 182a which reflects off mirror 208 ($M_4$). It is noted that mirror 208 producing the upper image view 182 is designated as $M_4$ whereas in FIG. 11 for the lower view segment 184 mirror 208 is designated as mirror $M_5$ according to the convention. The image then reflects off of mirror 208 ($M_4$) with segment 182b then reflecting off of mirror 206 ($M_3$) with image segment 182c then being reflected off of mirror 210 ($M_2$) with image segment 182d then reflecting off of mirror 200 ($M_1$) which then reflects image segment 182e back to imaging lens 194 and onto (a region of) the imager 192.

Figure 13:
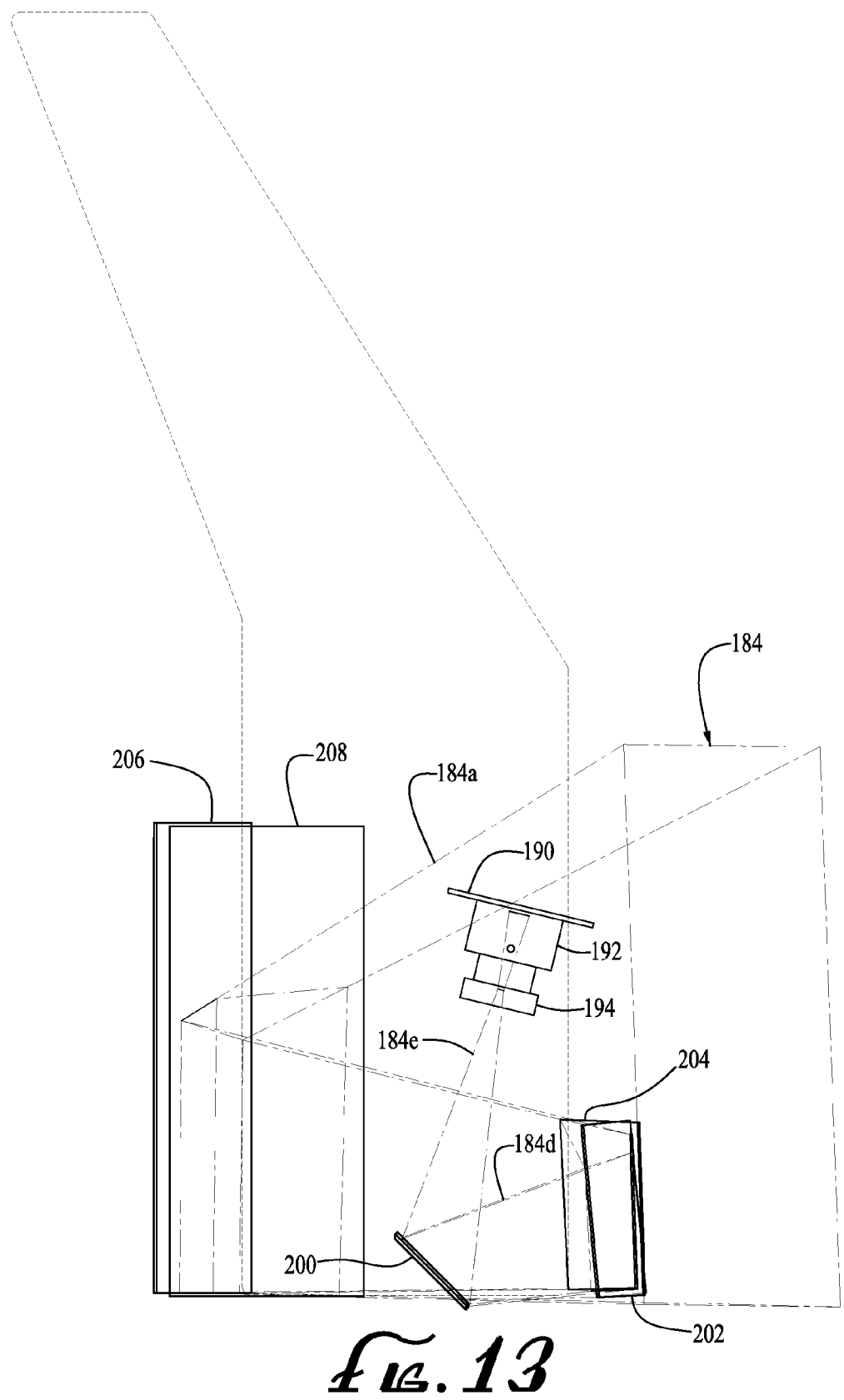
FIG. 13 is a right side elevation view of the optic set of FIG. 11 illustrating the lower image view.
Figure 14:
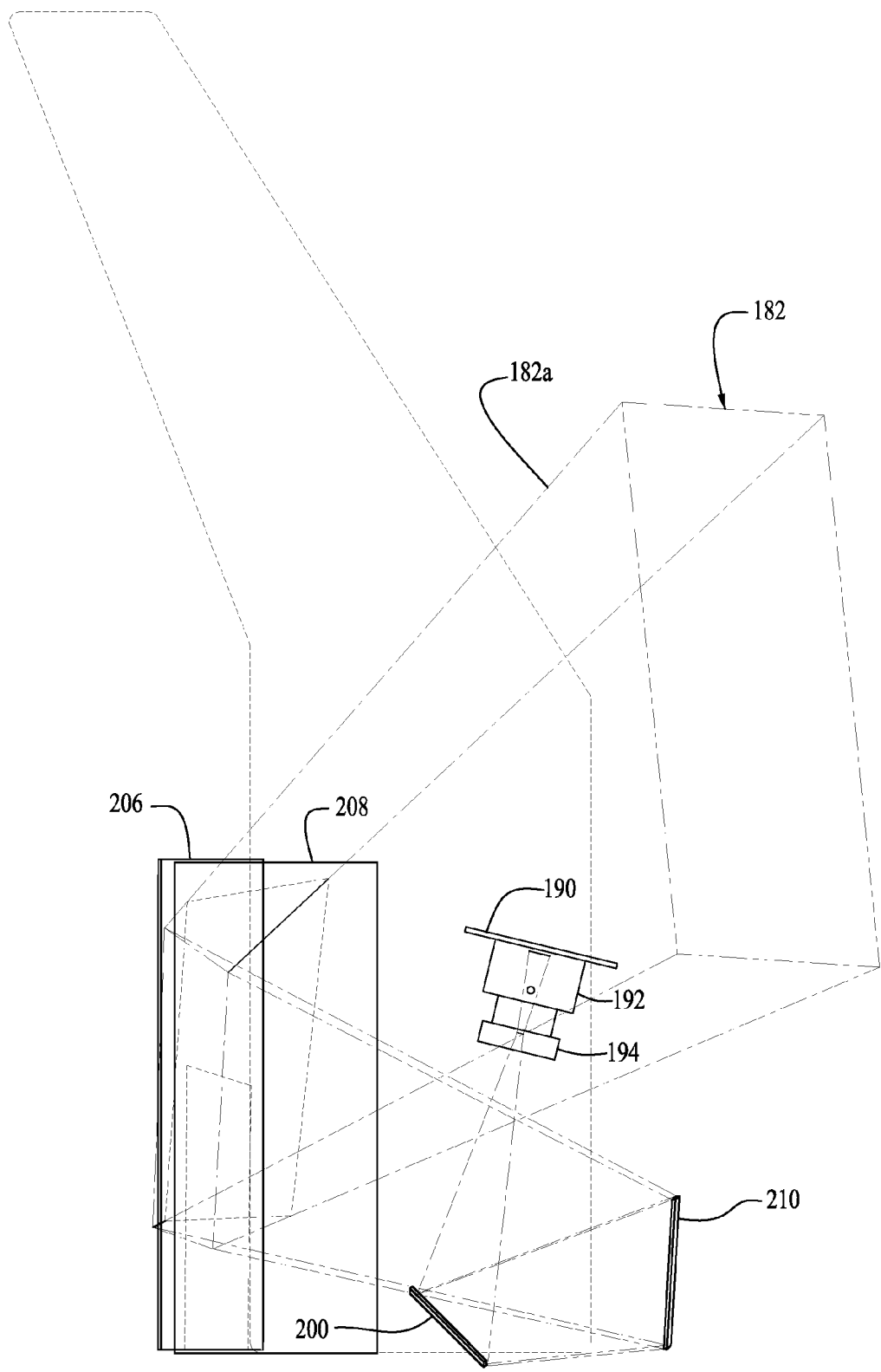
FIG. 14 is a right side elevation view of the optic set of FIG. 12 illustrating the upper image view.

FIGS. 13 and 14 are respective side views of the side leg imagers of optic set 180 with FIG. 13 illustrating the view path for image segment 184 and FIG. 14 illustrating the view path for image segment 182. The elements are the same as described in relation to FIGS. 11-12. FIGS. 13-14 well illustrate the orientation of the first mirror 200. It is noted here that the mirror 200 is a common mirror for both image views 182 and 184 with one side of the mirror 200 reflecting the image view 182 and the other side of the mirror 200 reflecting image view 184.

Figure 15:
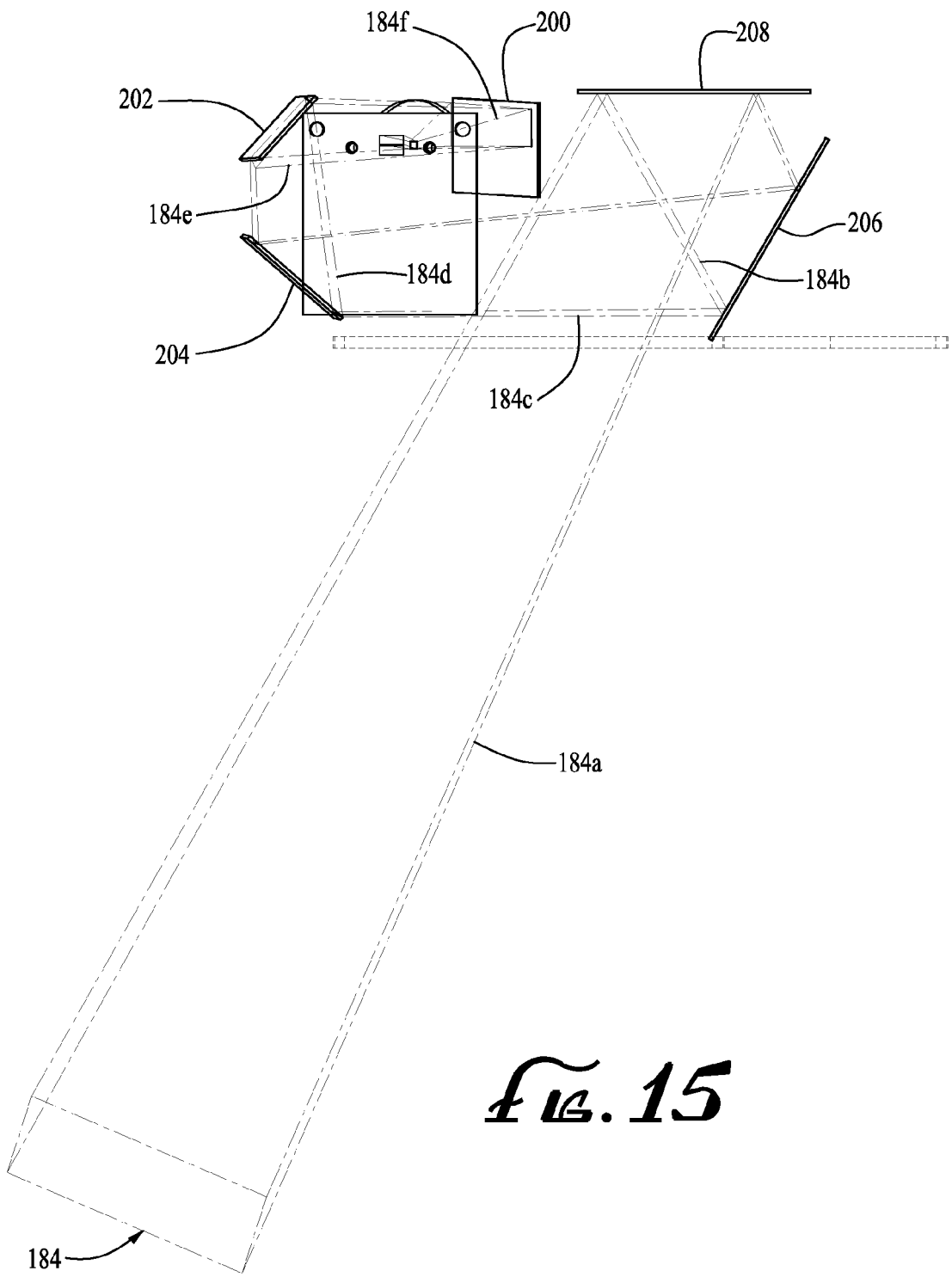
FIG. 15 is a top view of the optic set of FIG. 11 illustrating the lower image view.
Figure 16:
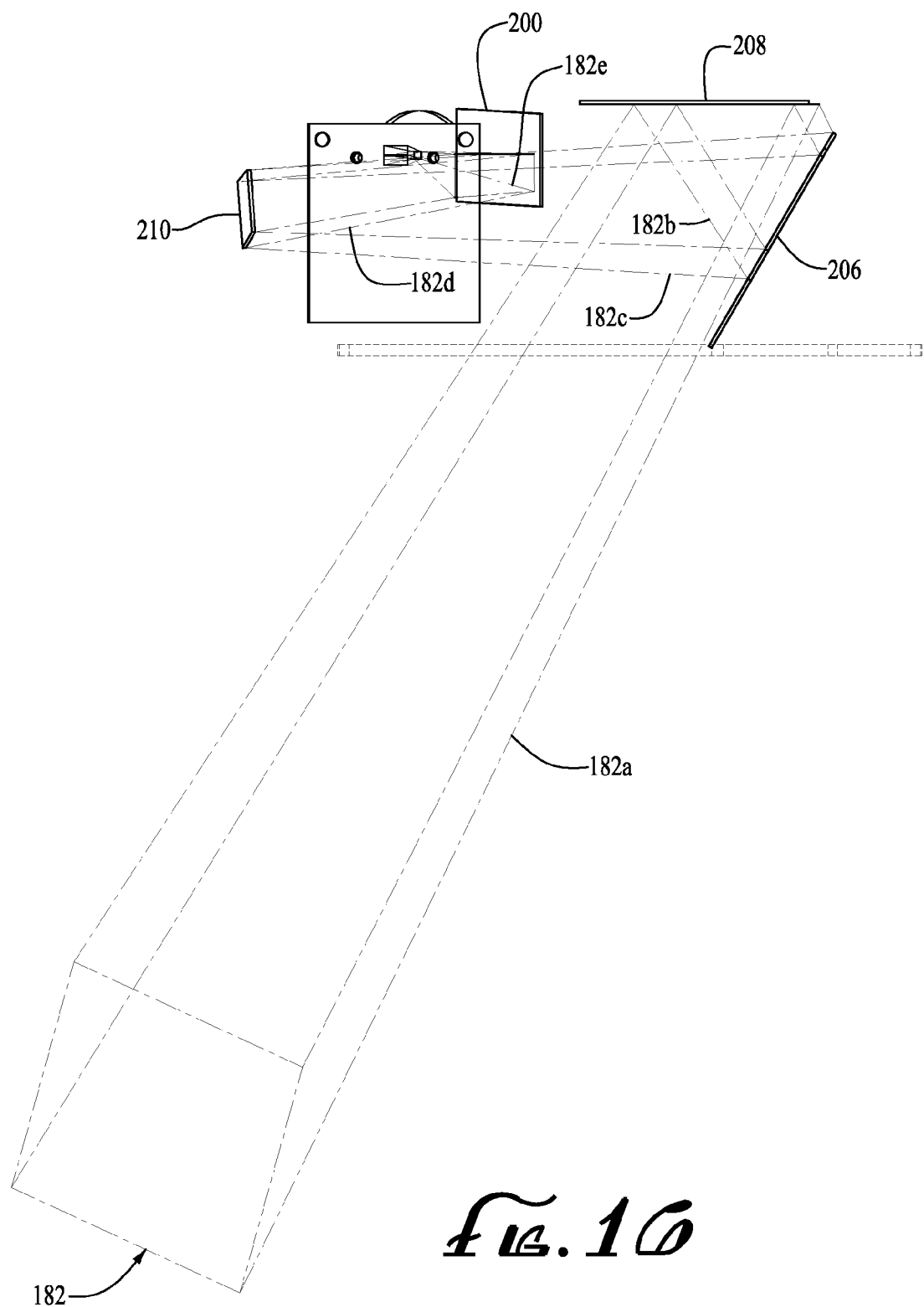
FIG. 16 is a top view of the optic set of FIG. 12 illustrating the upper image view.
Figure 17:
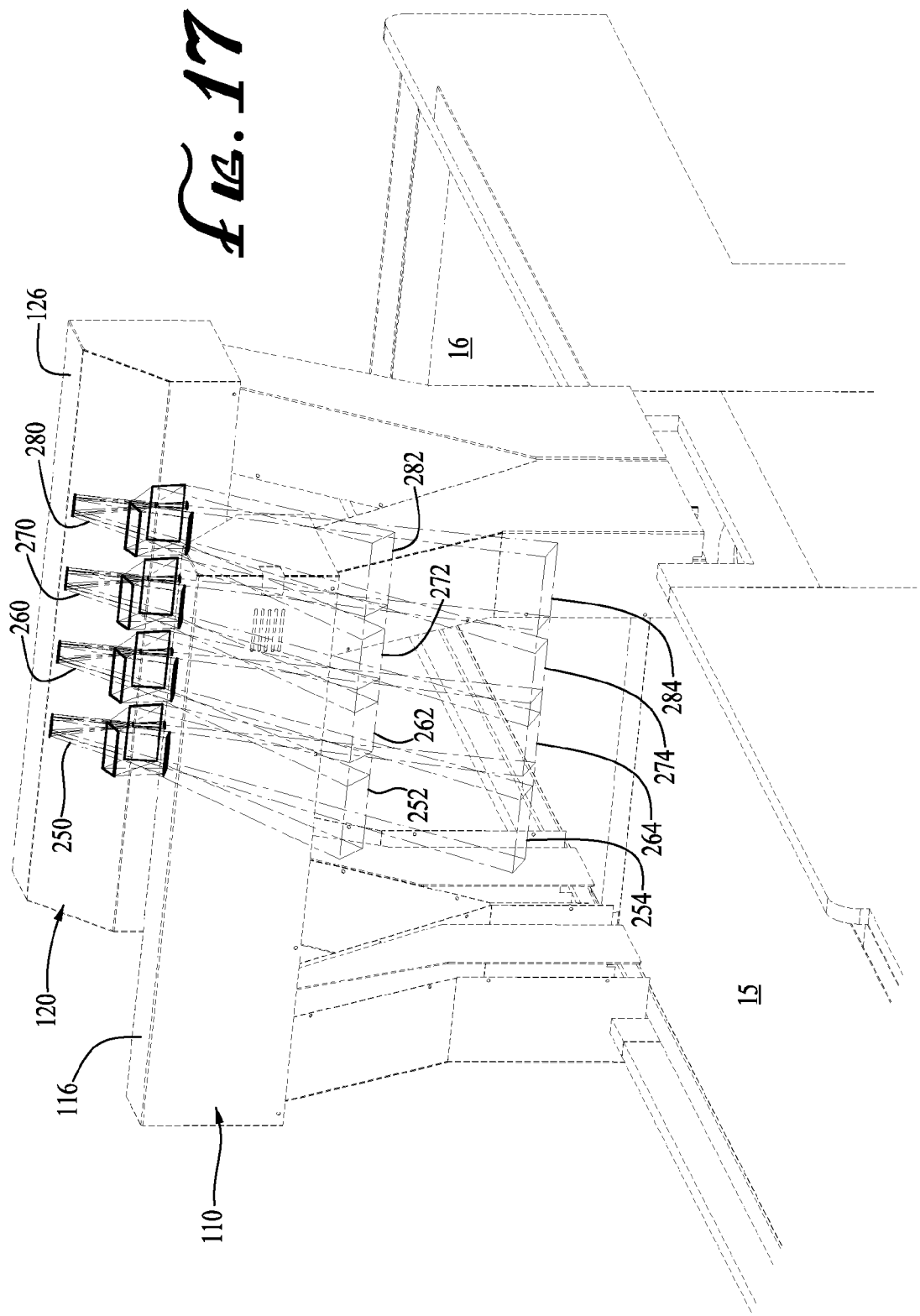
FIG. 17 is a front side isometric view of the scanner of FIG. 1 showing image views from the rear arch top section.

FIGS. 15 and 16 are respective top views of the side leg optic set 180 with FIG. 15 illustrating the lower view segment 184 and FIG. 16 illustrating the upper view segment 182. As shown in FIGS. 15 and 13, the image view segment 184 comprises the first image segment 184a which is reflected by mirror 208 ($M_5$) with image segment 184b then being reflected by mirror 206 ($M_4$) with image segment 184c then being reflected by mirror 204 ($M_3$) as image segment 184d which is in turn reflected by mirror 202 ($M_2$) from which view segment 184e is then reflected by mirror 200 ($M_1$) with image segment 184f then being focused by lens 194 onto the imager 192 on image board 190. As shown in FIGS. 16 and 14, the view segment 182 has a first image view segment 182a which reflects off mirror 208 ($M_4$) (it is noted that mirror 208 producing the upper image view 182 is designated as $M_4$ whereas in FIG. 11 for the lower view segment 184 mirror 208 is designated as mirror $M_5$). The image then reflects off of mirror 208 ($M_4$), then with image segment 182b reflecting off of mirror 206 ($M_3$), then with image segment 182c being reflected off of mirror 210 ($M_2$), then with image segment 182d reflecting off of mirror 200 ($M_1$), which then reflects image segment 182e back to imaging lens and onto (another region of) the imager on image board 190. It is noted in a preferred construction that the upper view segment 182 is focused onto a first region of the imager 192 and the lower view segment 184 is focused onto a second (different) region of the imager 192.

FIGS. 17-22 illustrate optic sets and read regions for the top down reading sections out of the front arch top section 116 and the rear arch top section 126. Specifically in FIG. 17 the rear arch top section 126 includes optic sets 250, 260, 270, 280. Each of these optic sets includes a camera and respective reflecting mirrors for producing an upper view segment or image path and a lower view segment or image path. Specifically optic set 250 produces an upper view segment 252 and a lower view segment 254 that project onto regions of a common imager of the camera. The views of the upper and lower view segments 252, 254 are directed downward from the rear arch 120 and forwardly for reading optical codes on the leading side 30 and top side 26 of the item 20 passing through the read region. Similarly, optic set 260 produces an upper view segment 262 and lower view segment 264; optic set 270 produces an upper view segment 272 and a lower view segment 274; and optic set 280 produces an upper view segment 282 and a lower view segment 284. It is noted that these view segments, for example, view segments 252, 262, 272, 282 are arranged side by side and overlapping to (collectively) provide a continuous image view width-wise across the read region. It is noted that the upper view segments 252, 262, 272, 282 are at a more forwardly facing angle than the lower view segments 254, 264, 274, 284.

Figure 18:
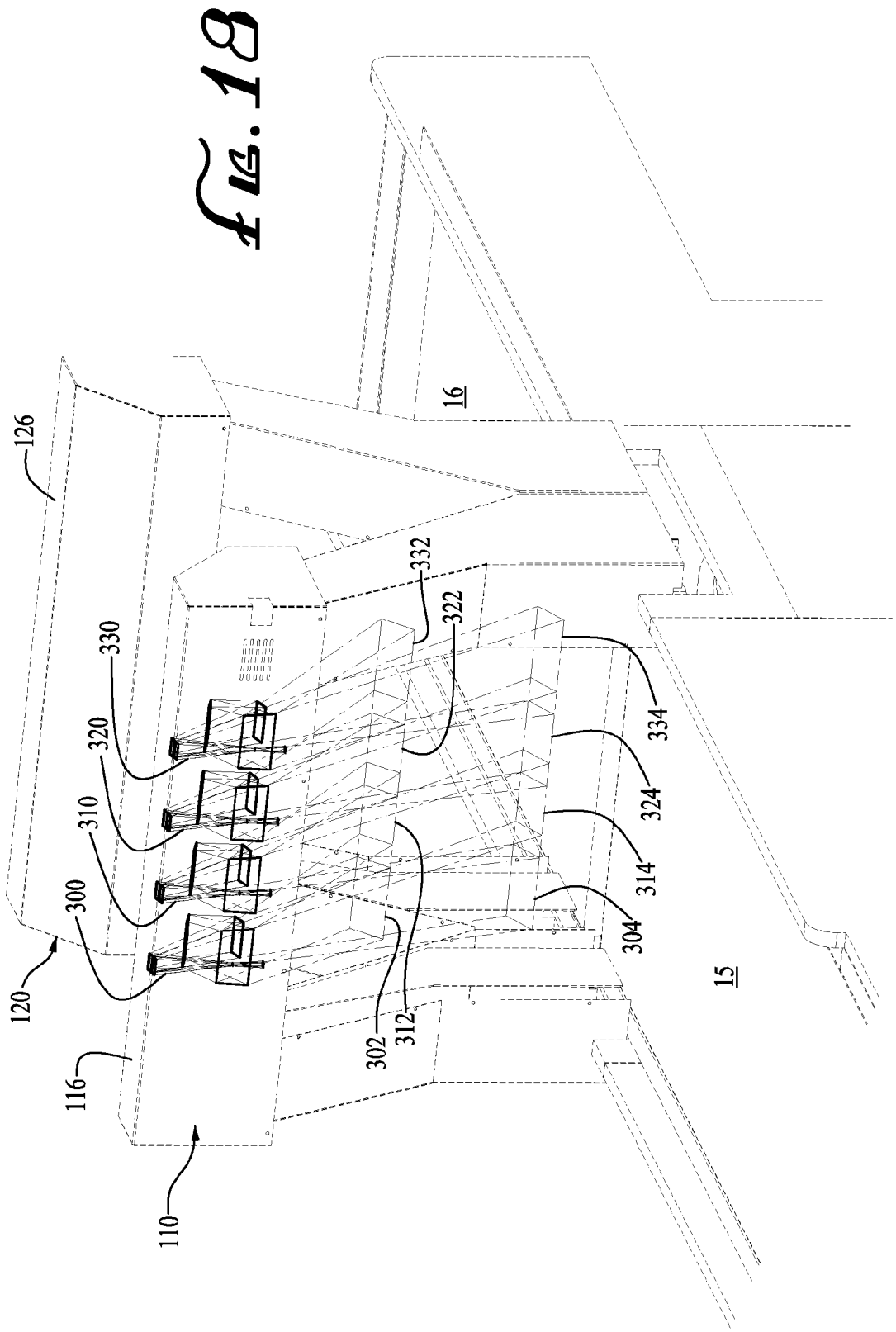
FIG. 18 is a front side isometric view of the scanner of FIG. 1 showing image views from the front arch top section.
Figure 19:
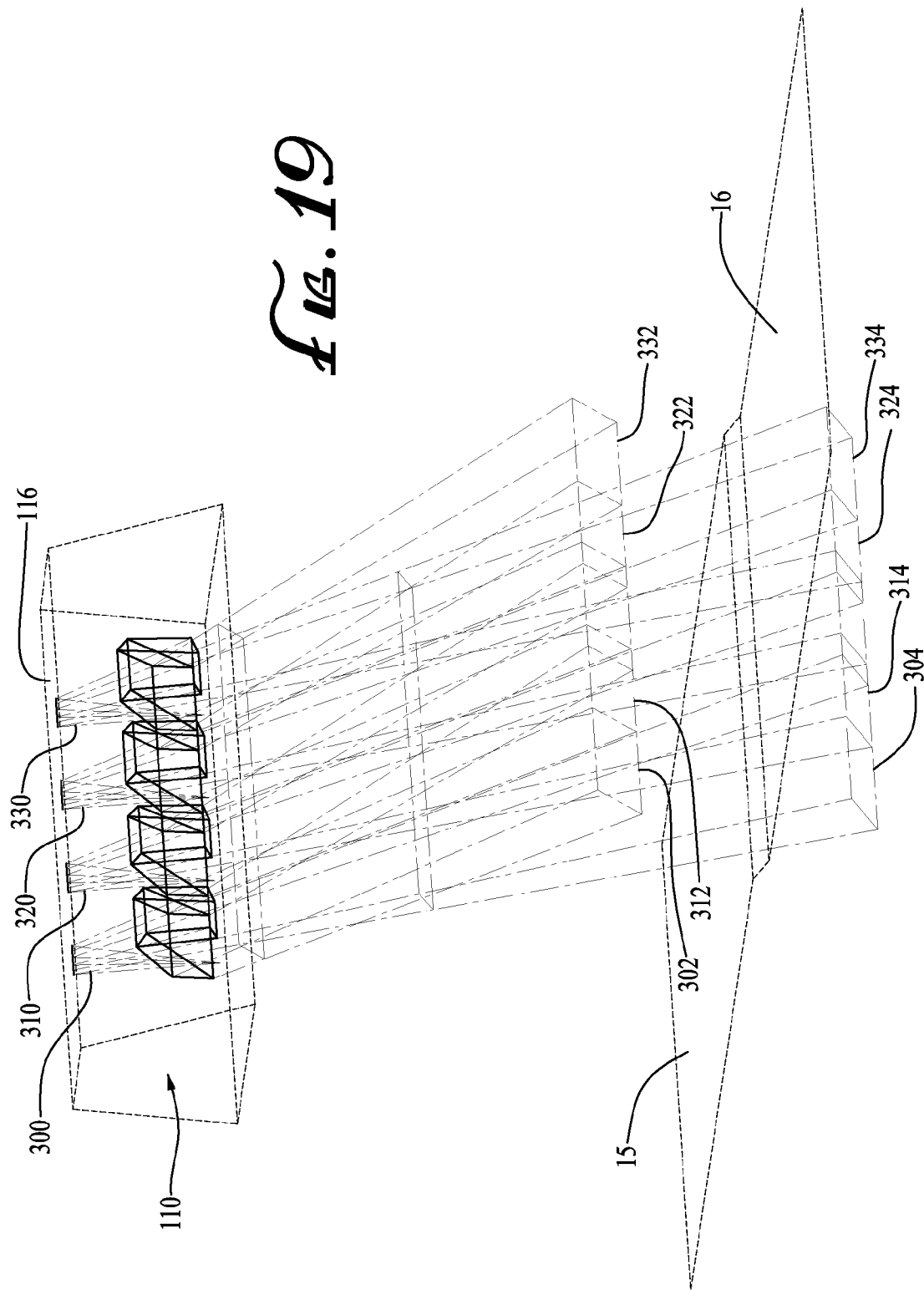
FIG. 19 is a rear isometric view of the scanner of FIG. 1 (with side legs and rear arch removed) showing image views from the front arch top section.
Figure 20:
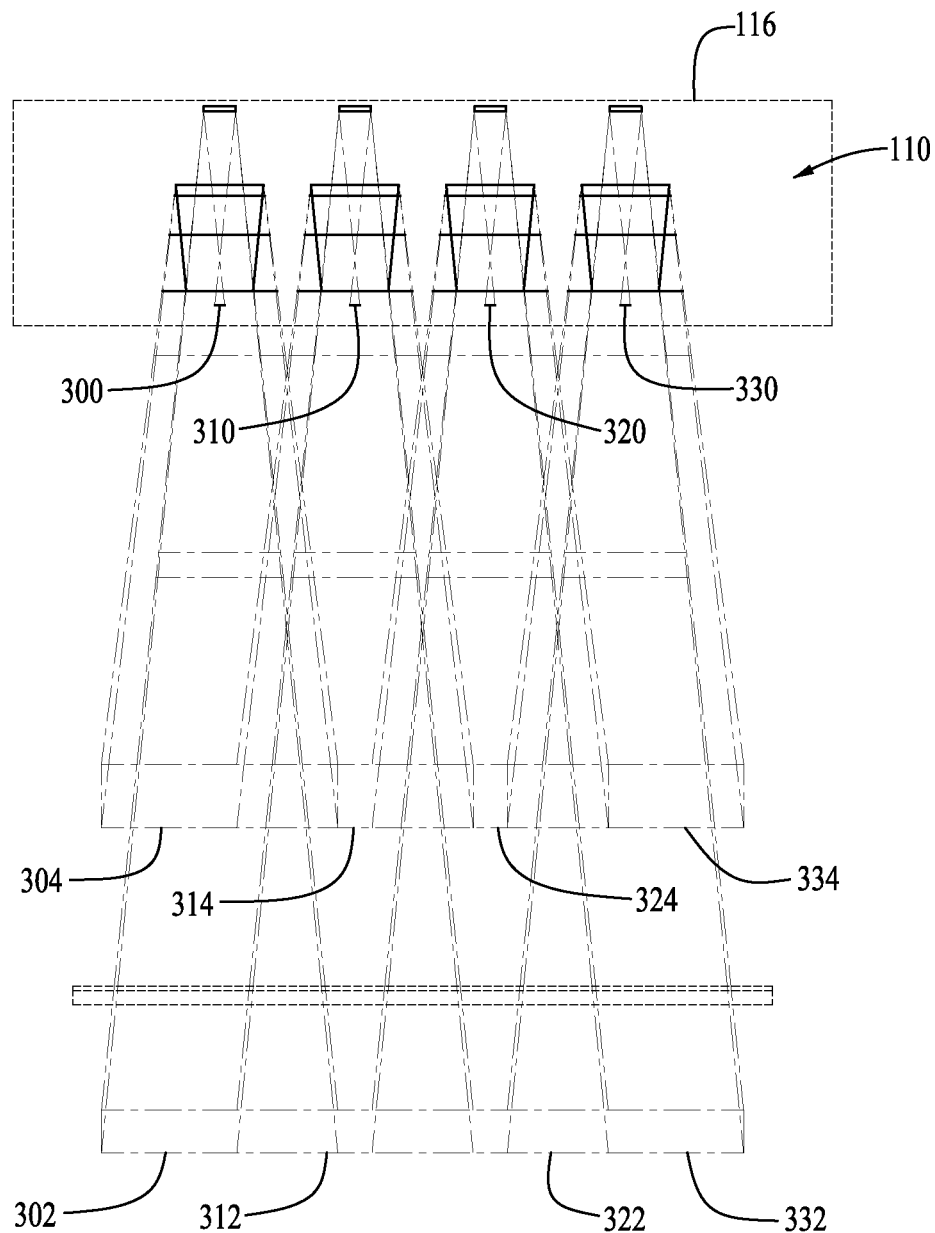
FIG. 20 is a front side elevation view showing the images views of the front arch top section of FIG. 19.

In similar fashion, as shown in FIGS. 18-20, a set of four optic sets 300, 310, 320, 330 are disposed in the top arch section 116 of the front arch 110. Specifically, the front arch top section 116 includes optic sets 300, 310, 320, 330. Each of these optic sets includes a camera and respective reflecting mirrors for producing an upper view segment or image path and a lower view segment or image path. Specifically optic set 300 produces an upper view segment 302 and a lower view segment 304 that project onto regions of a common imager of the camera. The views of the upper and lower view segments 302, 304 are directed downward from the front arch 110 and rearwardly for reading optical codes on the trailing side 32 and top side 26 of the item 20 passing through the read region. Similarly, optic set 310 produces an upper view segment 312 and lower view segment 314; optic set 320 produces an upper view segment 322 and a lower view segment 324; and optic set 330 produces an upper view segment 332 and a lower view segment 334. It is noted that these view segments, for example, view segments 302, 312, 322, 332 are arranged side by side and overlapping to (collectively) provide a continuous image view width-wise across the read region. It is noted that the upper view segments 302, 312, 322, 332 are at a more rearwardly facing angle than the lower view segments 304, 314, 324, 334.

Details of the optic set and image view sections for each of the top arch sections 116, 126 will now be described with respect to optic set 330, and with reference to FIGS. 21-22. It should be understood that the description would be equally applicable to the other optic sets 300, 310, 320 in the top section 116 of the front arch 110 as well as the optic sets 250, 260, 270, 280 in the rear arch top section 126.

Figure 21:
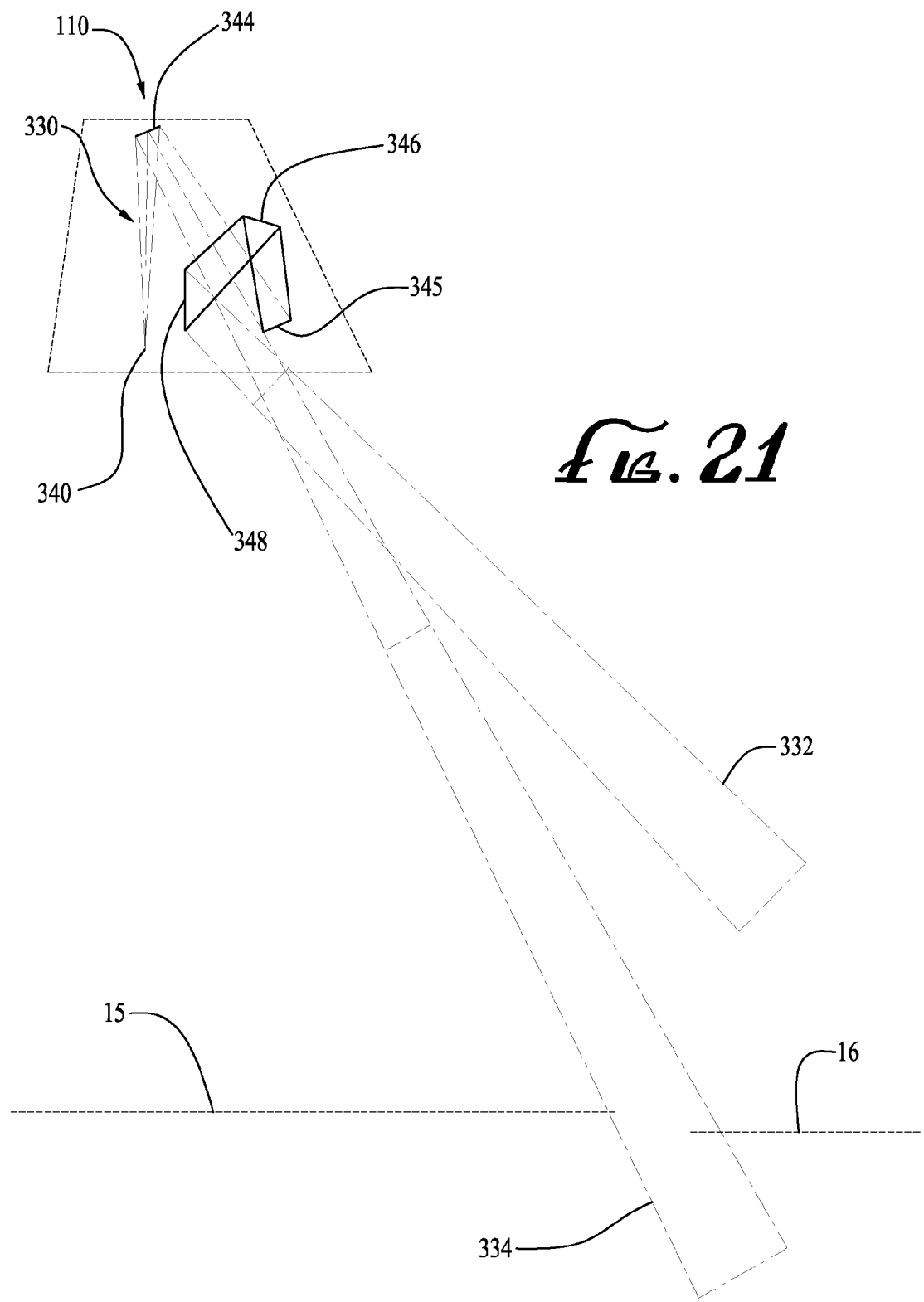
FIG. 21 is a left side diagrammatic view showing the optic set and images views of the front arch top section of FIG. 19.
Figure 22:
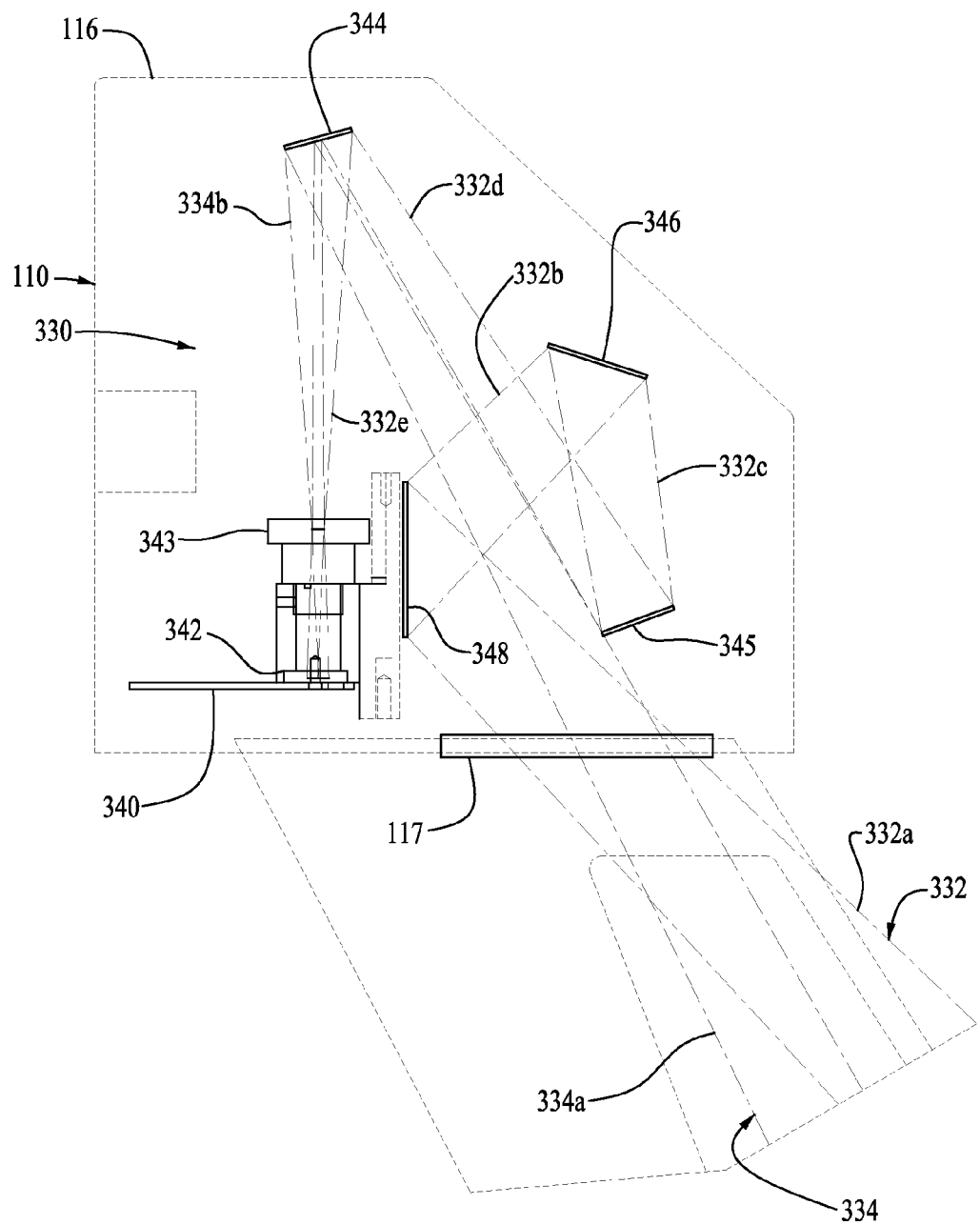
FIG. 22 is a detailed view of the optic set of the front arch top section of FIG. 21.

FIG. 21 is a diagrammatic view primarily for showing the general direction of the upper view segment 332 relative to the lower view segment 334. FIG. 22 is a diagrammatic view of the optic set 330 as shown in FIG. 21 but on an enlarged scale with greater detail. Optic set 330 includes a camera comprised of an imager 342 mounted on an imager board 340 and a lens set 343 including an aperture for focusing an incoming image onto the imager 342. The lower image view 334 includes the first image segment 334a which is reflected by a first mirror 344 ($M_1$) downwardly to the lens set 343 where the image is captured on a region of the imager 342. Thus the image view 334 is produced by a single reflection. As visible in the diagrams of FIGS. 21-22, the image section 334a is on one side (the left side) of the mirror 344.

The upper image view 332 is produced by a four mirror reflection sequence. The upper image view 332 includes a first image view segment 332a which is reflected by a first mirror 348 ($M_4$), with second view segment 332b then being reflected by second mirror 346 ($M_3$), with image segment 332c then reflected by third mirror 345 ($M_2$), with image view segment 332d then reflected by mirror 344 ($M_1$), with image segment 332e then focused by lens set 343 onto a region of imager 342. The mirror 344 is a reflection mirror common to both the upper image view 332 and the lower image view 334. The reflection portions of the mirror 344 for each of the respective image views may be separate, but alternately may be overlapping. It is noted in a preferred construction that the upper image view 332 is focused onto a first region of the imager 342 and the lower image view 334 is focused onto a second (different) region of the imager 342. Alternately, the mirror 344 may be divided into separate mirrors, each of those separate mirrors providing the $M_1$ mirror function. A window 117 is optionally provided in the lower surface of the arch section 116 for permitting passage of the image views 332a, 334a into the interior of the arch section 116.

The previously-described sets of cameras in the arch sections 110, 120 may be effective for collectively reading bar codes appearing on any of the upper five sides of the item 20 not obscured by the conveyor belt 15 (namely the top side 26, leading side 30, customer side 36, trailing side 32 and checker side 34. In order to provide the capability of reading bar codes on the bottom side 28, a bottom scanner function is provided as will be illustrated with reference to FIGS. 23-31. Visible on several of the figures, a gap 50 is provided between adjacent ends of conveyor belts 15, 16. The gap 50 permits an opening through which the bottom scanner 400 may scan to read the bottom side 28 of the item 20 as the item is passed over the gap 50. In a preferred configuration, the bottom scanner 400 includes two cameras 410, 420, situated side-by-side, each camera providing for half the length of the gap 50 between the side leg sections 112, 114. As will be described, each camera 410, 420 is divided into four separate linear scan views for its imager to provide coverage over the entire length of the gap 50. The length of the gap 50 corresponds to the width of the conveyor belts 15, 16 between the side leg sections 112, 114. As shown in FIGS. 25-26, the gap 50 formed between the first conveyor 15 and second conveyor 16 may include a slide plate (or slide plates) helping to the bridge the transition over the gap 50. FIGS. 25-26 show a pair of slide plates 52a, 52b with a small opening 51 therebetween through which the various views from the cameras disposed below may pass. Alternately the slide plates 52a/52b may comprise a single transparent plate, or a single plate with a central transparent region for permitting passage of the images from the scanner 400 below. The surface of conveyor 15 is at a height $h_1$ higher than the surface of the downstream conveyor 16. This height or step may provide for more smooth movement of items across the gap 50, particularly larger items that would pass over the gap 50 without touching the plates 52a/52b. Details of the gap 50 and related components are further described in U.S. Application No. 61/435,744, filed on Jan. 24, 2011, hereby incorporated by reference.

As viewed in FIG. 24, the camera 410 includes an optic set which divides the view on its imager into four view sections namely two upwardly and rearwardly angled view sections 402, 404 passing through the left side of the gap 50 and upwardly and forwardly slanted view sections 406, 408 also spanning the left portion of the gap 50. Similarly, the camera 420 has its view divided into four image segments with upwardly and forwardly directed views 412, 414 and upwardly and rearwardly directed views 416, 418.

These view segments may alternately contain (a) a larger plurality of imager rows (e.g., up to 200 rows or some other suitable number depending on optics and imager size) to create a relatively narrow view, (a) a few imager rows (e.g., 2 to 10 rows), or (c) a single imager row to create a linear view. In a preferred configuration, each of the view segments is a relatively narrow, or nearly linear scan through the gap 50. Instead of generating what would be more of a two-dimensional view, a more linear read view plane may be generated through the gap 50 aimed such that the item being passed over the gap 50 is moved by the conveyors 15, 16 through the read plane. Considering an item 20 with a barcode on the bottom side 28, the camera takes a first linear image. Then the object/item is moved a certain distance and the process is repeated (i.e., another linear image is acquired) generating a multitude of linear images combined together resulting in a 2-D raster image. At a given item velocity (as determined by the conveyor speed) and image view repetition rate, a given linear image spacing results, defining the resolution in this axis (along with the projected imager pixel size and the imaging lens blur spot size). At a given scan rate, the faster the item moves, the lower the resolution and the slower the item moves, the higher the resolution (until limited by the resolution due to the pixel size and the imaging lens blur function). Such a read mechanism is described in U.S. Published Application No. US-2006-0278708 hereby incorporated by reference.

Figure 31:
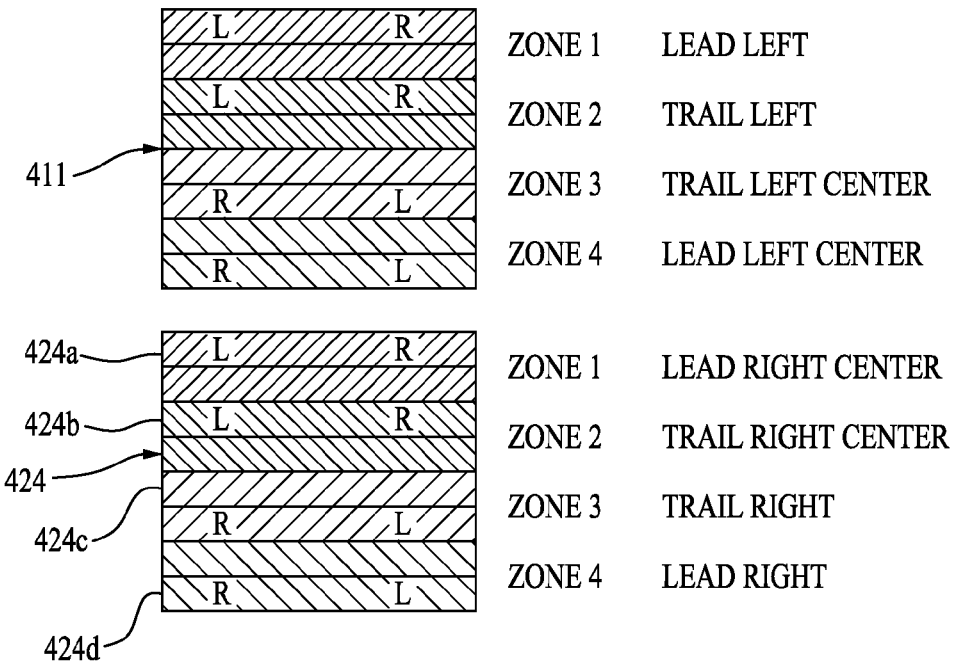
FIG. 31 is a diagram of the imagers for the optic sets of the bottom reader.

Details of the optic set for camera 420 will now be described with particular reference to FIGS. 25-31. It should be understood that the description would be equally applicable in the optic set for camera 410. Camera 420 includes an imager 424 mounted on an imager board 422 with a lens system 426 for focusing the image onto the imager 424. The imager 424 comprises a two dimensional image array and accommodates multiple image fields in the single array as shown in FIG. 31. Specifically, the imager 424 has four image regions or zones 424a, 424b, 424c, and 424d. The image zones 424a-424d are separated by suitable gaps on the two dimensional image array 424. The imager 411 of camera 410 is of similar configuration.

Figure 27:
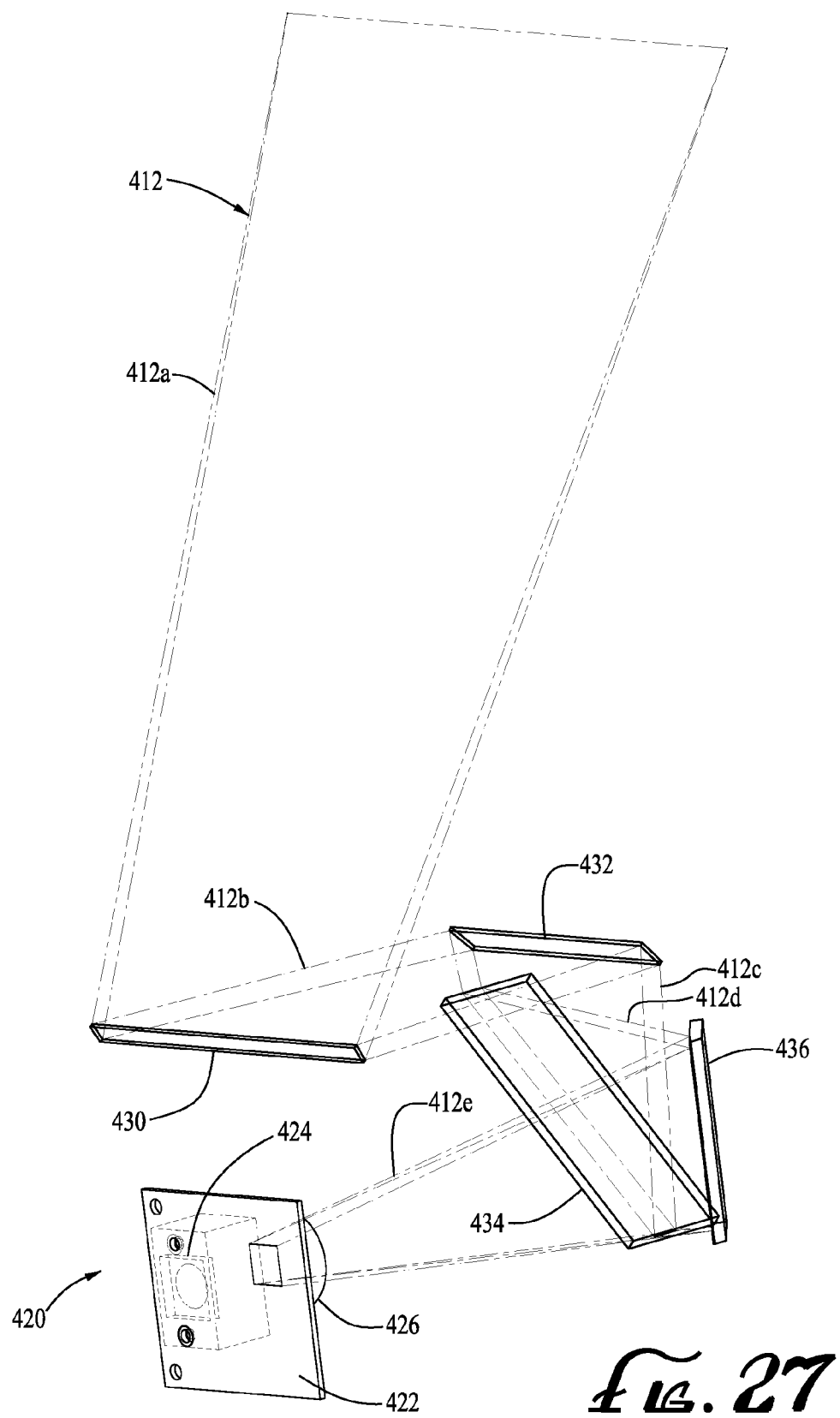
FIG. 27 is a diagrammatic front side isometric view of part of an optic set of the bottom reader.
Figure 28:
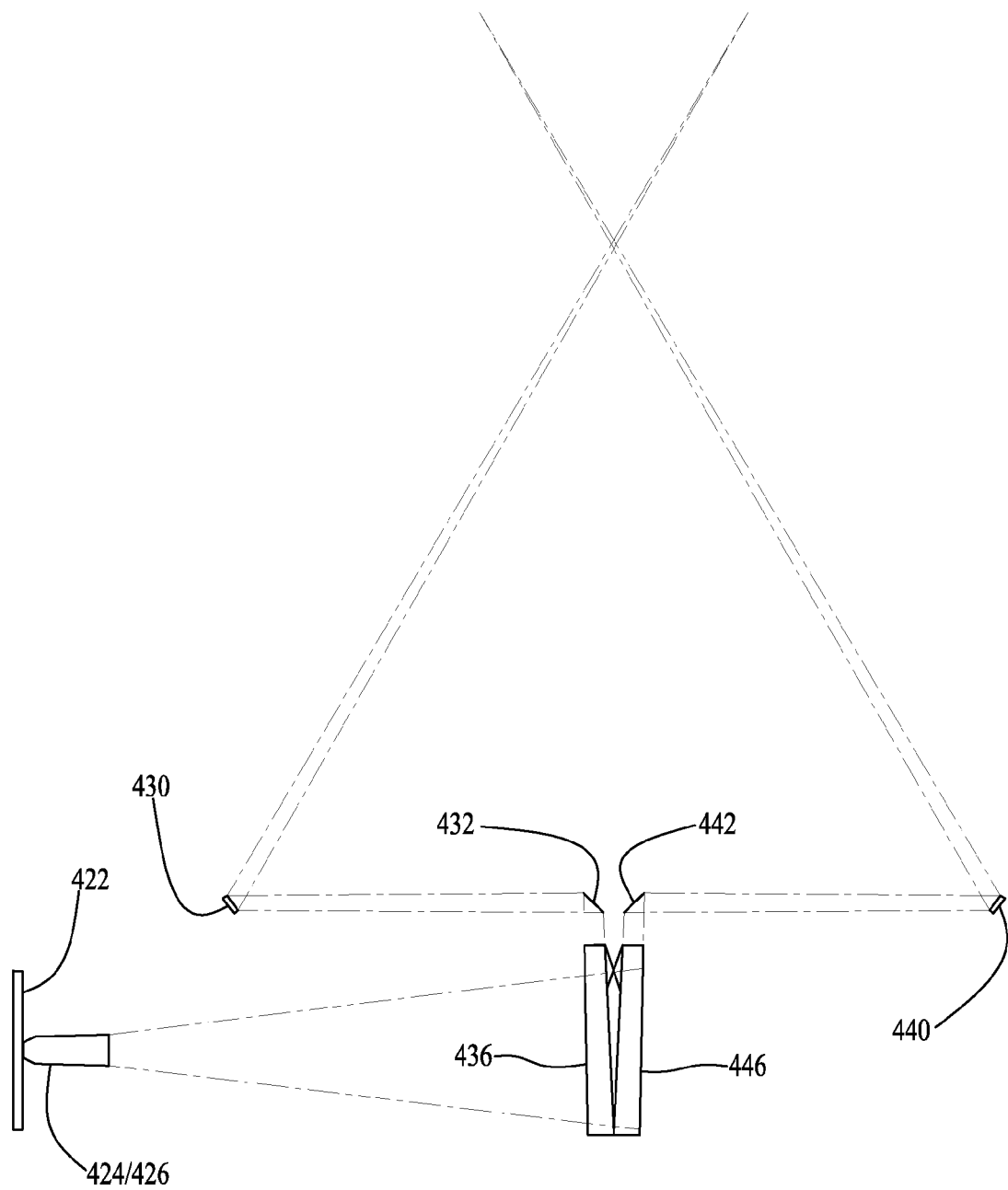
FIG. 28 is a side view of the optic set of FIG. 24.
Figure 29:
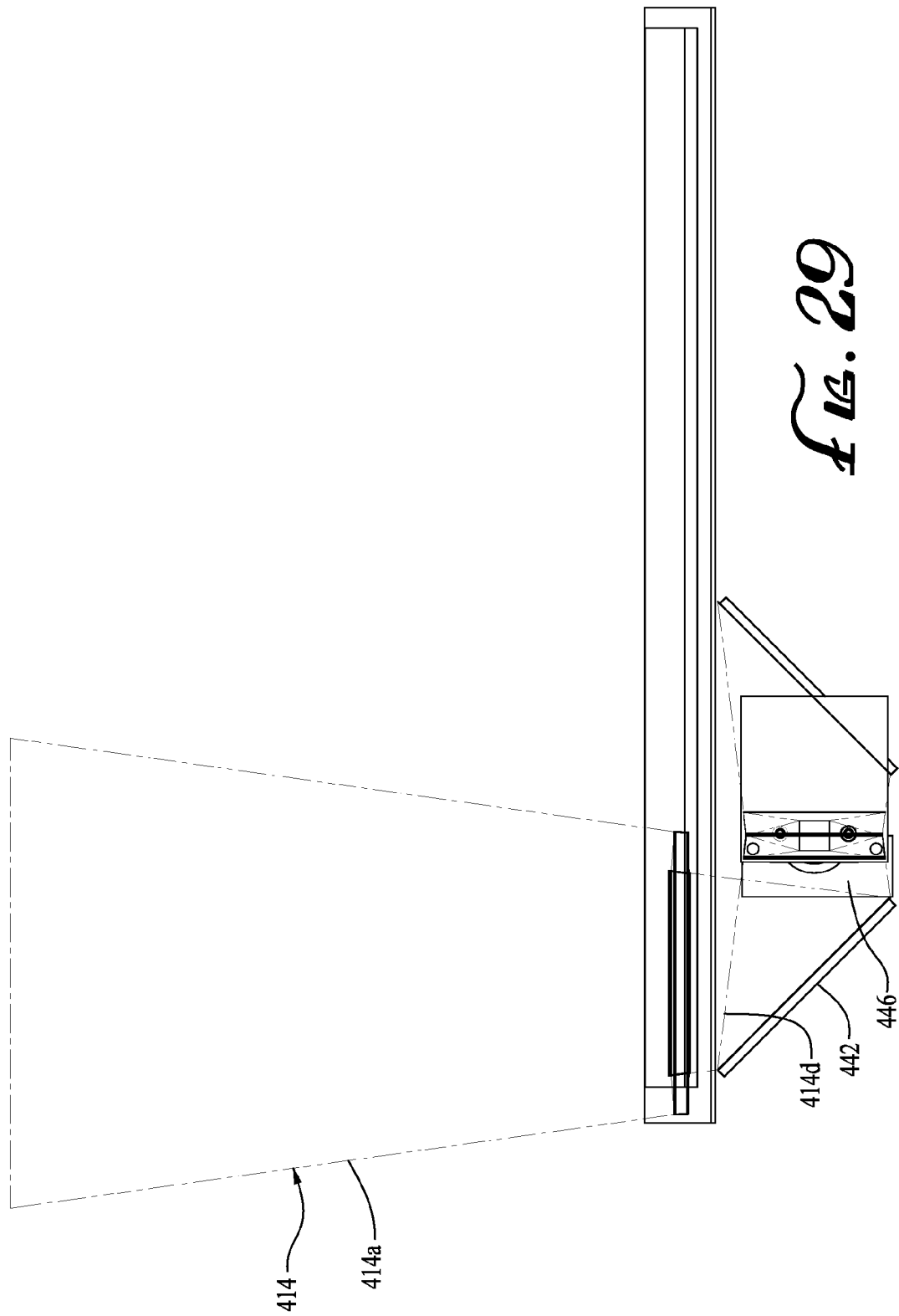
FIG. 29 is a rear side elevation view of part of the optic set of FIG. 24.
Figure 30:
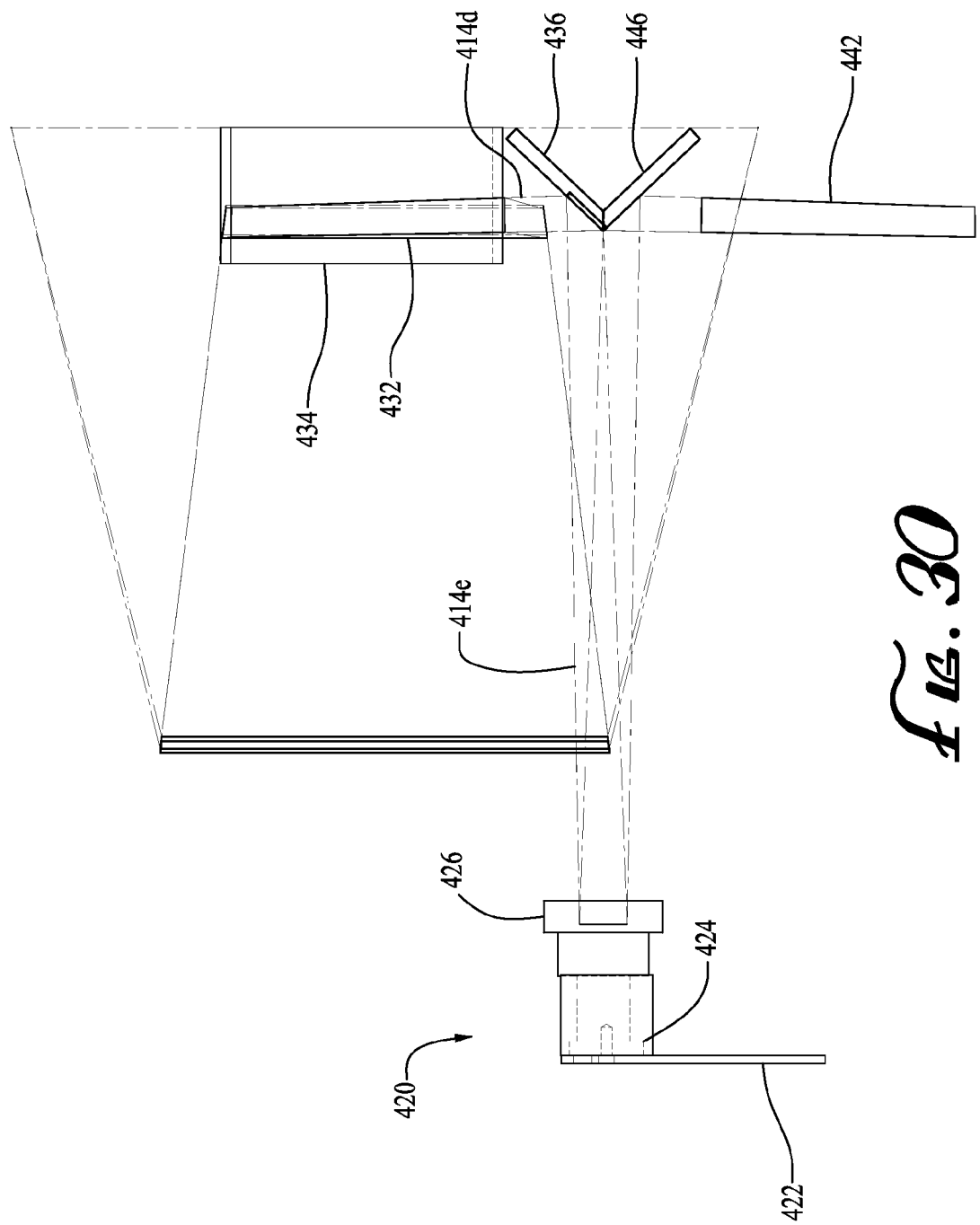
FIG. 30 is a top plan view of part of the optic set of FIG. 24.

FIG. 27 illustrates one side of the bottom reader generating the image view 402 using the previously-described mirror order convention, the image view 402 includes a first view segment 402a which is reflected by first mirror 430 ($M_4$) directing second view segment 402b onto second mirror 432 ($M_3$), which directs third image segment 402c onto third mirror 434 ($M_2$), which then directs fourth view segment 402d onto mirror 436 ($M_{1a}$), which then reflects fifth view segment 402e to the camera 420 and imager 424 as focused by lens set 426. The image view segment 402e as laid out on the image array would for example correspond to the imager zone section 424b of FIG. 31.

As shown in the figures, the splitting of the images from the lens set 426 occurs first at the split mirror 436 ($M_{1a}$)/446

($M_{1b}$) and then again at mirror 432/442 ($M_3$) thus producing four views from a single camera.

Figure 32:
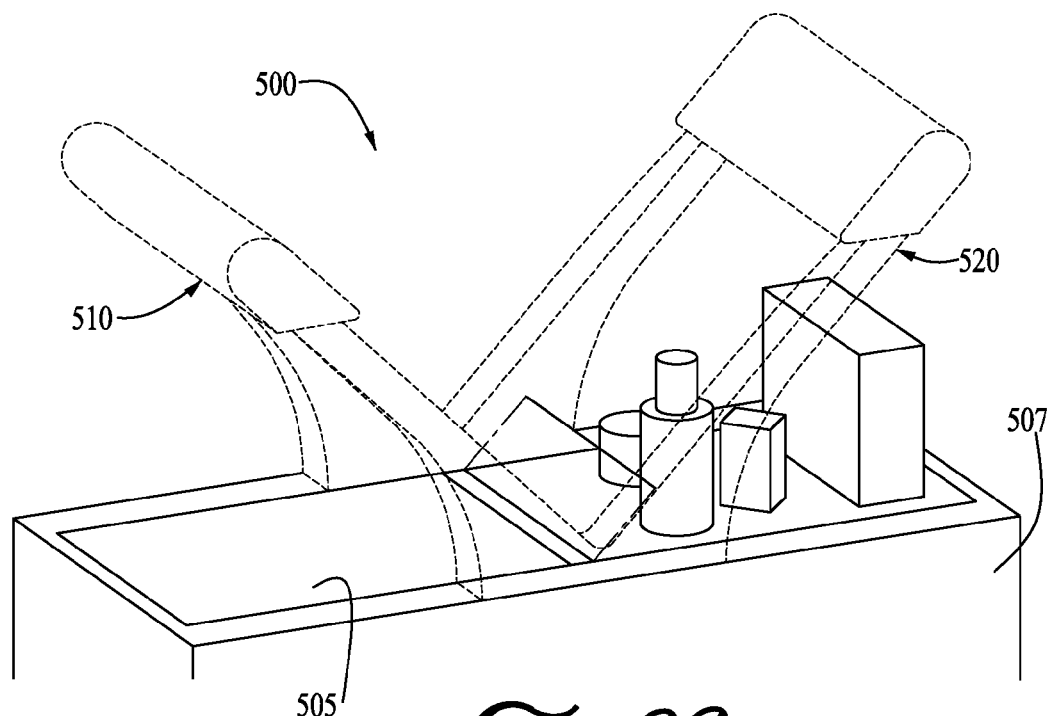
FIG. 32 is an isometric view of an alternate tunnel or portal scanner.

The configuration for the arch sections 110, 120, as described above, are intended to provide sufficient height below the top cross-sections 116, 126 to accommodate items of varying height as well as sufficient width between the side leg sections 112, 114 to provide sufficient area to accommodate items of expected width and height. The leg sections 112, 114 of the housing for the tunnel scanner 100 may have curved or straight sections, or alternately angled as desired. FIG. 32 illustrates an alternate tunnel scanner 500. The tunnel scanner arches of FIG. 32 are shown with a greater angle and a larger opening in the central V shape structure. Such a design may provide for greater openness to the structure, particularly to the center of this alternate scanner 500.

As described above, the tunnel scanner 100 provides an arrangement of 14 cameras (six cameras in each arch section 110, 120 and two cameras in the bottom reader) with 32 unique images arranged out of the arches 110, 120 and up through the gap 50. The relatively open architecture as formed by the back-to-back combination of separate arch sections 110, 120 permits ambient light to reach into the inner read region. Since these arch sections 110, 120 provide a relatively open and non-enclosed structure, this ambient light may be sufficient for illuminating the various other sides of the item 20 (other than potentially for the bottom side 28). Nonetheless, each image or view must have sufficient light to illuminate the barcode and allow imaging and decoding. Therefore it may be preferable to provide separate illumination. Such illumination should not have any direct internal reflections and should minimize specular reflections from products being scanned. Additionally, minimizing direct view of the lights by the user or customer is desirable.

The illumination is organized into three separate regions, namely, top arch regions, side regions, and below the conveyor bottom region that scans up through the gap 50. These illumination regions will be separately described in following.

Figure 33:
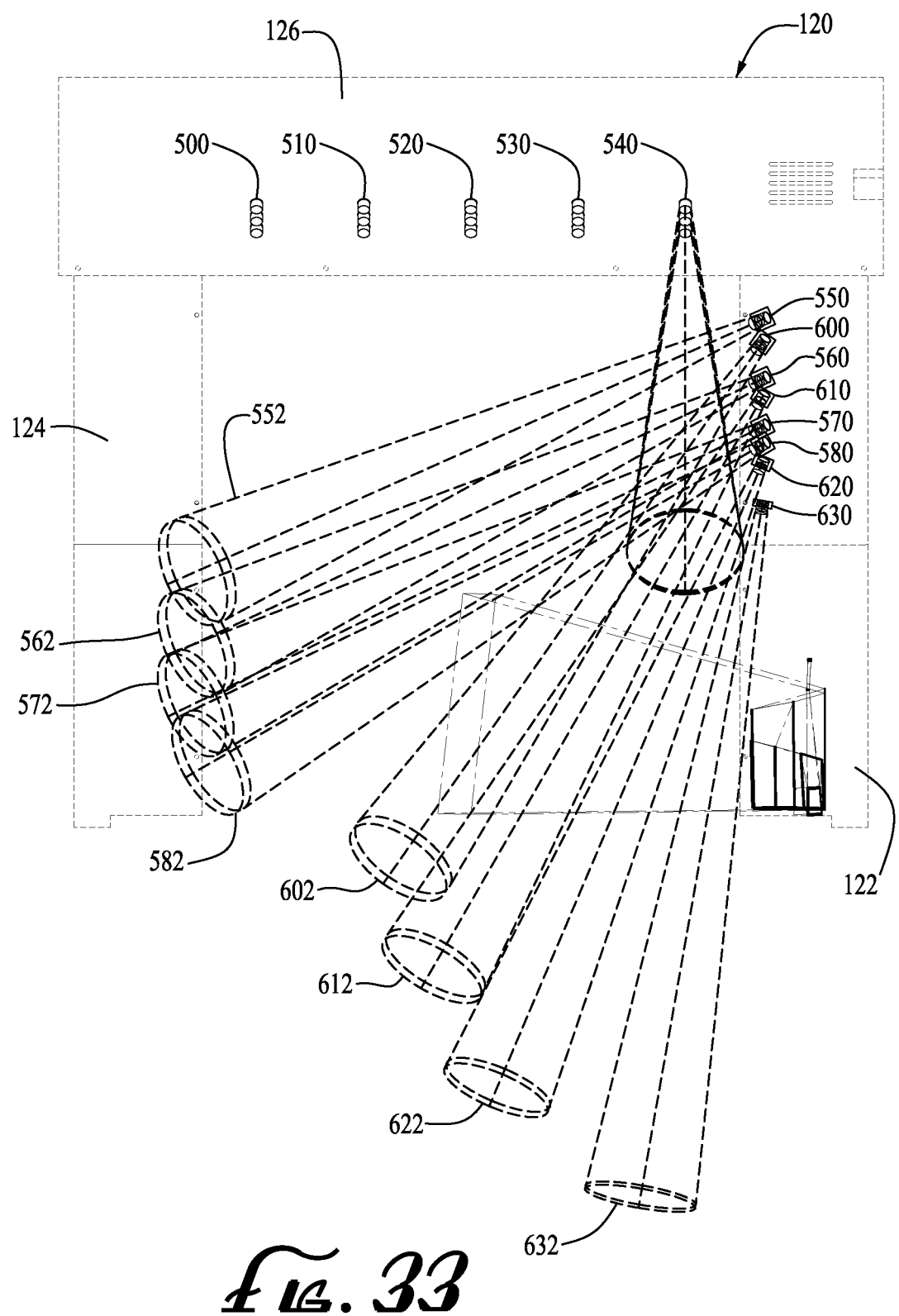
FIG. 33 is a rear side elevation view of the rear arch section of the scanner of FIG. 1 showing illumination sets in the left side leg and top section.
Figure 34:
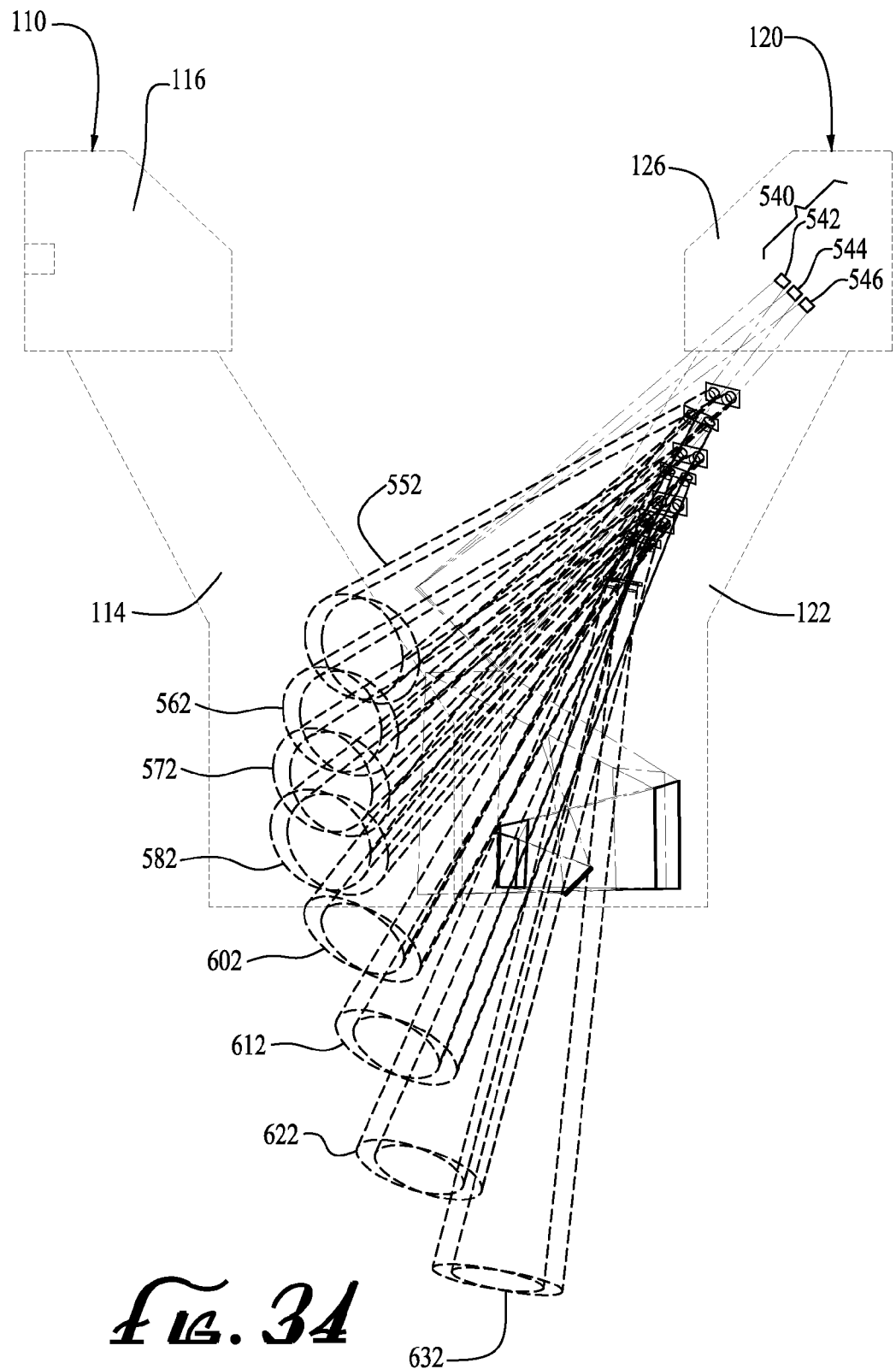
FIG. 34 is a right side elevation view of the scanner of FIG. 1 showing illumination sets in the rear arch left side leg and rear arch top section.
Figure 35:
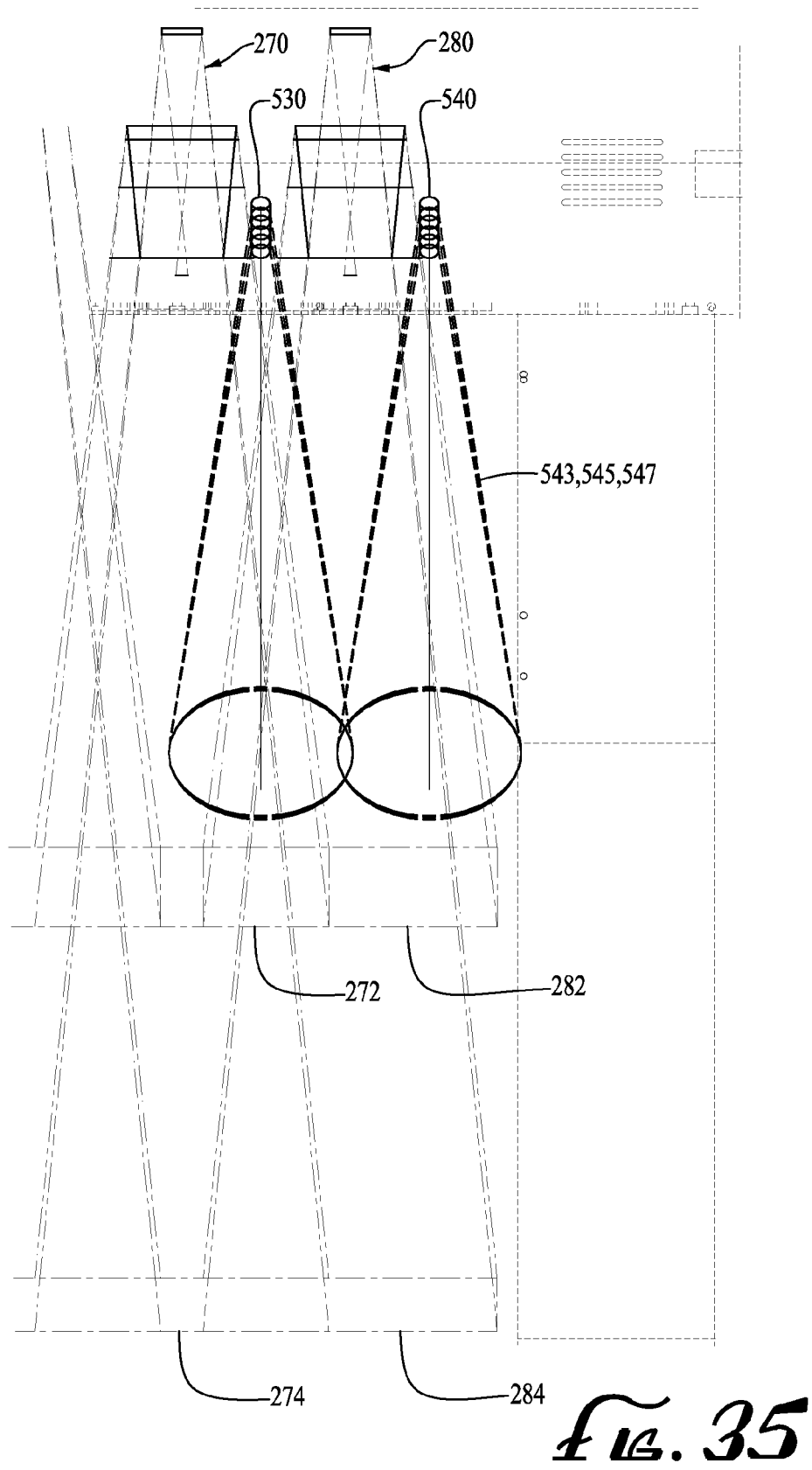
FIG. 35 is a partial view, on an enlarged scale, of the top section of the rear arch section of FIG. 33 showing details of top section illumination optics.

FIGS. 33-42 illustrate the various illumination sets disposed about the tunnel scanner housing. FIG. 33 is a rear side elevation view and FIG. 34 is a diagrammatic cross-sectional side view of FIG. 33, these two figures illustrating illumination sets in the rear arch top section 126 and the rear arch first (left) leg section 122. Though only the illumination sets in the rear arch top section 126 and the rear arch first leg section 122 are described, the illumination sets from the opposing leg sections and from the front arch top section 116 are of like configuration and thus their descriptions are omitted for brevity. There are five illumination sets or modules 500, 510, 520, 530, 540 arranged across the rear arch top section 126 (as shown in FIGS. 33-36). Each of the illumination modules includes three light emitting diodes (LEDs). As shown in the cross-sectional views of FIGS. 34 and 36, as an example, illumination module 540 includes three LEDs 542, 544, 546, which in combination provide an overlapping illumination in a forwardly (upstream) and downwardly direction. The illumination set 540 is adjacent to the optic set 280 and provides in combination with the illumination set 530 on the opposite side of the optic set 280 a relatively diffuse and complete illumination for the image views 282, 284 from optic set 280.

Similarly, illumination sets 530 and 520 are disposed on opposite sides of optic set 270 for providing illumination for image views 272, 274; illumination sets 520, 510 on opposite sides of optic set 260 provide illumination for image views 262, 264; and illumination sets 510, 500 on opposite sides of optic set 250 provide illumination for image views 252, 254. It is noted that for simplicity that optics sets 250, 260, 270 are not shown in FIG. 33 and imaging optic sets 250 and 260 are not shown in FIG. 35, but the positioning of these optics sets would be understood with reference to prior figures (e.g., FIG. 17). As previously mentioned, the optic modules 500, 510, 520, 530, 540 provide primary illumination for the top side 26 as well as some illumination for the leading side 30 of the item 20.

Figure 36:
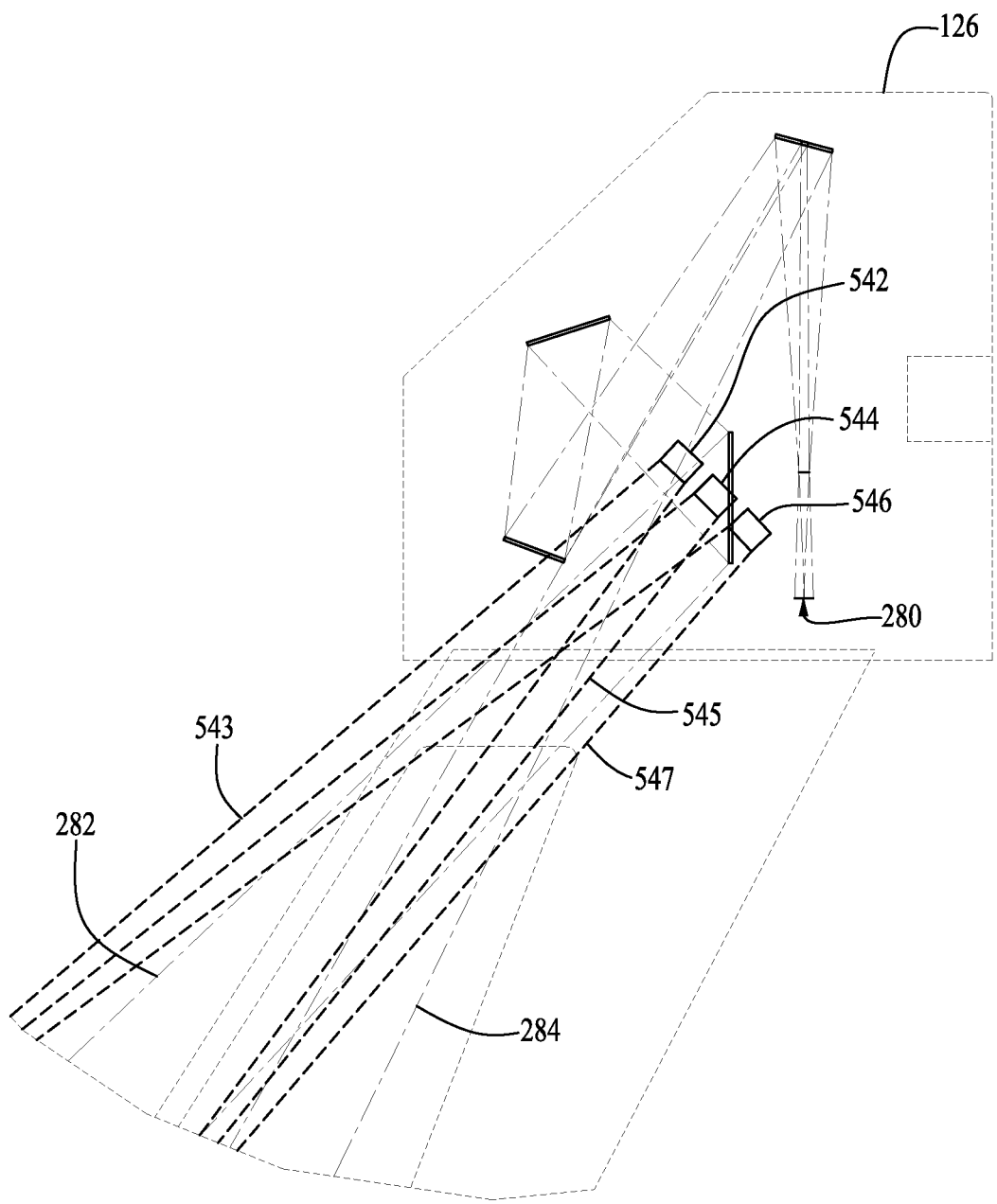
FIG. 36 is a right side view detail of FIG. 35 illustrating details of the illumination set for the scanner of FIG. 1 according to a preferred embodiment.

FIG. 36 is a diagrammatic cross-section (on an enlarged scale) of the rear arch top section 126 with the illumination set 540 comprised of the LEDs 542, 544, 546. LED 542 generates an illumination region or cone 543; LED 544 produces an illumination region or cone 545; and LED 546 produces an illumination region or cone 547. FIG. 36 also illustrates the position of the illumination regions relative to the image views of the optic set 280. FIGS. 33-34 also illustrate the illumination from the side leg section 122. The upper illumination portion of the side leg section 122 includes illumination sets 550, 560, 570, 580 which as shown in FIGS. 33-34 and 37-42 project downwardly and laterally across the opening underneath the arch 126; and as best shown in FIG. 38 the illumination is directed forwardly from the rear arch 120. Such inward and forward illumination direction is effective for illuminating the customer side 36 and the leading side 30 and to some degree the top side 26 of the item 20 passing through the read region depending upon the item's particular location and dimensions.

Figure 37:
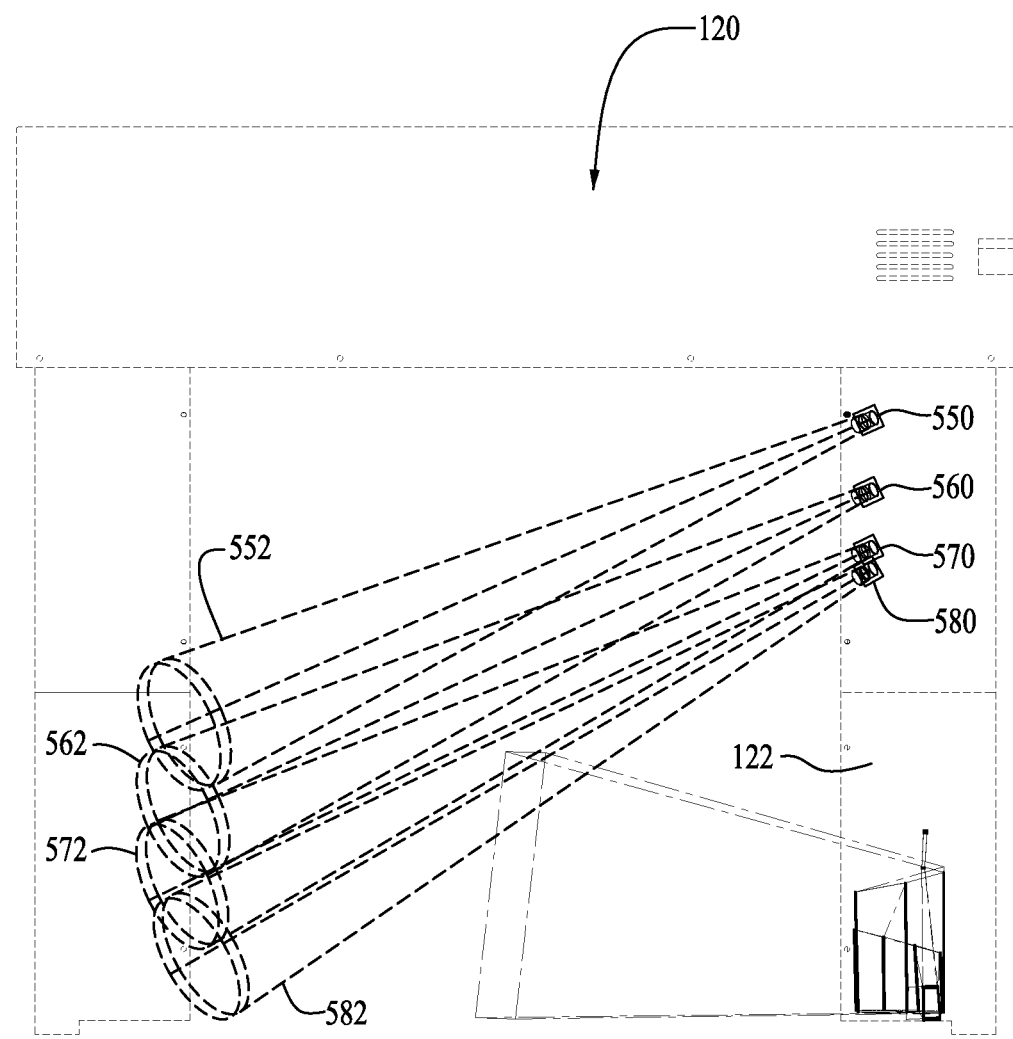
FIG. 37 is a rear side elevation view of the rear arch section of the scanner of FIG. 1 illustrating a first group of illumination sets in the left side leg of the rear arch.
Figure 38:
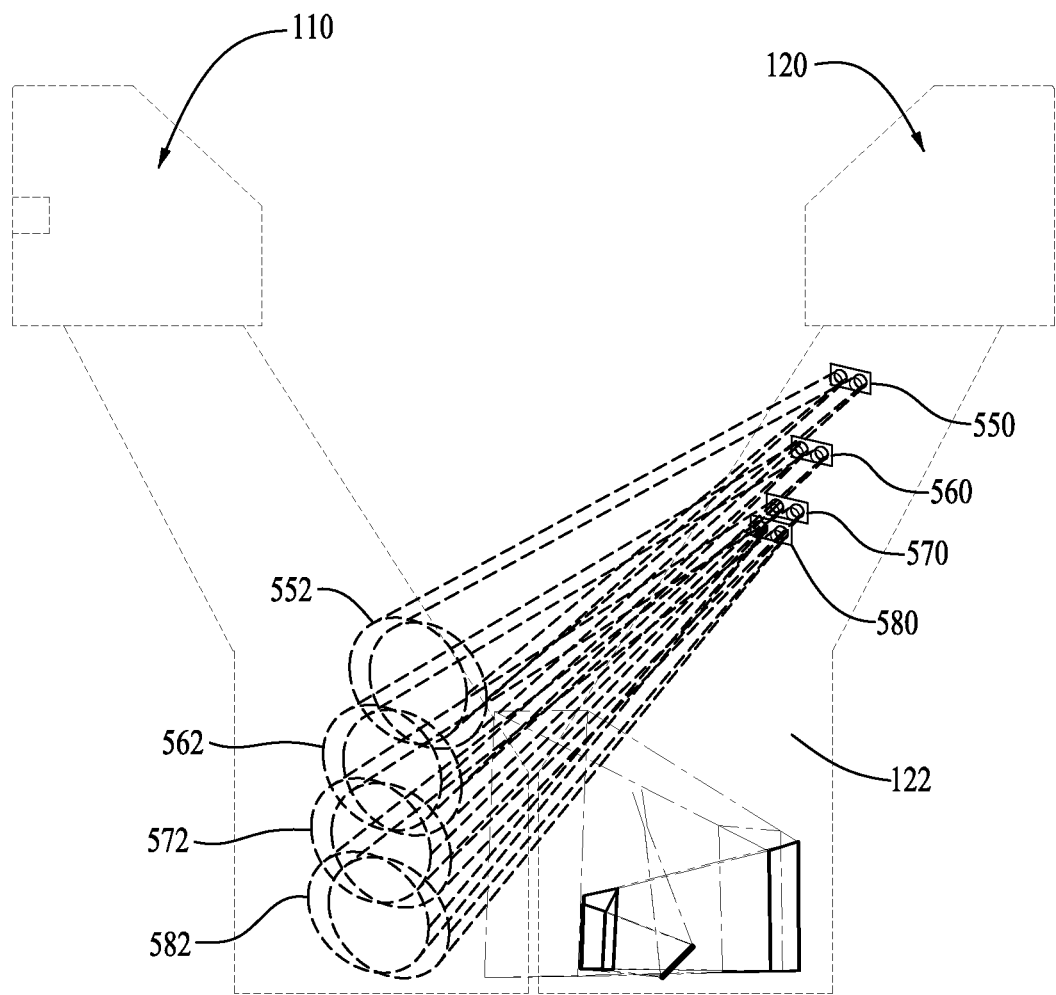
FIG. 38 is a right side elevation view of the first group of illumination sets in the rear arch left side leg of the scanner of FIG. 1.
Figure 39:
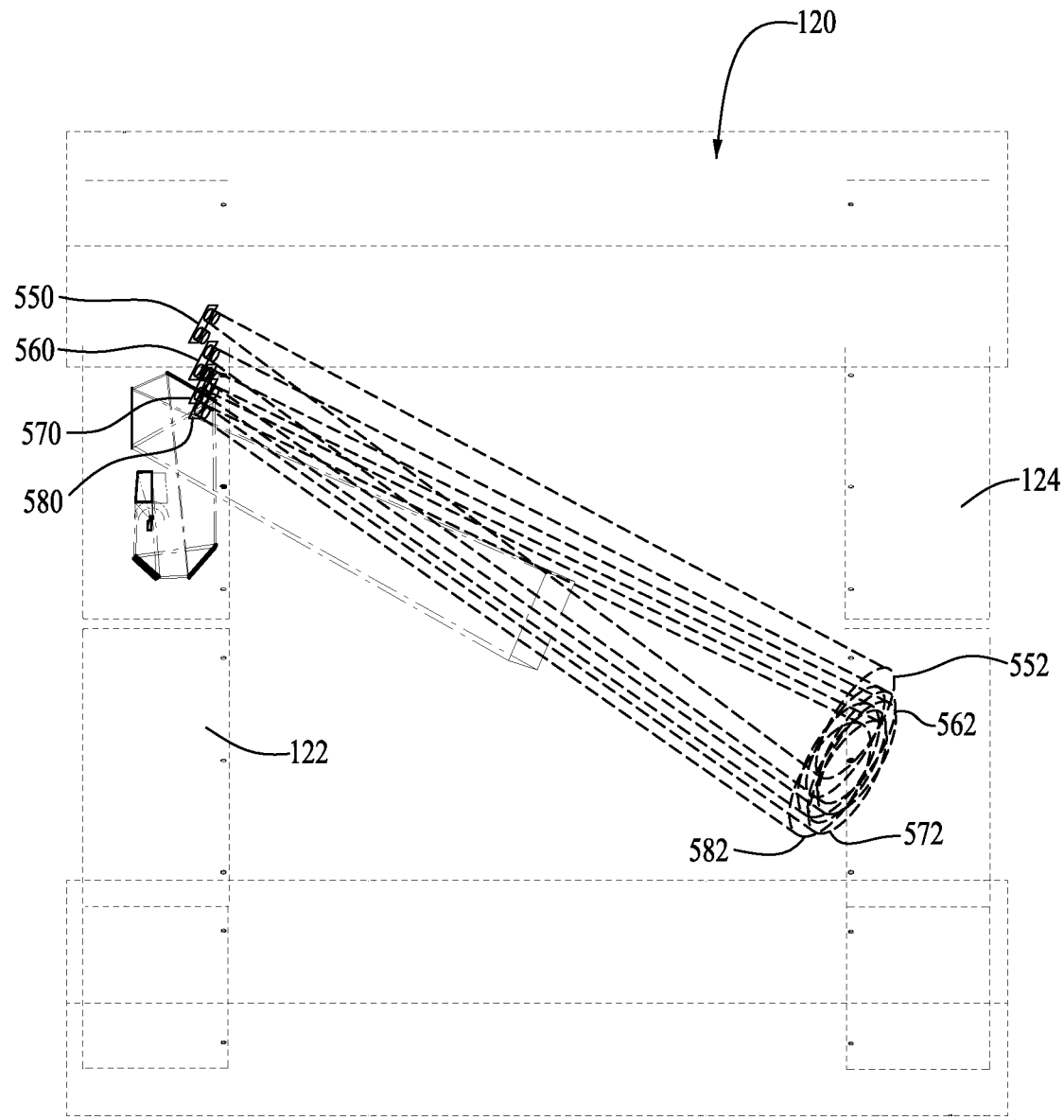
FIG. 39 is a top plan view of the first group of illumination sets in the left side leg of the rear arch section.

FIGS. 37-39 illustrate a first group of illumination sets and relative directional angles of the illumination cones with illumination set 550 having illumination cone 552; illumination set 560 having illumination cone 562; illumination set 570 having illumination cone 572; and illumination set 580 having illumination cone 582. It would be noted that these cones are merely representations of illumination light direction as produced by the dual LED source of any particular illumination set. Each illumination set may be provided with a diffuser or focusing optics in order to diffuse or otherwise focus light generated as desired. These cones in the drawings are merely representations of light emitted from the respective LED sets and are not intended to be precise representations of light beams but are provided to illustrate general light aiming direction and alignment relative to the view images from the cameras as previously described.

Figure 40:
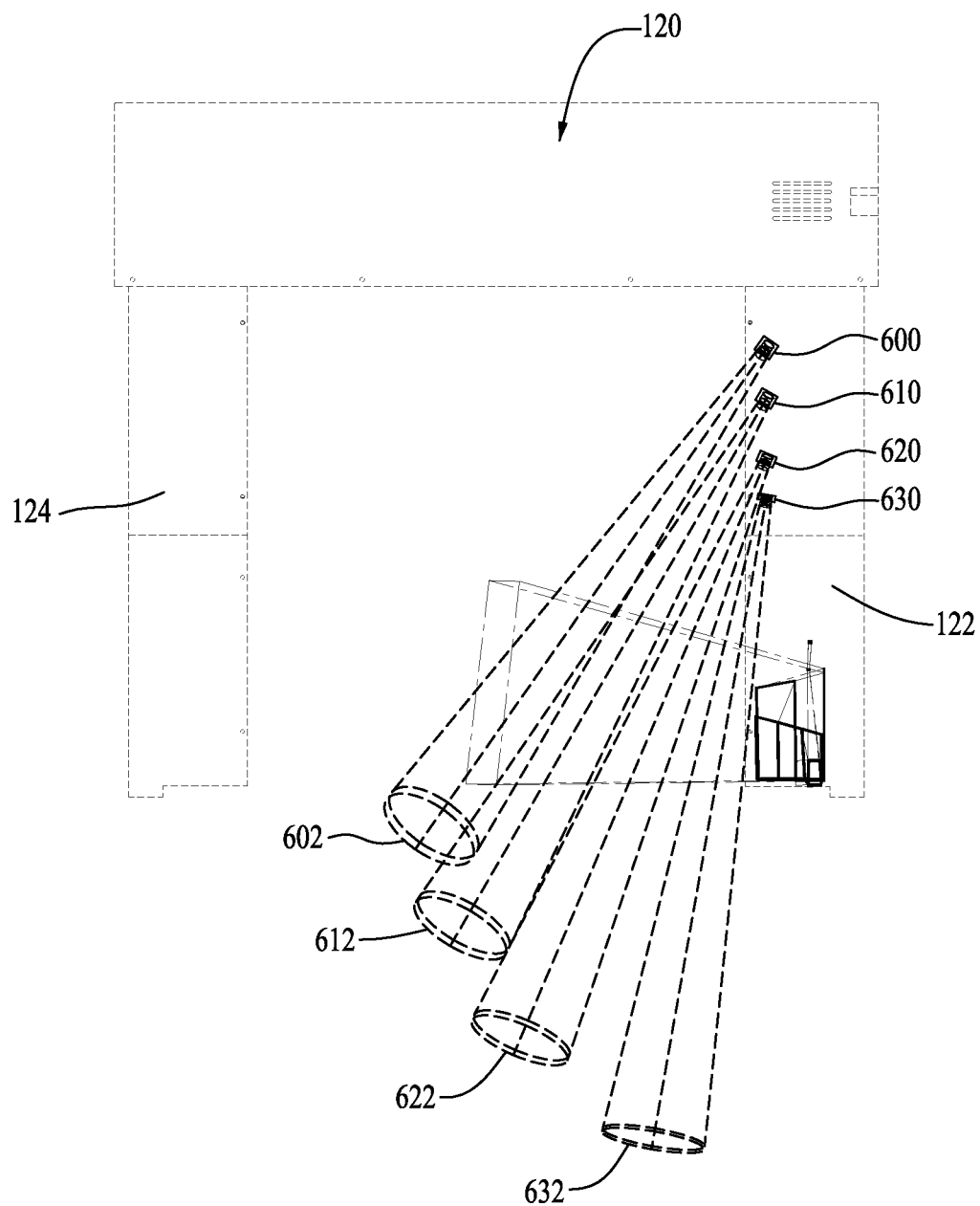
FIG. 40 is a rear side elevation view of the rear arch section illustrating a second group of illumination sets in the left side leg of the rear arch section.
Figure 41:
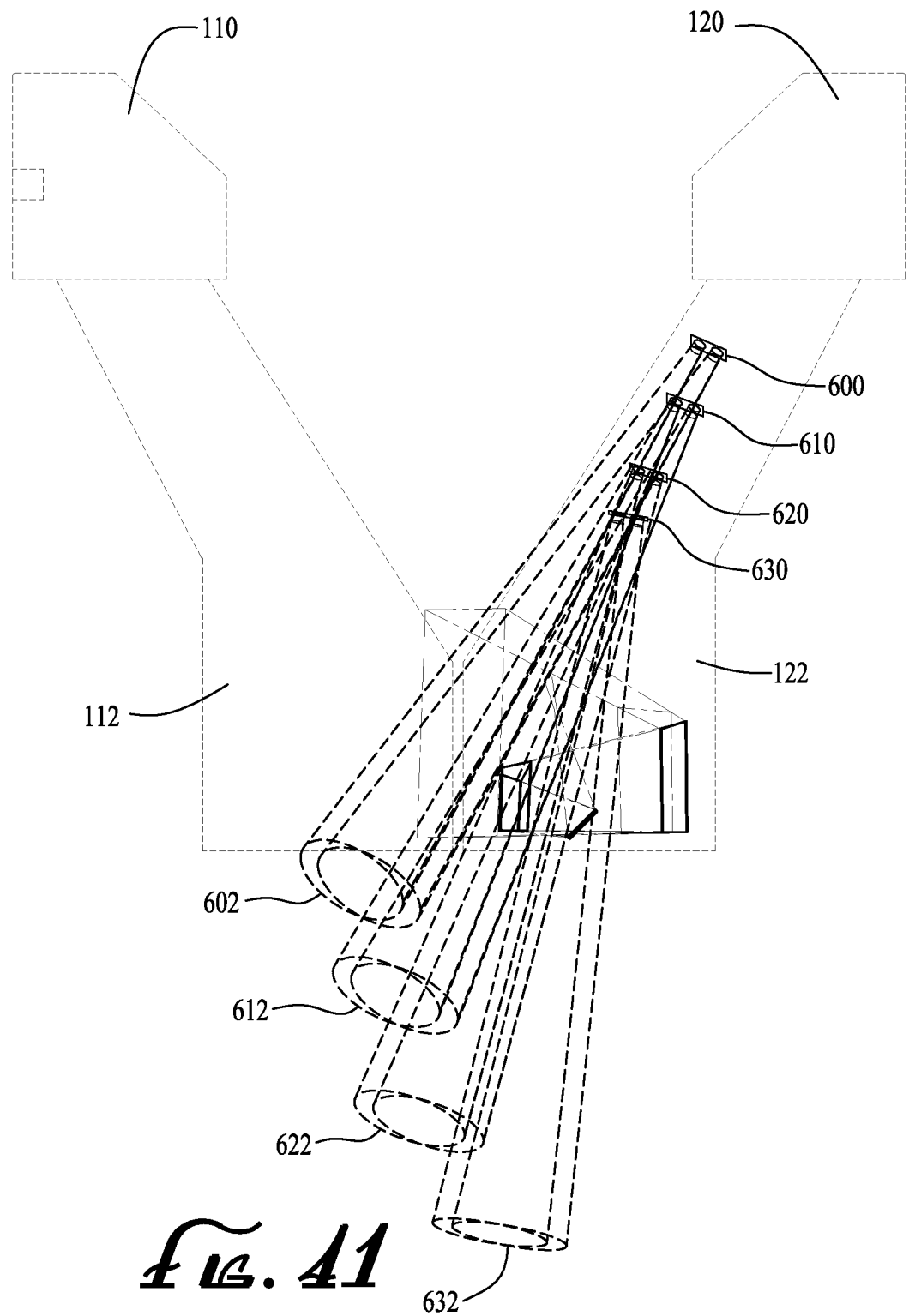
FIG. 41 is a right side elevation view of the second group of illumination sets in the rear arch left side leg.
Figure 42:
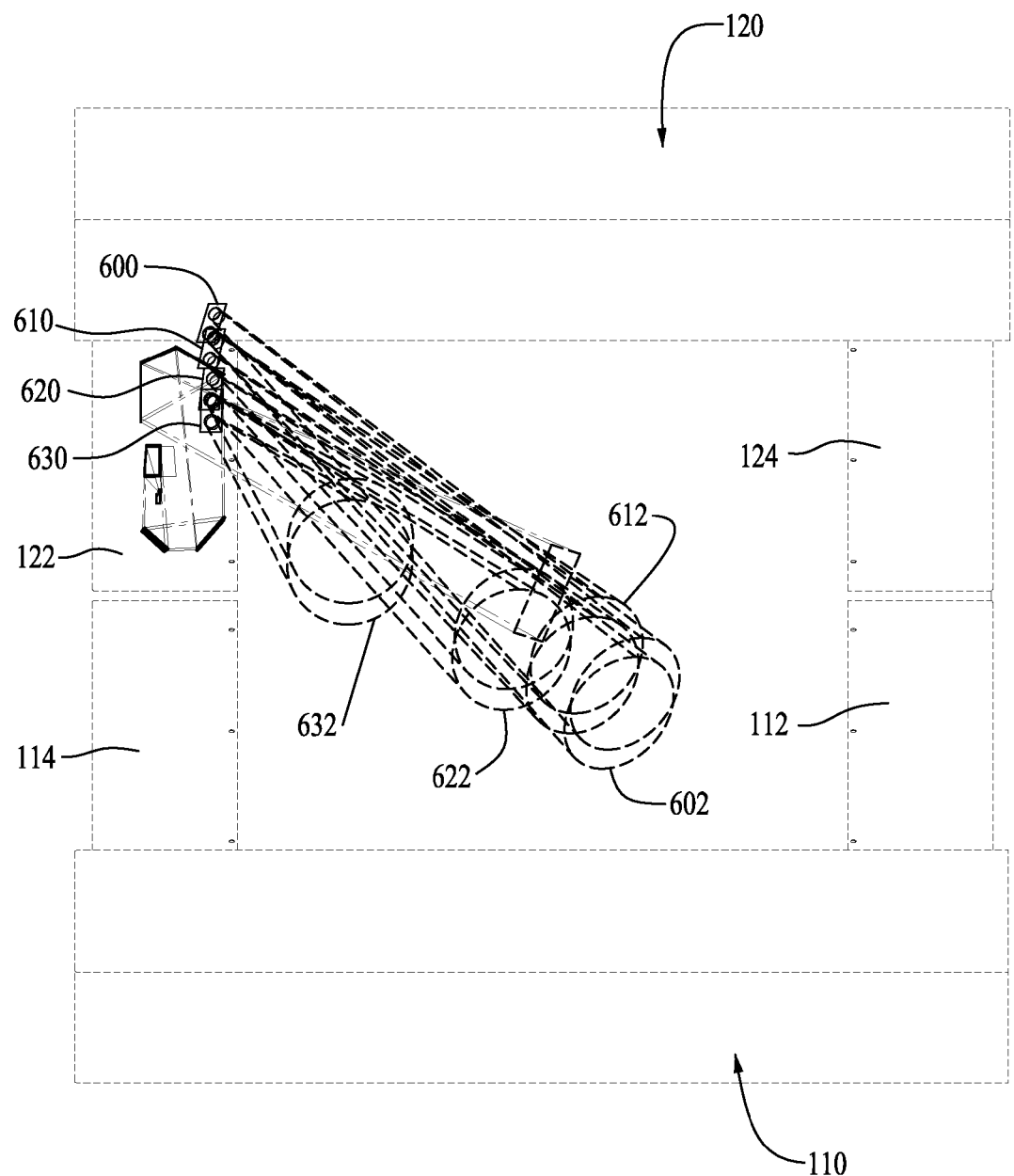
FIG. 42 is a top plan view of the second group of illumination sets in the rear arch left side leg.

FIGS. 40-42 show the second group of illumination sets 600, 610, 620, 630 disposed in the side leg 122. The direction of the light from the second group of LED sets 600, 610, 620, 630 is directed at a steeper downward angle than that of the first group of illumination sets 550, 560, 570, 580. In similar fashion, as previously described, illumination set 600 includes two LEDs producing the downwardly directed illumination cone 602; illumination set 610 produces downward illumination cone 612; illumination set 620 produces downward illumination cone 622; and illumination set 630 produces downward illumination cone 632. As shown in FIGS. 41-42, the illumination regions are formed in a somewhat adjacent and overlapping arrangement so as to provide a desired broad illumination pattern within the region. These illumination patterns 602, 612, 622, 632 are effective for illuminating a top side 26, leading side 30 and customer side 36 of an item 20 being passed through the read region.

This combination of illumination sources provides a full illumination across the entirety of the width of the conveyor 15/16. Illumination from the top arch sections 116, 126 are angled downwardly to concentrate at a far end of the field of view. As for the side illumination, all of the LEDs and lenses are placed outside the view of any direct window reflection. Having the illumination direction of the LEDs generally downward also helps avoid a specular reflection off shiny surfaces (such as a soft drink can) and makes the direction of illumination lower than a typical adult eye level of a person standing to the side of the tunnel scanner 100 at the customer side, thus the likelihood of direct viewing of illumination by the customer is minimized. Furthermore, the illumination is generally aimed to the opposite side arm, thus blocking direct view of the illumination from a human viewer.

The illumination LEDs are preferably pulsed and synchronized to a common timing signal. Such synchronization minimizes motion blur and flicker. The illumination frequency is preferably greater than 60 Hz (or more preferably on the order of 90 Hz) to avoid human flicker perception. The LEDs in the arch sections 110, 120 are preferably full spectrum or white light LEDs configured to illuminate the scan volume with multiple wavelengths of light within a wavelength band of approximately (for example) 380 nm to approximately 750 nm. Using white light allows the scanner illumination to also provide light for exception and security cameras, if provided, and may provide a more pleasing natural looking illumination, which may in turn improve device aesthetics.

Figure 43:
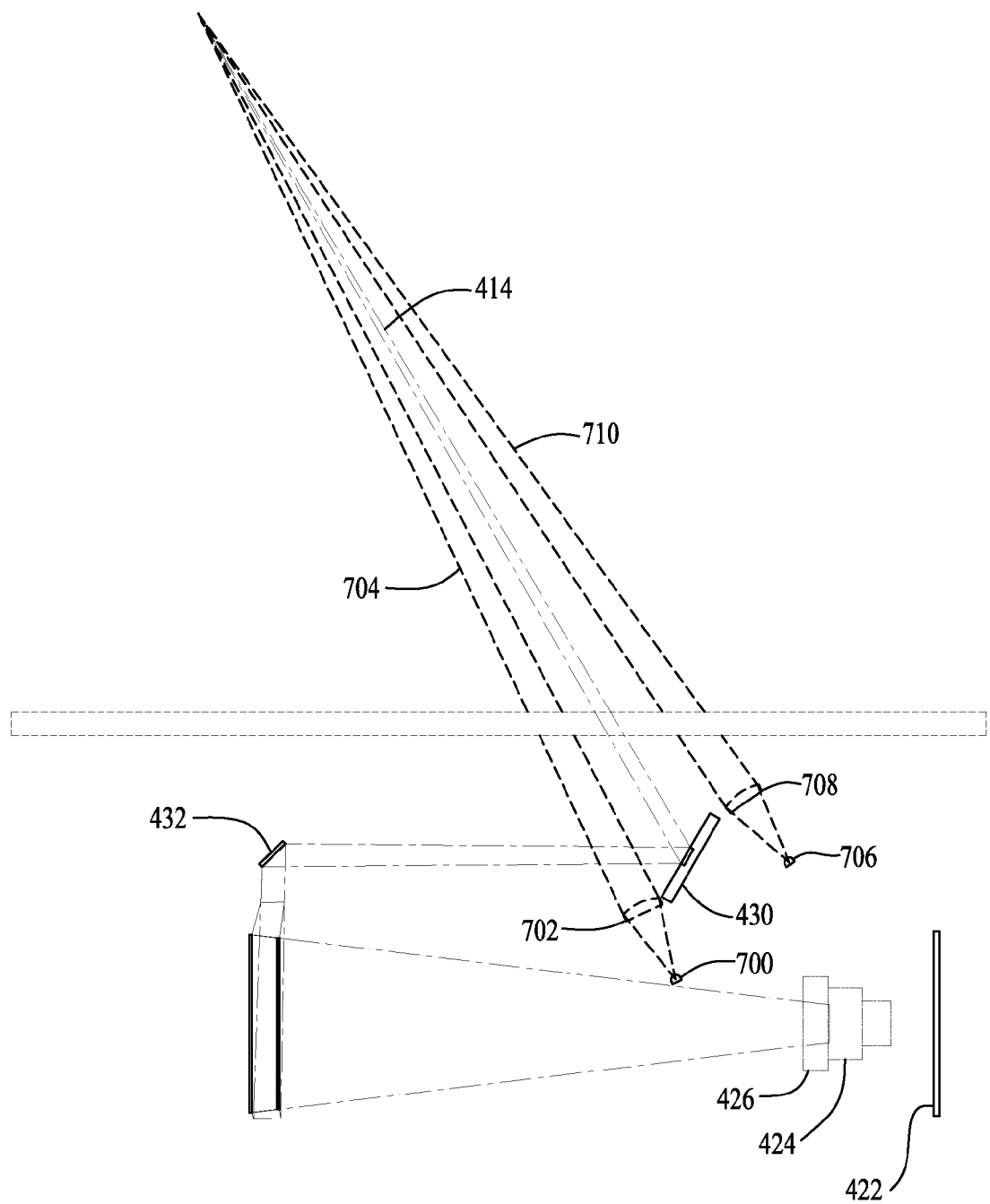
FIG. 43 is a diagram of the bottom reader illumination of the scanner of FIG. 1 according to a preferred embodiment.

Bottom illumination is provided from a set of two LEDs and an array of cylinder lenses. FIG. 43 illustrates an example bottom illumination for one of the image planes 402 produced for each image plane by mirrors 430, 432, 434, 436 focused by lens 426 into imager 424 (see further details of the imager in FIG. 27). Two illumination planes 704, 710 are produced on opposite sides of the image plane 402 to provide illumination generally coextensive with the image plane 402b. A first set or row of LEDs 700 generates a diffuse plane of light that is focused by cylinder lens 702 to form illumination plane 704 and a second row of LEDs 706 generates a diffuse plane of light that is focused by cylinder lens 708 to form illumination plane 710. A symmetric pair of LED sets and cylinder lenses illuminate each of image views 404, 406, 408, 412, 414, 416, 418. The bottom illumination does not contribute to exception imaging and thus can be of any color. Red LEDs may be preferred, because of their increased efficiency and lower apparent brightness to human observers, but other suitable colors such as white LEDs may be provided. The cylinder lens array provides two planes of illumination for each side of a gap in the conveyer. The second illumination line is aligned with the imager view approximately 50 mm above the conveyor belt. Two illumination planes are used to maximize the reading depth of field allowing for the fact that illumination cannot readily be placed precisely on axis with the imager.

Though particular quantity of LEDs is illustrated and described for each of the illumination sets (e.g., illumination set 540 has 3 LEDs; illumination set 550 has two LEDs), each of these illumination sets may comprise one or more LEDs depending upon the desired intensity or other pertinent design considerations.

Though the size and specifications of the imagers may depend on the particular design, a preferred imager is a 1.3 megapixel CMOS imager with a resolution of 1280×1024 pixels. One preferred megapixel imager is the model EV76C560 1.3 MP CMOS image sensor available from e2V of Essex, England and Saint-Egrève, France. This imager may be applicable to the data reader of any of the embodiments herein, however, any other suitable types of imager of various resolutions may be employed.

The image field of the imagers need not be square or rectangular and may, for example, be circular or have a profile of any suitable geometric shape. Similarly, the image field regions need not be square or rectangular and may, for example, have one or more curved edges. The image field regions may have the same or different sizes.

The focusing lenses that are proximate to the respective imagers, as well as the path lengths of the respective image path segments may provide control for the depth of field for the respective image within the view volume.

The image captured by the image field may be processed as a single image, but preferably however, the image captured by each image field region may be processed independently. The images from the different perspectives of the object 20 may reach the image field regions with the object being in the same orientation or in different orientations. Furthermore, the same image of the object 20 from the different (e.g., mirror image) perspectives of the object 20 may reach the different image field regions or different images of the object 20 may reach the different image fields. The different image field regions may have the same photosensitivities or be receptive to different intensities or wavelengths of light.

The optics arrangements described above may contain additional optical components such as filters, lenses, or other optical components may be optionally placed in some or all of the image paths. The mirror components may include optical components such as surface treatments designed to filter or pass certain light wavelengths. In some embodiments, the image reflected by each mirror component can be captured by the entire image field or read region when pulsed lighting and/or different wavelengths are used to separate the images obtained by the different perspectives. The image reflection mirrors preferably have planar reflecting surfaces. In some embodiments, however, one or more curved mirrors or focusing mirrors could be employed in one or more of the imaging paths provided that appropriate lenses or image manipulating software is employed. In some embodiments, one or more of the mirrors may be a dichroic mirror to provide for selective reflection of images under different wavelengths.

The mirrors may have quadrilateral profiles, but may have profiles of other polygons. In some preferred embodiments, one or more of the mirrors have trapezoidal profiles. In some alternative embodiments, one or more of the mirrors may have a circular or oval profile. The mirrors may have dimensions sufficient for their respective locations to propagate an image large enough to occupy an entire image field of a respective imager. The mirrors may also be positioned and have dimensions sufficiently small so that the mirrors do not occlude images being propagated along any of the other image paths.

In some embodiments, the imagers may all be supported by or integrated with a common PCB or positioned on opposing sides of the common PCB. In some embodiments, the common PCB may comprise a flexible circuit board with portions that can be selectively angled to orient some or all of the imagers to facilitate arrangements of image paths.

In one example, the imagers may be selected with a frame rate of 30 Hz and one or more of the light sources used to illuminate the read region are pulsed at 90 Hz. Examples of light source pulsing is described in U.S. Pat. No. 7,234,641, hereby incorporated by reference.

In addition to the variations and combinations previously presented, the various embodiments may advantageously employ lenses and light baffles, other arrangements, and/or image capture techniques disclosed in U.S. Pat. Pub. No. 2007/0297021, which is hereby incorporated by reference.

A fixed virtual scan line pattern may be used to decode images such as used in the Magellan-1000i model scanner made by Datalogic ADC, Inc. (previously known as Datalogic Scanning, Inc.) of Eugene, Oreg. In some embodiments, an alternative technique based on a vision library may be used with one or more of the imagers.

In order to reduce the amount of memory and processing required to decode linear and stacked barcodes, an adaptive virtual scan line (VSL) processing method may be employed. VSLs are linear subsets of the 2-D image, arranged at various angles and offsets. These virtual scan lines can be processed as a set of linear signals in a fashion conceptually similar to a flying spot laser scanner. The image can be deblurred with a one dimensional filter kernel instead of a full 2-D kernel, thereby reducing the processing requirements significantly.

The rotationally symmetric nature of the lens blurring function allows the linear deblurring process to occur without needing any pixels outside the virtual scan line boundaries. The virtual scan line is assumed to be crossing roughly orthogonal to the bars. The bars will absorb the blur spot modulation in the non-scanning axis, yielding a line spread function in the scanning axis. The resulting line spread function is identical regardless of virtual scan line orientation. However, because the pixel spacing varies depending on rotation (a 45 degree virtual scan line has a pixel spacing that is 1.4× larger than a horizontal or vertical scan line) the scaling of the deblurring equalizer needs to change with respect to angle.

If the imager acquires the image of a stacked barcode symbology, such as GS1 DataBar (RSS) or PDF-417 code, the imaging device can start with an omnidirectional virtual scan line pattern (such as an omnidirectional pattern) and then determine which scan lines may be best aligned to the barcode. The pattern may then be adapted for the next or subsequent frame to more closely align with the orientation and position of the barcode such as the closely-spaced parallel line pattern. Thus the device can read highly truncated barcodes and stacked barcodes with a low amount of processing compared to a reader that processes the entire image in every frame.

Partial portions of an optical code (from multiple perspectives) may be combined to form a complete optical code by a process known as stitching. Though stitching may be described herein by way of example to a UPCA label, one of the most common types of optical code, it should be understood that stitching can be applied to other type of optical labels. The UPCA label has "guard bars" on the left and right side of the label and a center guard pattern in the middle. Each side has 6 digits encoded. It is possible to discern whether either the left half or the right half is being decoded. It is possible to decode the left half and the right half separately and then combine or stitch the decoded results together to create the complete label. It is also possible to stitch one side of the label from two pieces. In order to reduce errors, it is required that these partial scans include some overlap region. For example, denoting the end guard patterns as G and the center guard pattern as C and then encoding the UPCA label 012345678905, the label could be written as G012345C678905G.

Stitching left and right halves would entail reading G012345C and C678905G and putting that together to get the full label. Stitching a left half with a 2-digit overlap might entail reading G0123 and 2345C to make G012345C. One example virtual scan line decoding system may output pieces of labels that may be as short as a guard pattern and 4 digits. Using stitching rules, full labels can assembled from pieces decoded from the same or subsequent images from the same camera or pieces decoded from images of multiple cameras. Further details of stitching and virtual line scan methods are described in U.S. Pat. Nos. 5,493,108 and 5,446,271, which are hereby incorporated by reference.

In some embodiments, a data reader includes an image sensor that is progressively exposed to capture an image on a rolling basis, such as a CMOS imager with a rolling shutter. The image sensor is used with a processor to detect and quantify ambient light intensity. Based on the intensity of the ambient light, the processor controls integration times for the rows of photodiodes of the CMOS imager. The processor may also coordinate when a light source is pulsed based on the intensity of the ambient light and the integration times for the photodiode rows.

Depending on the amount of ambient light and the integration times, the light source may be pulsed one or more times per frame to create stop-motion images of a moving target where the stop-motion images are suitable for processing to decode data represented by the moving target. Under bright ambient light conditions, for example, the processor may cause the rows to sequentially integrate with a relatively short integration time and without pulsing the light source, which creates a slanted image of a moving target. Under medium light conditions, for example, the rows may integrate sequentially and with an integration time similar to the integration time for bright ambient light, and the processor pulses the light source several times per frame to create a stop-motion image of a moving target with multiple shifts between portions of the image. The image portions created when the light pulses may overlie a blurrier, slanted image of the moving target. Under low light conditions, for example, the processor may cause the rows to sequentially integrate with a relatively long integration time and may pulse the light source once when all the rows are integrating during the same time period. The single pulse of light creates a stop-motion image of a moving target that may overlie a blurrier, slanted image of the moving target.

In some embodiments, a data imager contains multiple CMOS imagers and has multiple light sources. Different CMOS imagers "see" different light sources, in other words, the light from different light sources is detected by different CMOS imagers. Relatively synchronized images may be captured by the multiple CMOS imagers without synchronizing the CMOS imagers when the CMOS imagers operate at a relatively similar frame rate. For example, one CMOS imager is used as a master so that all of the light sources are pulsed when a number of rows of the master CMOS imager are integrating.

Another embodiment pulses a light source more than once per frame. Preferably, the light source is pulsed while a number of rows are integrating, and the number of integrating rows is less than the total number of rows in the CMOS imager. The result of dividing the total number of rows in the CMOS imager by the number of integrating rows is an integer in some embodiments. Alternatively, in other embodiments, the result of dividing the total number of rows in the CMOS imager by the number of integrating rows is not an integer. When the result of dividing the total number of rows in the CMOS by the number of integrating rows is an integer, image frames may be divided into the same sections for each frame. On the other hand, when the result of dividing the total number of rows in the CMOS by the number of integrating rows is not an integer, successive image frames are divided into different sections.

Other embodiments may use a mechanical shutter in place of a rolling shutter to capture stop-motion images of a moving target. The mechanical shutter may include a flexible member attached to a shutter that blocks light from impinging a CMOS or other suitable image sensor. The shutter may be attached to a bobbin that has an electrically conductive material wound around a spool portion of the bobbin, where the spool portion faces away from the shutter. The spool portion of the bobbin may be proximate one or more permanent magnets. When an electric current runs through the electrically conductive material wound around the spool, a magnetic field is created and interacts with the magnetic field from the one or more permanent magnets to move the shutter to a position that allows light to impinge a CMOS or other suitable image sensor.

These and other progressive imaging techniques are described in detail in U.S. Published Patent Application No. US-2010-0165160 entitled "SYSTEMS AND METHODS FOR IMAGING" hereby incorporated by reference.

Figure 50:
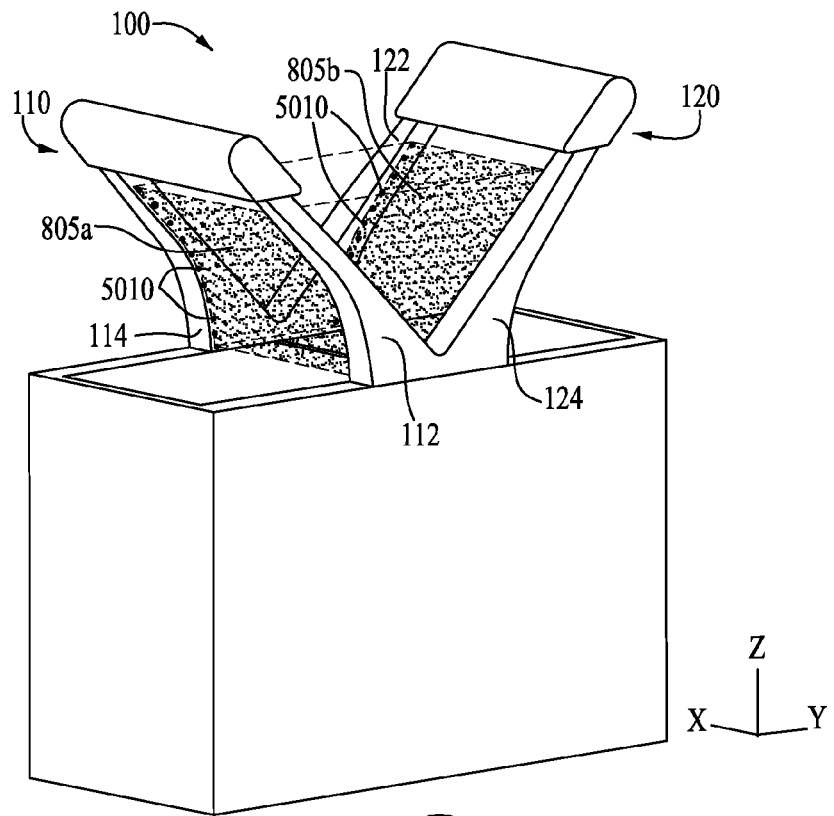
FIG. 50 is an isometric view of a tunnel or portal scanner showing a vertical object sensor system of an object measurement system according to one embodiment.
Figure 51:
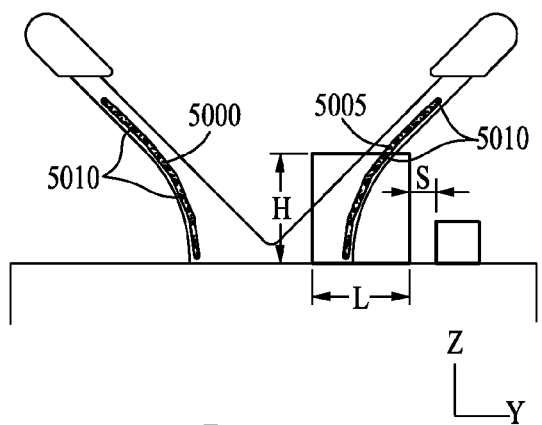
FIG. 51 is a side elevation cross-sectional view of the vertical object sensor system of FIG. 50.
Figure 52:
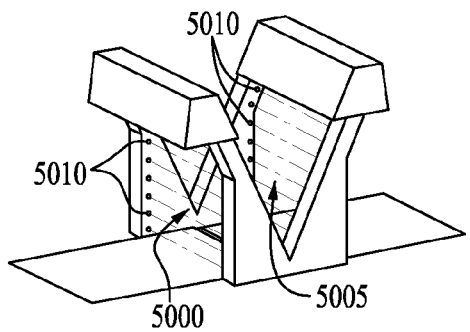
FIG. 52 is a vertical object sensor system of the object measurement system according to another embodiment.

The system of the tunnel/portal scanner 100 preferably includes an object measurement system and related software that uses dead reckoning to track the position of items through the read region. Details of the object measurement system are further described in U.S. Application No. 61/435,686 filed Jan. 24, 2011 and U.S. Application No. 61/505,935 filed Jul. 8, 2011, hereby incorporated by reference. The software of the object measurement system records the times an item passes a leading light curtain 805*a* (at the upstream end of the front arch 110), as shown in FIGS. 50-52 and a trailing light curtain 805*b* (at the downstream end of the rear arch 120) or is detected by sensors (e.g., positioning sensors) and assumes a constant known velocity of the conveyors 15, 16. In one embodiment, the leading and trailing light curtains 805*a*, 805*b* are formed by sensor elements 5010 positioned vertically along arch leg sections 112, 114, 122, 124. When an item passes through the leading and trailing light curtains 805*a*, 805*b*, certain ones of the sensor elements 5010 are blocked dependent on the height (H) of the item. Multiple reads of the sensor elements provide light curtain data corresponding to a vertical object sensor (VOS) profile that represents the height and longitudinal length (L) of the item. The object measurement system also includes one or more lateral object sensors 5300*a*, 5300*b* positioned under conveyors 15, 16 that view the item through gap 50 as shown in FIGS. 53-55. For example, lateral object sensor 5300*a* produces a rearward directed view 5310*a* and the lateral object sensor 5300*b* produces a forward directed view 5310*b*. In one embodiment, lateral object sensors 5300*a*, 5300*b* correspond to the cameras 410, 420 of the bottom scanner 400. In another embodiment, lateral object sensors 5300*a*, 5300*b* are separate from the cameras 410, 420. As the item passes over gap 50, the lateral object sensor(s) (either sensor 5300*a* or sensor 5300*b* or both) measures the footprint (e.g., longitudinal length and lateral width) of the item to produce lateral object sensor data corresponding to a lateral object sensor (LOS) profile. The VOS profile and the LOS profile are combined by the object measurement system to produce model data representing a three-dimensional model of the item.

When an item is scanned and decoded, the model data (produced as described above) is combined with the timing and trajectory of the detected barcode to correlate barcode data with the three-dimensional model of the item at an estimated item position. The correlation allows the tunnel/portal scanner to differentiate between multiple reads of the same item, and distinguish identical labels on multiple items. Dead reckoning may also allow the software to determine the presence of multiple distinct labels on individual items (such as an overpack label for a multi-pack of items).

Figure 44:
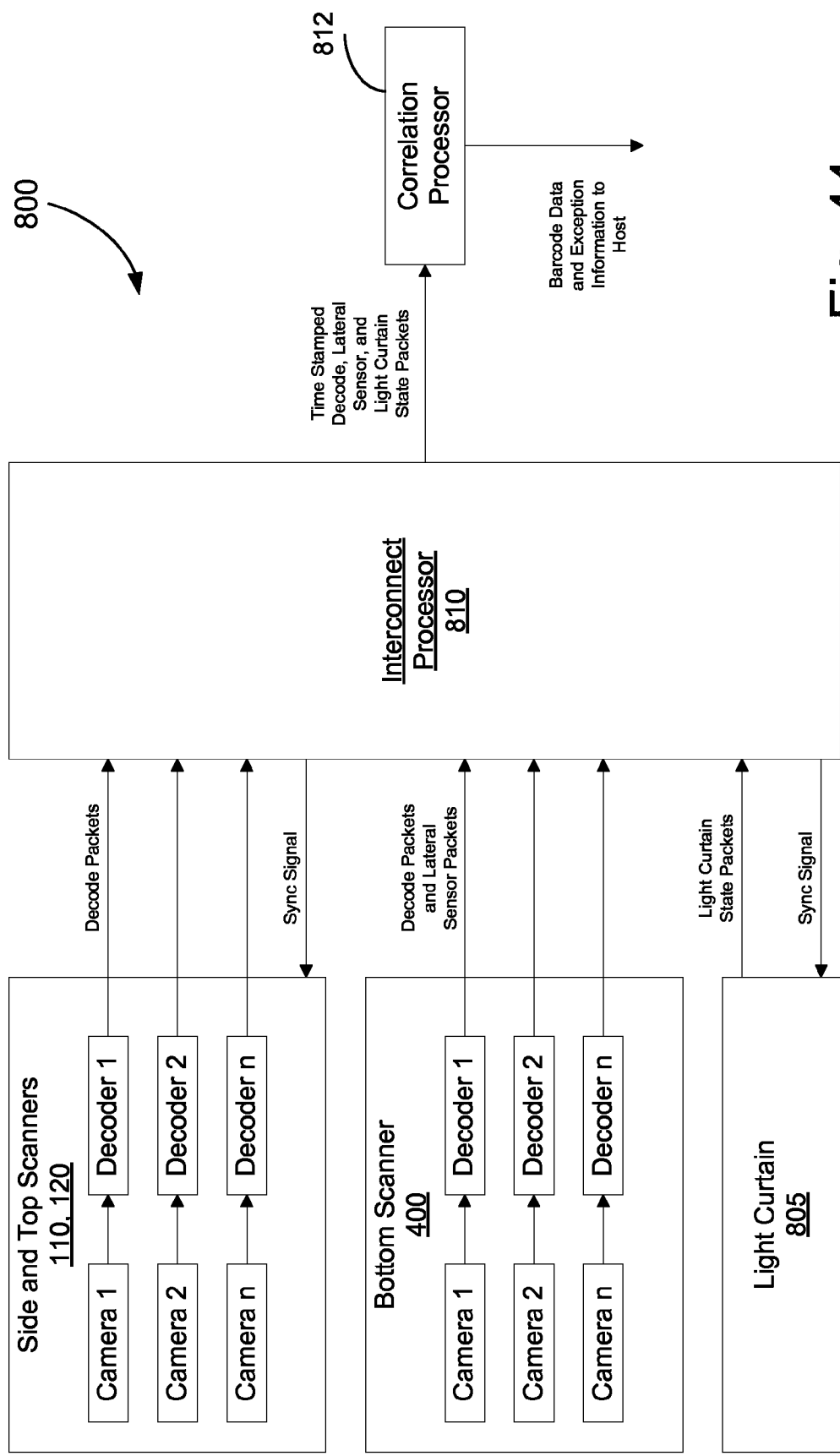
FIG. 44 is a schematic of an example processing system architecture for the scanner of FIG. 1.

As described above, the tunnel scanner 100 employs a plurality of 14 cameras, with some of the cameras (the top and side cameras) each having two image views on its imager and other cameras (the bottom cameras) each having four image views on its imager. FIG. 44 illustrates an exemplary system architecture 800 for the tunnel scanner 100. Images from the cameras in each scanner are decoded and the decoded information (decode packets and lateral sensor packets (e.g., information from lateral object sensors 5300*a*, 5300*b*)) is sent to the interconnect processor 810. Light curtain information from the light curtains 805*a*, 805*b* (pertaining to the size and position of item being passed through the read region) is processed and the corresponding information (light curtain state packets) is also sent to the interconnect processor 810. The interconnect processor 810 applies time stamps to the packets and sends the time stamped packet data to the correlation processor 812. The correlation processor 812 generates object models (e.g., three-dimensional models of objects) from the light curtain and lateral sensor packets and correlates object data with the decode packets to determine which objects correspond to the decoded data. Successfully correlated barcode information as well as exception data is then transmitted to the POS host. Exception data corresponds to any number of events when the object models and decode packets indicate that an error may have occurred. Examples of exceptions include, but are not limited to: (a) more than one barcode is correlated with an object; and (2) no barcode is correlated with an object model; (3) a barcode is read but is not correlated with an object model.

Figure 45:
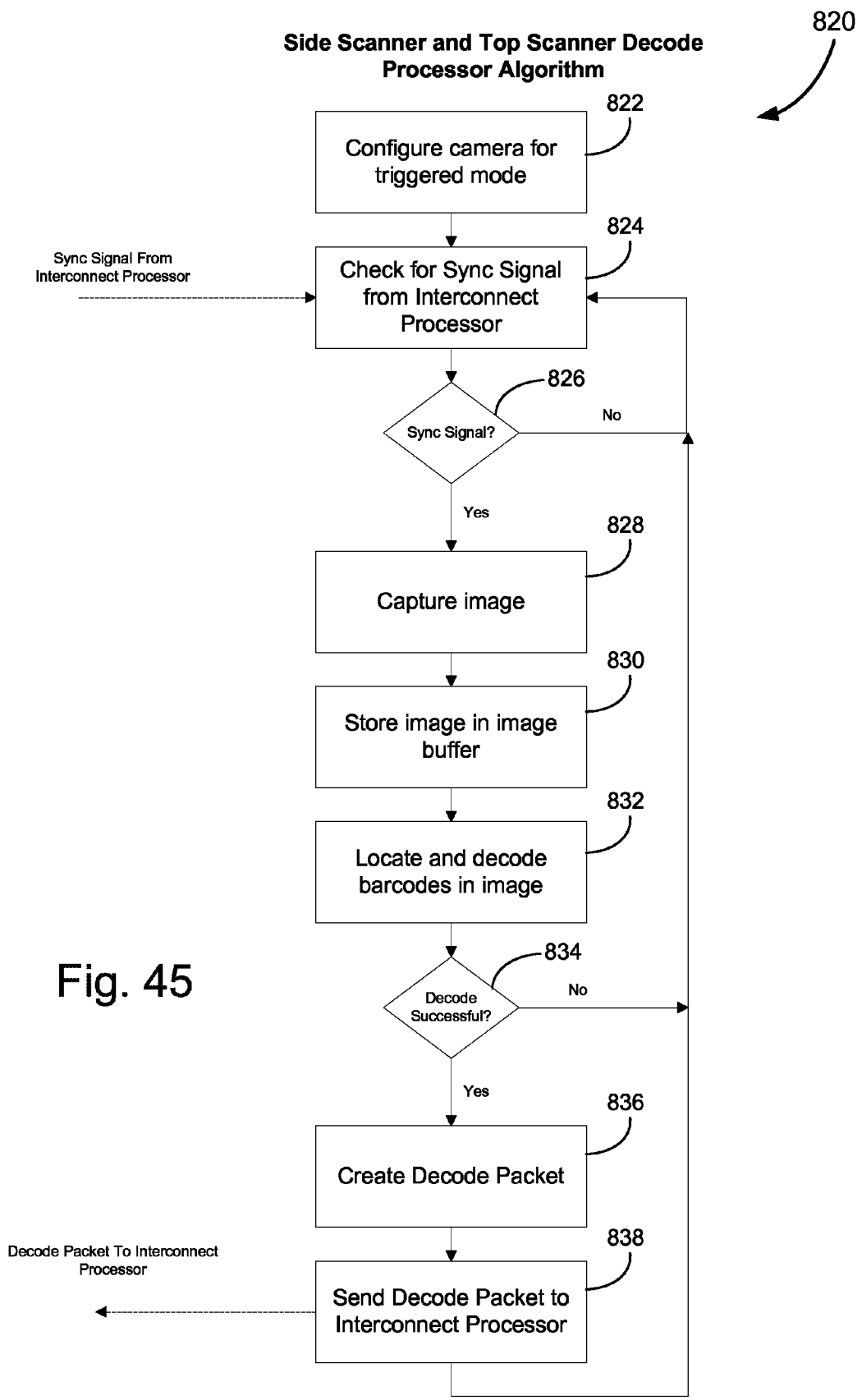
FIG. 45 is a flow chart of a side scanner and top scanner decode processor algorithm according to a embodiment.

FIG. 45 is a flow chart of a side scanner and top scanner decode processor algorithm 820 according to one embodiment, having the following steps:

Step 822—configuring camera for triggered mode.

Step 824—checking for synchronization signal from interconnect processor.

Step 826—if synchronization signal is detected, (Yes) proceed to Step 828; if No, return to Step 824.

Step 828—capturing image (trigger the camera to capture an image).

Step 830—reading out image from the imager into processor memory image buffer.

Step 832—processing image to locate and decode barcodes in image buffer. The image may be processed using a suitable image processing algorithm.

Step 834—determining whether a barcode was successfully decoded: if Yes, proceed to Step 836, if No, return to Step 824 to process additional images. For each barcode found in image buffer, record the symbology type (UPC, Code 39, etc), decoded data, and coordinates of the bounding box corners that locate the decoded label in the image.

Step 836—creating decode packet (with the recorded symbology type, decoded data and coordinates).

Step 838—sending recorded data (decode packet) to the interconnect processor and then returning to Step 824 to process additional images.

Figure 46:
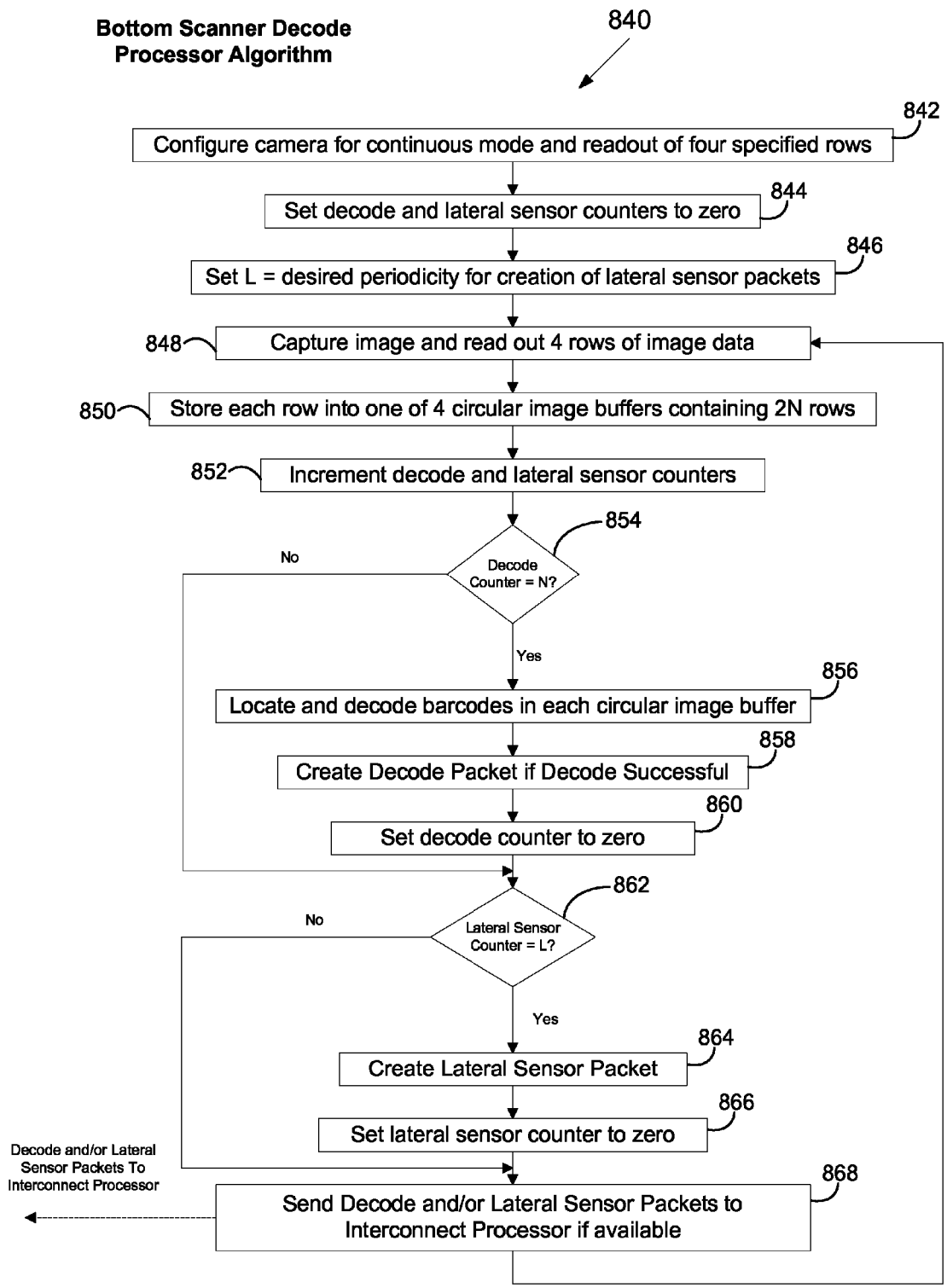
FIG. 46 is a flow chart of a bottom scanner decode processor algorithm according to an embodiment.

FIG. 46 is a flow chart of a bottom scanner decode processor algorithm 840 according to an embodiment, having the following steps:

Step 842—Configuring the camera to continuously capture images and read out 4 rows of data. In a preferred reading method, the frame rate of reading out frames of 4 rows each is 2.5 KHz (2500 frames/second).

Step 844—Setting decode and lateral sensor counters to zero.

Step 846—Setting L to equal the desired periodicity for creation of lateral sensor packets. In one example the value of L=20.

Step 848—capturing image and reading out each of the 4 rows of data from the imager (imager 411 or 424) into a temporary buffer.

Step 850—storing each row of data into one of four circular image buffers containing 2N rows to generate four separate linescan images in processor memory.

Step 852—increment decode and lateral sensor counters.

Step 854—Determining if decode counter=N: if Yes proceed to Step 856; if No proceed to Step 862. N represents how tall the decode buffer is. In one example, N=512, which corresponds to about 2.5 inches of belt movement (e.g., belt speed of 12 inches/sec. divided by a line scan speed of 2500 Hz times N of 512 equals 2.5 inches).

Step 856—Processing each of the 4 image buffers sequentially (using the image processing algorithm) to locate and decode barcodes. The image processing algorithm analyzes an image using horizontal and vertical scan lines to find start and/or stop patterns of an optical code. The algorithm then traverses the image roughly in the direction of the optical code (also moving in a transverse direction as necessary) to decode the digits of the optical code similar to an adaptive VSL algorithm.

Step 858—creating a decode packet if the decode is successful. If the number of rows in the circular buffer is 2N, then for every N rows, an image of the previous 2N pixels is decoded as a frame. For each barcode found in image buffer, record the symbology type (UPC, Code 39, etc), decoded data, and coordinates of the bounding box corners that locate the decoded label in the image. The recorded symbology type, decoded data and coordinates constitute the decode packet.

Step 860—setting decode counter to zero. The decode counter represents a variable that counts the number of rows that have been put into the circular buffer.

Step 862—determining if lateral sensor counter=L: if Yes, proceed to Step 864; if No, proceed to Step 868. L represents the number of rows to skip between outputting lateral sensor data. In one example, the resolution of the lateral object sensors 5300a, 5300b is about 5 mils (e.g., 12 inches/sec divided by 2500 Hz). An L value of 20 provides a spacing of the lateral sensor data of about 0.1 inch.

Step 864—creating lateral sensor packet. As an example, periodically (for example every 20 rows of data captured) a lateral sensor packet is created by: selecting a subset of the columns in the 4 rows of data (e.g., every 20 columns) and binarizing the data by comparing the pixel intensity to a fixed threshold. This creation of the lateral sensor packet process provides a coarse resolution binary representation of the objects passing by the bottom scanner. This binary representation corresponds to a footprint of the object. For any object viewable by the lateral object sensor, the object's longitudinal length is determined by the number of rows in the object footprint multiplied by the object footprint pixel size.

Step 866—setting lateral sensor counter to zero.

Step 868—sending recorded data (decode packets and lateral sensor packets) to the interconnect processor and then returning to Step 848 to capture/read out more images.

Figure 47:
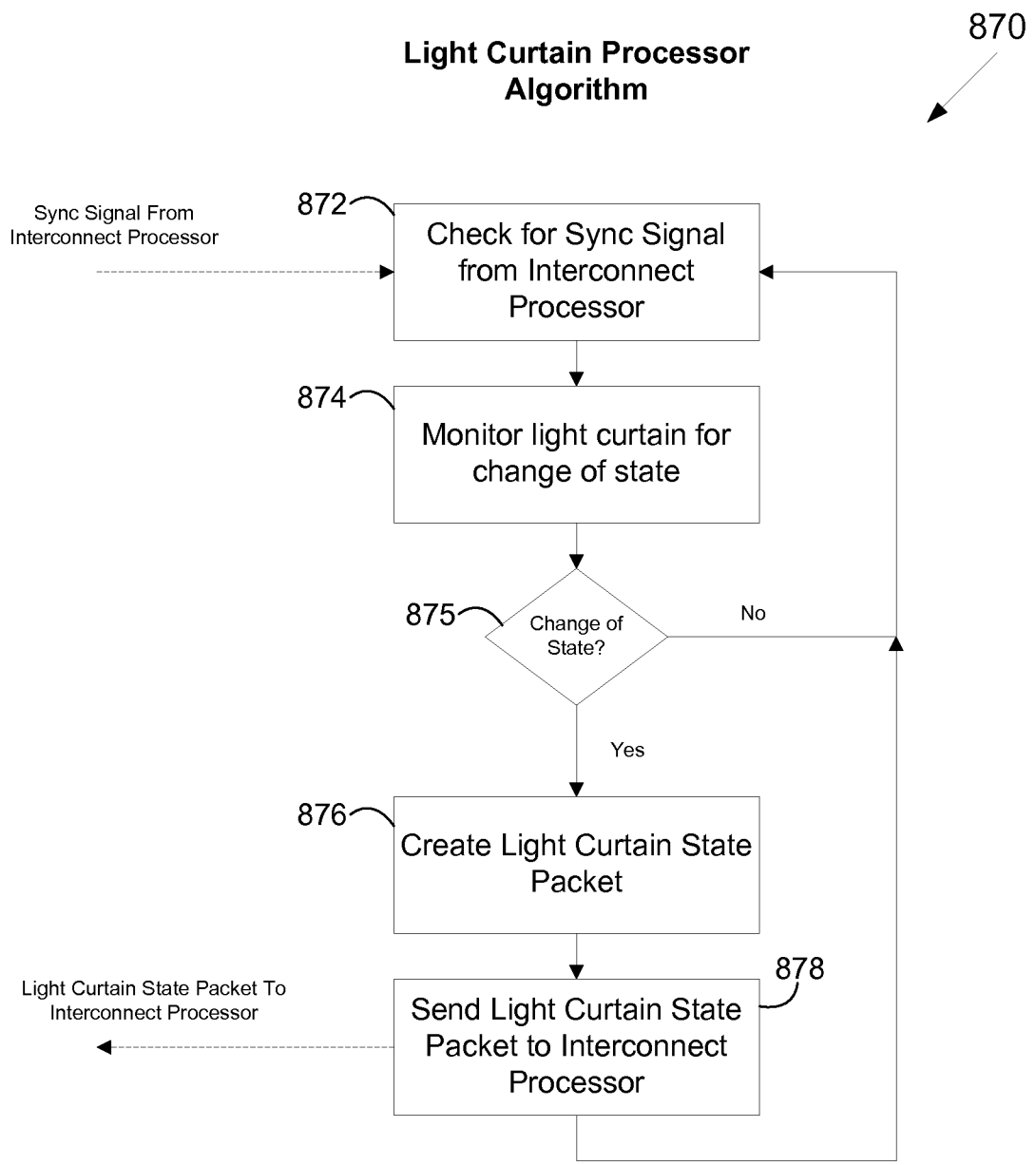
FIG. 47 is a flow chart of a light curtain processor algorithm according to an embodiment.

FIG. 47 is a flow chart of a light curtain processor algorithm 870 according to an embodiment, having the following steps:

Step 872—checking for synchronization signal for the interconnect processor. The light curtain sensor elements 422 are monitored to determine the height of an object. For example, an object's height is determined by tallest light curtain sensor element that was blocked when object passed by. The light curtain sensor elements 422 may also be used to determine the longitudinal length of the object. For example, for objects tall enough to block at least one beam in the light curtain, object length is determined by time difference (as measured by Frame Count difference) between trailing light curtain being first blocked to being unblocked multiplied by assumed object velocity (typically the conveyor belt velocity).

Step 874—monitoring light curtain beams and waiting for a change of state (where a beam is just interrupted or just cleared).

Step 875—determining if a change of state has not occurred: if No, returning to Step 872; if Yes, proceeding to Step 876.

Step 876—creating light curtain state packet that represents the current light curtain state (e.g., corresponding to a bit pattern (for example, 1=vertically aligned sensors blocked, 0=vertically aligned sensors unblocked)).

Step 878—transmitting light curtain state packet (indicating current state of light curtain beams) to the interconnect processor and then returning to Step 872.

Figure 48:
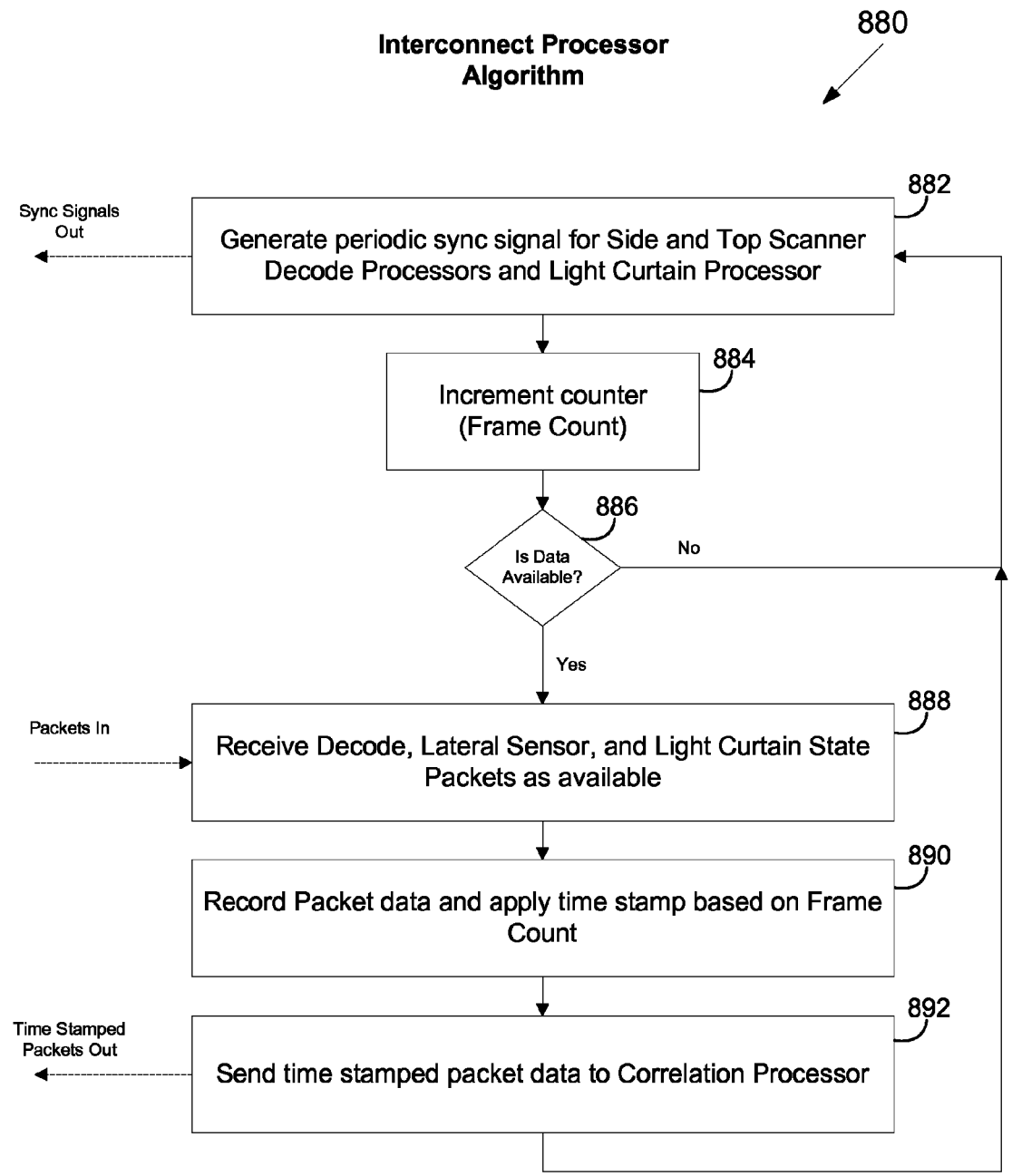
FIG. 48 is a flow chart of an interconnect processor algorithm according to an embodiment.

FIG. 48 is a flow chart of an interconnect processor algorithm 880 according to a embodiment, having the following steps:

Step 882—Generating a periodic synchronization signal and sending it to the decode processors. This periodic synchronization signal sets the frame rate of the system. In a preferred example herein, periodic synchronization signal is 30 Hz (30 frames/second).

Step 884—incrementing a counter (a frame count) each time the synchronization pulse is emitted. In one example, the synchronization pulse is emitted periodically at 30 Hz.

Step 884—receiving decode packets from the top, side, and bottom decode processors.

Step 886—receiving lateral sensor packets from the bottom decode processors and the light curtain state packets from the light curtain processor.

Step 888—recording the decode packets and the lateral sensor packets and recording the value of the frame count when the packets were received (referred to as time stamping of the packets).

Step 890—sending the time stamped packet data to the correlation processor.

Figure 49:
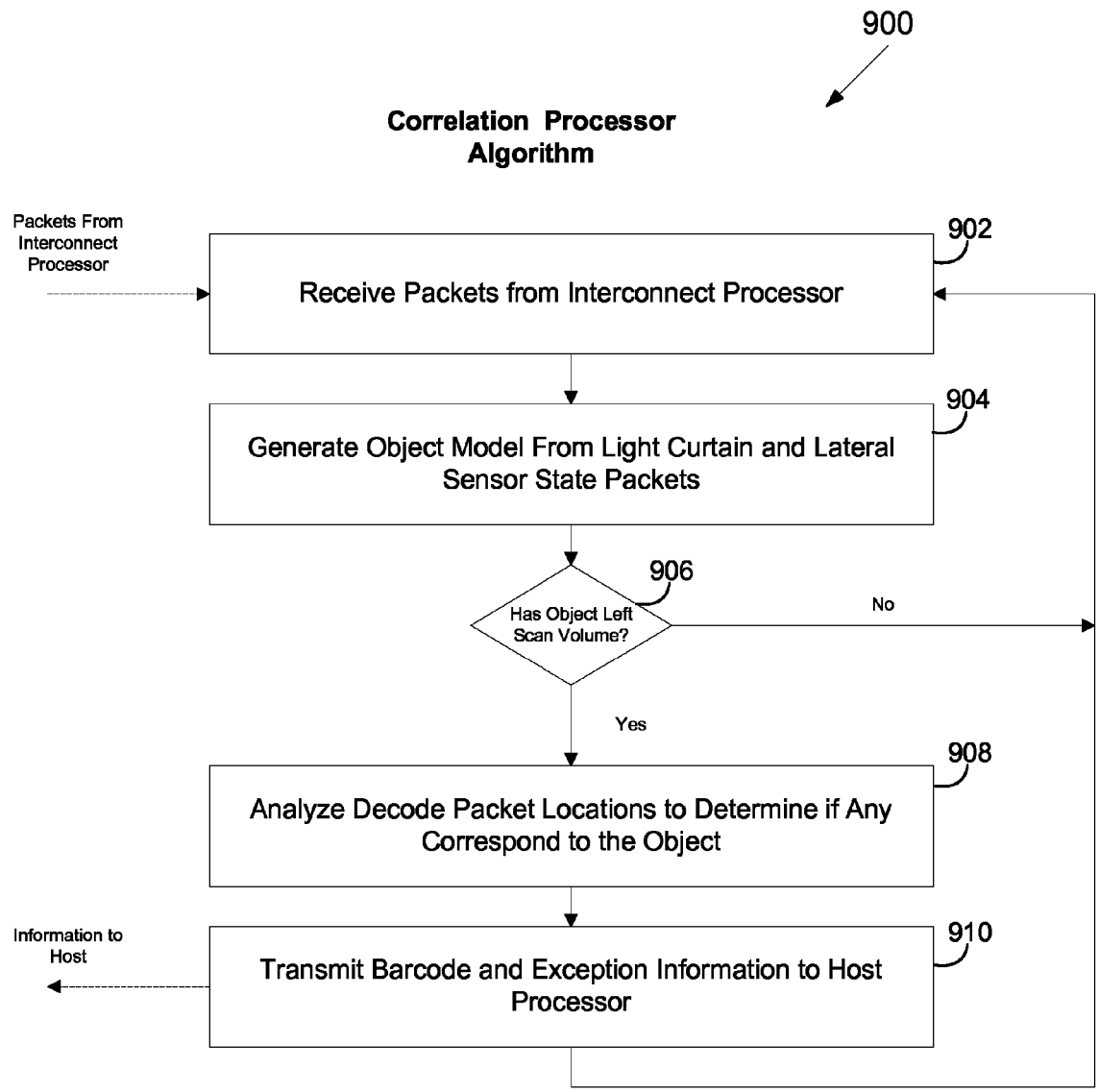
FIG. 49 is a flow chart of a correlation processor algorithm according to an embodiment.

FIG. 49 is a flow chart of an example correlation processor algorithm 900 according to a embodiment, having the following steps:

Step 902—waiting to receive packets (i.e., the lateral sensor packets from the bottom decode processors and the light curtain state packets from the light curtain processor) from the interconnect processor.

Step 904—generating a three-dimensional object model (e.g., from an object footprint and side profile (LOS and VOS profiles)) from the light curtain state packets and lateral sensor packets. An object model is a volume solid with base equivalent to the object footprint, or simplified representation thereof (such as a rectangle) and a height as measured by the light curtain sensor data.

Step 906—determining if the object has left the read region: if No, return to Step 902; if Yes, proceeding to Step 908. Whether the object has left the read region may be determined in various ways. For example, the light curtain state packet or lateral sensor packet may indicate that an object has left the scan volume. In one example, transition of the trailing light curtain from a blocked state to an unblocked state indicates that an object has left the scan volume. In other examples, the leading light curtain and/or the lateral object sensor may be used to determine when an object leaves the read region. If data from the leading light curtain or lateral object sensor is used, the location of the object model is translated by the distance between the locations of the leading light curtain (and/or lateral object sensor) and the trailing light curtain so that the object model is at the edge of the trailing light curtain.

Step 908—analyzing decode packet locations to determine if any of the locations correspond to the object. For example, a decode trajectory or a back projection ray is generated for each decode packet by considering the camera parameters of the camera that decoded the barcode and bounding box coordinates. Generation of back projection rays is further discussed in U.S. Patent Application Nos. 61/435,686 and 61/505,935, incorporated by reference above. Back projection rays are translated by the assumed movement of the object that would have occurred from the decode time until the present moment (by computing the time difference as measured by frame count difference between the moment the object left the scan volume and the moment when the decode occurred). After the back projection rays are translated, it is determined whether any back projection rays intersect the object model.

Step 910—transmitting optical code data and exception information to host processor. If a single barcode value is associated with an object, a "Good Read" indication may be sent to the host processor. The exception information may correspond to one or more of various exceptions. In one example, the exception information may indicate that multiple different barcode values are associated with an object (e.g., a "Multiple Barcode Read" exception). In another example, the exception information may indicate that an object was seen but no barcode was associated with it (e.g., a "No Read" exception). In another example, the exception information may indicate that a barcode was decoded but no object was associated with it (e.g., a "Phantom Read" exception).

It is intended that subject matter disclosed in portion herein can be combined with the subject matter of one or more of other portions herein as long as such combinations are not mutually exclusive or inoperable. In addition, many variations, enhancements and modifications of the imager-based optical code reader concepts described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A scanning system for reading optical codes on items being passed via a transport mechanism through a read volume of the system, comprising
    a front arch section and a rear arch section, each arch section having (a) first and second lateral leg sections, and (b) a top arch section connected to a top portion of each of the first and second lateral leg sections and spanning therebetween over a width of the transport mechanism, wherein the front arch section and the second arch section are arranged with lower portions of the front arch lateral leg sections adjacent to lower portions of the rear arch lateral leg sections, wherein the first and second lateral leg sections of the front arch section are slanted forwardly and the first and second lateral leg sections of the rear arch section are slanted rearwardly;
    a plurality of readers disposed in the top arch sections and the lateral leg sections for reading an optical code on any of five sides of a six-sided box-shaped item being passed through a read region formed by the arch sections.

2. A system according to claim 1 wherein the plurality of readers comprises cameras disposed in the lateral side legs and the arch top sections, one or more of the cameras each having an imager, a lens system and associated mirrors for forming multiple image views on the imager.

3. A system according to claim 2 further comprising
    a plurality of illumination modules disposed in the first and second arch sections, each module including one or more light emitting diodes (LEDs) for projecting an illumination region into the read region, the illumination modules providing illumination for the image views of the item being passed through the read region.

4. A system according to claim 1 wherein the front arch section and the rear arch section are of like configuration.

5. A system according to claim 4 wherein the front arch section and the rear arch section are arranged back-to-back.

6. A system according to claim 4 wherein the front arch section comprises an inverted U-shaped housing.

7. A system according to claim 1 further comprising a chassis, wherein the first and second arch sections are mounted to and aligned by the chassis.

8. A system according to claim 1 wherein the transport mechanism comprises a conveyor and the system further comprising
    a first conveyor section and a second conveyor section with a gap formed between the first and second conveyor sections;
    a bottom scanner disposed below the conveyor reading up through the gap to read optical codes on a bottom side of items as they pass over the gap.

9. A system according to claim 8 further comprising a drawer slidably mounted below the conveyor, wherein the bottom scanner is disposed in the drawer.

10. A system according to claim 9 further comprising a chassis, wherein the first and second arch sections and the drawer are mounted to and aligned by the chassis.

11. A system according to claim 1 wherein the scanning system is configured in the form of a tunnel or portal scanner.

12. A method for reading an optical code comprising the steps of
    moving an item bearing an optical code through a read region of a tunnel or portal scanner via a transport mechanism;
    providing an open architecture scanner housing comprising front and rear inverted U-shaped arch sections (1) separated by an opening between top sections thereof and (2) with adjacent bottom sections thereof;
    forming a read region under and between the arch sections by positioning a plurality of imagers in each of the front and rear arch sections and directing fields of view into the read region to produce views of front, rear, top, left lateral and right lateral sides of a six sided box-shaped item being passed through the read region;
    forming images at the imagers from the fields of view;
    processing the optical code based on one or more of the images.

13. A method according to claim 12 wherein the transport mechanism comprises a conveyor, the method further comprising
    providing the conveyor with first and second conveyor sections separated by a relatively narrow gap therebetween;
    via the conveyor, passing the item from the first conveyor section to the second conveyor section over the gap;
    directing one or more fields of view upwardly through the gap from one or more imagers located below the conveyor to produce a view of a bottom side of the six sided box-shaped item being passed over the gap.

14. A method according to claim 12 further comprising
    illuminating the read region with a plurality of illumination modules, the illumination modules being arranged in various locations about the arch sections with each illumination module projecting illumination along one of the fields of view of one of the imagers.

15. A method according to claim 12, wherein each arch section includes (a) first and second lateral leg sections, and (b) a top arch section connected to a top portion of each of the first and second lateral leg sections and spanning therebetween over a width of the conveyor, the method further comprising projecting fields of view out of each of: the top arch section, the first lateral leg section and the second lateral leg section.

16. A method according to claim 12 further comprising
arranging the front arch section and the second arch section back-to-back with the front arch section slanted forwardly and the rear arch section slanted rearwardly.

17. An automated checkout system for reading items, the automated checkout system comprising:
a portal scanner having an open architecture scanner housing comprising front and rear inverted U-shaped arch sections (1) with bottom sections thereof adjacently arranged and (2) with an opening between top sections thereof, the arch sections together forming a V or Y shape as viewed from a lateral side;
a conveyor operable to receive and transport an item along a path through a read zone of the portal scanner.

18. An automated checkout system according to claim 17 further comprising
a conveyor comprising a leading conveyor section and a trailing conveyor section spaced apart from the leading conveyor section by a gap such that the item is transportable across the gap from the leading conveyor section onto the trailing conveyor section;
a data reader positioned beneath the conveyor and oriented to read encoded data on a bottom side of the item through the gap.

19. An automated checkout system according to claim 17 wherein the portal scanner comprises a front arch section and a rear arch section, each arch section having (a) first and second lateral leg sections, and (b) a top arch section connected to a top portion of each of the first and second lateral leg sections and spanning therebetween over a width of the conveyor, wherein the front arch section and the second arch section are arranged back-to-back with lower portions of the front arch lateral leg sections adjacent to lower portions of the rear arch lateral leg sections, wherein the first and second lateral leg sections of the front arch section are slanted forwardly and the first and second lateral sections of the rear arch section are slanted rearwardly.

20. An automated checkout system according to claim 17 wherein the portal scanner comprises a data reader selected from the group consisting of: an optical code reader; an RFID reader; an image recognition reader; and combinations thereof.

* * * * *

UNITED STATES PATENT AND TRADEMARK OFFICE
CERTIFICATE OF CORRECTION

| | | |
|---|---|---|
| PATENT NO. | : 8,746,564 B2 | Page 1 of 1 |
| APPLICATION NO. | : 13/357356 | |
| DATED | : June 10, 2014 | |
| INVENTOR(S) | : Bryan L. Olmstead, Alan Shearin and Michael P. Svetal | |

It is certified that error appears in the above-identified patent and that said Letters Patent is hereby corrected as shown below:

In the Specification

<u>Column 3</u>
Line 18, after "top" delete "rear".

<u>Column 12</u>
Line 16, change "(a)" to --(b)--.
Line 20, after "linear" insert --,--.
Line 47, change "two dimensional" to --two-dimensional--.
Lines 51-52, change "two dimensional" to --two-dimensional--.

<u>Column 13</u>
Line 3, change "configuration" to --configurations--.

<u>Column 14</u>
Line 62, change "are" to --is--.

<u>Column 16</u>
Line 20, after "components" insert --that--.

Signed and Sealed this
Tenth Day of February, 2015

Michelle K. Lee
*Deputy Director of the United States Patent and Trademark Office*